(12) United States Patent
Togino

(10) Patent No.: US 7,403,343 B2
(45) Date of Patent: Jul. 22, 2008

(54) PANORAMIC ATTACHMENT OPTICAL SYSTEM, AND PANORAMIC OPTICAL SYSTEM

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 158 days.

(21) Appl. No.: 11/205,212

(22) Filed: Aug. 17, 2005

(65) Prior Publication Data

US 2006/0114576 A1 Jun. 1, 2006

(30) Foreign Application Priority Data

| Aug. 18, 2004 | (JP) | ............................ 2004-237944 |
| Feb. 9, 2005 | (JP) | ............................ 2005-032585 |
| Feb. 16, 2005 | (JP) | ............................ 2005-038669 |
| Feb. 18, 2005 | (JP) | ............................ 2005-042172 |
| May 18, 2005 | (JP) | ............................ 2005-145261 |
| May 18, 2005 | (JP) | ............................ 2005-145262 |
| May 18, 2005 | (JP) | ............................ 2005-145264 |

(51) Int. Cl.
G02B 13/06 (2006.01)
(52) U.S. Cl. ........................ 359/725; 359/726; 359/728
(58) Field of Classification Search ................ 359/725, 359/726–729, 364, 402–403, 672–675, 749–752; 348/36

See application file for complete search history.

(56) References Cited

U.S. PATENT DOCUMENTS

| 3,282,653 A | 11/1966 | Tokarzewski |
| 3,505,465 A | 4/1970 | Rees |
| 4,976,524 A | 12/1990 | Chiba |
| 5,473,474 A | 12/1995 | Powell |

(Continued)

FOREIGN PATENT DOCUMENTS

JP 2103010 4/1990

(Continued)

*Primary Examiner*—Ricky L Mack
*Assistant Examiner*—James R Greece
(74) *Attorney, Agent, or Firm*—Pillsbury Winthrop Shaw Pittman LLP

(57) ABSTRACT

The invention relates to a panoramic attachment optical system and a panoramic optical system for taking an image having a full 360°-direction angle of view or projecting an image at a full 360°-direction angle of view. These optical systems are reduced in size and flare light and improved in resolving power. A panoramic attachment optical system 10 attached to the entrance side of an image-formation lens 20 to form a full 360°-direction image on an image plane 30 comprises a transparent medium that is rotationally symmetric about a center axis 1 and includes at least one internal reflecting surface 12 and at least two refracting surfaces 11 and 13. A light beam incident on the entrance surface 11 in order of travel of light enters the transparent medium via the entrance surface 11, and is reflected at the internal reflecting surface 12 to leave the transparent medium via the exit surface 13, forming an image at a position of the image plane 30 off the center axis 1 via the image-formation lens 20. The internal reflecting surface and the refracting surfaces are each of shape rotationally symmetric about the center axis 1, and a light beam 2 coming from far way forms an image at least one time in a section including the center axis 1, but does not form any image in a plane that is orthogonal to that section and includes a center ray $2^0$ of that light beam.

31 Claims, 49 Drawing Sheets

U.S. PATENT DOCUMENTS

| | | |
|---|---|---|
| 5,631,778 A | 5/1997 | Powell |
| 6,115,193 A * | 9/2000 | Shu .......................... 359/725 |
| 6,175,454 B1 * | 1/2001 | Hoogland et al. ........... 359/725 |
| 6,222,683 B1 | 4/2001 | Hoogland et al. |
| 6,597,520 B2 | 7/2003 | Walleerstein et al. |
| 6,611,282 B1 | 8/2003 | Trubko et al. |
| 2002/0126395 A1 | 9/2002 | Gianchandani et al. |
| 2002/0154417 A1 * | 10/2002 | Wallerstein et al. ......... 359/725 |

FOREIGN PATENT DOCUMENTS

| | | |
|---|---|---|
| JP | 11-331654 | 11/1999 |
| JP | 2003-167195 | 6/2003 |

* cited by examiner

FIG. 43
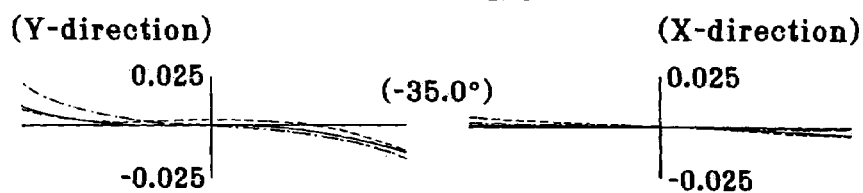
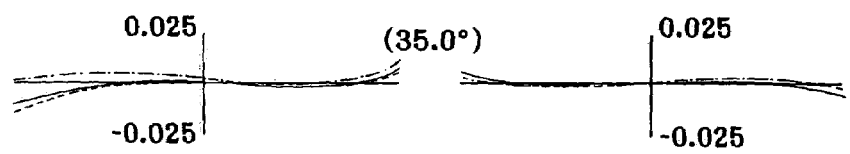
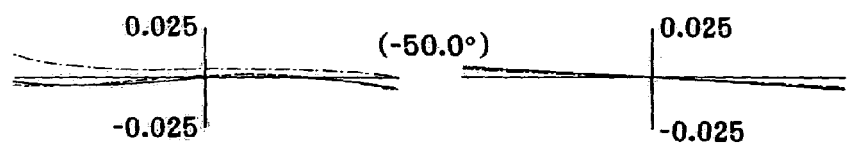
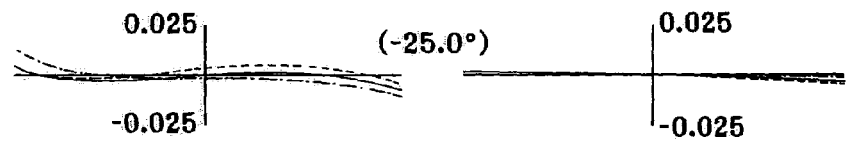
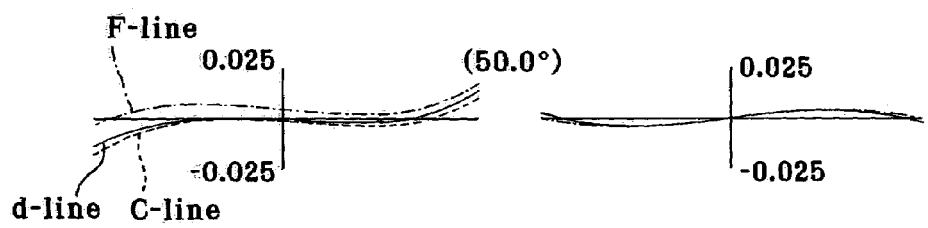
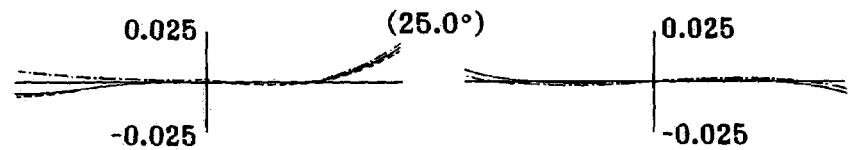
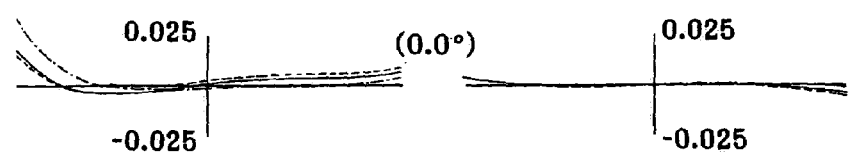

PANORAMIC ATTACHMENT OPTICAL SYSTEM, AND PANORAMIC OPTICAL SYSTEM

This application claims the benefits of Japanese Application No. 2004-0237944, filed in Japan on Aug. 18, 2004, Japanese Application No. 2005-32585, filed in Japan on Feb. 9, 2005, Japanese Application No. 2005-38669, filed in Japan on Feb. 16, 2005, Japanese Application No. 2005-42172, filed in Japan on Feb. 18, 2005. Japanese Application No. 2005-145261, filed in Japan on May 18, 2005. Japanese Application No. 2005-145262, filed in Japan on May 18, 2005 and Japanese Application No. 2005-145264, filed in Japan on May 18, 2005, the contents of all of which are incorporated herein by reference in their entireties.

BACKGROUND OF THE INVENTION

The present invention relates generally to a panoramic attachment optical system and a panoramic optical system, and more specifically to a panoramic attachment optical system and a panoramic optical system, each of small-format size and high resolving power, which are well suited for use on all sky cameras, all sky projectors, etc., designed to form on image plane an image having a full 360°-direction angle of view or project an image located on an image plane at a full 360°-direction angle of view.

Among prior optical systems using a reflection optical system to obtain a full 360°-direction (full-panoramic) image, there is one using a single reflecting surface such as that set forth in patent publication 1, one using two reflecting surfaces such as those set forth in patent publications 2 and 3, and one known as "Chameleon Eye®" available from Sony Corp.

Patent Publication 1

Japanese Patent No. 2925573

Patent Publication 2

JP(A)11-331654

Patent Publication 3

JP(A)2003-167195

With any of the prior optical systems that are not designed to form any intermediate image en route to the image plane, typically, that set forth in patent publication 1, a full 360°-direction image to be formed in ring form becomes a mirror image where heaven and earth change place.

A problem with the optical systems shown in patent publications 2 and 3 is that the reflecting optical system becomes bulky because the image of the entrance pupil of an image-formation optical system, too, is not formed in the reflecting optical system.

With "Chameleon Eye", it is not easy to make the angle of view wide in the vertical direction with the result that the reflecting optical system becomes bulky, because light is reflected successively at reflecting surfaces positioned with the center axis interposed between them and so the entrance-side reflecting surface acts to limit the angle of view.

Such being the case, the primary object of the invention is to provide a panoramic attachment optical system and a panoramic optical system for taking an image having a full 360°-direction (full-panoramic) angle of view or projecting an image at a full 360°-direction (full-panoramic) angle of view, which have decreased size, minimized flare light and improved resolving power.

SUMMARY OF THE INVENTION

According to the invention, the above object is achieved by the provision of a panoramic attachment optical system attached to an entrance side of an image-formation lens having positive power or an exit side of a projection lens having positive power to form a full 360°-direction image on an image plane or project an image located on an image plane in a full 360° direction, characterized in that:

said panoramic attachment optical system comprises a transparent medium that is rotationally symmetric about a center axis and includes at least one internal reflecting surface and at least two refracting surfaces, wherein a light beam enters said transparent medium via an entrance-side refracting surface in order of travel of a light ray in the case of an image-formation optical system, and oppositely to the order of travel of a light ray in the case of a projection optical system, and reflects successively at said internal reflecting surface to leave said transparent medium via an exit-side refracting surface, forming an image at a position of said image plane off said center axis via said image-formation lens or said projection lens, said internal reflecting surface and said refracting surfaces are each of shape rotationally symmetric about said center axis, and a light beam coming from far away forms an image at least one time in a section including said center axis, but does not form any image a plane that is orthogonal to said section and includes a center light ray of said light beam.

Preferably in this embodiment of the invention, the light beam coming from far way passes through said internal reflecting surface and said refracting surfaces positioned on only one side of the center axis in said transparent medium.

It is also preferable that the light beam coming from far way forms an image one time in the section including the center axis, and the panoramic attachment optical system has one to four internal reflecting surfaces.

Further, it is preferable that the center light ray of the light beam coming from far away has an angle of incidence of 45° or smaller on any of the internal reflecting surfaces.

Further, it is preferable that the image-formation lens or projection lens and an entrance-formation aperture are located coaxially with the center axis. Further, the at least one internal reflecting surface could be of rotationally symmetric shape obtained by rotation about the center axis of a line segment that has no plane of symmetry and is of any shape, or of rotationally symmetric shape obtained by rotation about the center axis of a line segment that includes an odd-number order term and is of any shape.

Further, it is preferable for the panoramic attachment optical system to satisfy condition (1):

$$3 < |A/B| \quad (1)$$

where A is an optical path length between the position of an entrance pupil that is an image of the pupil-formation aperture and that pupil-formation aperture, and B is an optical path length between the entrance surface and the position of an entrance pupil.

Further, it is preferable for the panoramic attachment optical system to satisfy condition (2):

$$0.2 < Fx/Fy < 5.0 \quad (2)$$

where Fx and Fy are the focal lengths of the whole panoramic attachment optical system in an X-direction and a Y-direction, respectively, provided that on the image plane, the Y-direction is defined by a direction of a plane including the center axis and the X-direction is defined by a direction orthogonal to that plane.

In another embodiment of the invention, there is provided a panoramic optical system for forming an image having a full 360°-direction angle of view on an image plane or projecting an image located on the image plane at a full 360°-direction angle of view, characterized in that:

said panoramic optical system comprises a front unit including at least one reflecting surface that is rotationally symmetric about a center axis and a rear unit that is rotationally symmetric about the center axis and has positive refracting power, and a light beam incident from far away on said front unit in order of travel of a light ray in the case of an image-formation system, and oppositely to the order of travel of a light ray in the case of a projection system forms an image at a position of said image plane off said center axis via said front unit and said rear unit in this order, and the number of intermediate image formations differ between in a section including said center axis and in a plane that is orthogonal to said section and includes a center light ray of said light beam.

In yet another embodiment of the invention, there is a panoramic optical system for forming an image having a full 360°-direction angle of view on an image plane or projecting an image located on the image plane at a full 360°-direction angle of view, characterized in that:

said panoramic optical system comprises a front unit including at least one reflecting surface that is rotationally symmetric about a center axis, a rear unit that is rotationally symmetric about the center axis and has positive refracting power, and an aperture that is located coaxially with said center axis, and a light beam incident from far away on said front unit in order of travel of a light ray in the case of an image-formation system, and oppositely to the order of travel of a light ray in the case of a projection system forms an image at a position of said image plane off said center axis via said front unit and said rear unit in this order, and the number of intermediate image formations differ between in a section including said center axis and in a plane that is orthogonal to said section and includes a center light ray of said light beam.

In this embodiment, said front unit could comprise a transparent medium that has an angle of view of 90° or greater in a center axis direction and is rotationally symmetric about said center axis, wherein said transparent medium includes one internal reflecting surface and two refracting surfaces, and a light beam incident from far way on said front unit in order of travel of a light ray in the case of an image-formation system, and oppositely to the order of travel of a light ray in the case of a projection system enters said transparent medium via the entrance-side refracting surface, and is reflected at said internal reflecting surface to leave said transparent medium via the exit-side refracting surface, forming an image at a position of said image plane off said center axis vie said rear unit.

Alternatively, a light beam coming from far away in one direction could be reflected and refracted in said front unit on only one side of said center axis to form an intermediate image one time in a section including said center axis, but does not form any intermediate image in a plane that is orthogonal to said section including said center axis and includes a center ray of said light beam, and said aperture forms in said section including said center axis an entrance pupil that is conjugate to the entrance surface of said front unit or an object side with respect thereto.

In a further embodiment of the invention, there is a panoramic optical system for forming an image having a full 360°-direction angle of view on an image plane or projecting an image located on the image plane at a full 360°-direction angle of view, characterized in that:

said panoramic optical system comprises a front unit including two reflecting surfaces that are rotationally symmetric about a center axis and a rear unit that is rotationally symmetric about the center axis and has positive refracting power, and a light beam incident from far away on said front unit in order of travel of a light ray in the case of an image-formation system, and oppositely to the order of travel of a light ray in the case of a projection system is reflected at the first reflecting surface positioned on the entrance side with respect to said center axis in a direction away from said rear unit, and a light beam reflected at said first reflecting surface is reflected at the second reflecting surface positioned on the same side as said first reflecting surface in a direction toward said rear unit to leave said front unit, forming an image at a position of said image plane off said center axis via said rear unit, and the number of intermediate image formations differs between in a section including said center axis and in a plane that is orthogonal to said section and includes a center ray of said light beam.

In this embodiment, said front unit could comprise a transparent medium that has an angle of view of 90° or greater in a center axis direction and is rotationally symmetric about said center axis, wherein said transparent medium includes two internal reflecting surfaces that form said first reflecting surface and said second reflecting surface and two refracting surfaces, and a light beam incident from far away on said front unit in order of travel of a light ray in the case of an image-formation system, and oppositely to the order of travel of a light ray in the case of a projection system enters said transparent medium via the entrance-side refracting surface, and reflects successively at said first reflecting surface and said second reflecting surface to leave said transparent medium via the exit-side refracting surface, forming an image at a position of said image plane off said center axis via said rear unit.

The light beam coming from far away in one direction could be reflected and refracted in said front unit on only one side of said center axis to form an intermediate image one time in a section including said center axis, but does not form any intermediate image in a plane that is orthogonal to said section including said center axis and includes a center ray of said light beam, and in said section including said center axis, an entrance pupil could be formed by said front unit on an object side or at or near said first transmitting surface.

In a further embodiment of the invention, there is provided a panoramic optical system for forming an image having a full 360°-direction angle of view on an image plane or projecting an image located on the image plane at a full 360°-direction angle of view, characterized in that:

said panoramic optical system comprises a front unit including at least two reflecting surfaces that are rotationally symmetric about a center axis and a rear unit that is rotationally symmetric about the center axis and has positive refracting power, a light beam incident from far away on said front unit in order of travel of a light ray in the case of an image-formation system, and oppositely to the order of travel of a light ray in the case of a projection system is reflected successively at the reflecting surfaces all positioned on the entrance side of said center axis to leave said front unit, forming an image at a position of an image plane off said center axis via said front unit, and in a section including said center axis, an optical path of light entering the first reflecting surface in said front unit crosses an optical path of light reflected at the final reflecting surface in said front unit, and the number of intermediate image formations differs between in the section including said center axis and in a plane that is orthogonal to said section and includes a light ray of said light beam.

In this embodiment, said front unit could comprise a transparent medium that has an angle of view of 90° or greater in a center axis direction and is rotationally symmetric about said center axis, wherein said transparent medium includes two internal reflecting surfaces and two refracting surfaces, and a light beam incident from far away on said front unit in order of travel of a light ray in the case of an image-formation system, and oppositely to the order of travel of a light ray in the case of a projection system enters said transparent medium via an entrance-side refracting surface, and reflects successively at said reflecting surfaces to leave said transparent medium via an exit-side refracting surface, forming an image at a position of said image plane off said center axis via said rear unit.

In this embodiment, said front unit could has three reflecting surfaces.

In this embodiment, a light beam coming from far away in one direction could be reflected and refracted in said front unit on only one side of said center axis to form an intermediate image one time in a section including said center axis, but does not form any intermediate image in a plane that is orthogonal to said section including said center axis and includes a center ray of said light beam, and in said section including said center axis, an entrance pupil could be formed by said front unit on an object side or at or near said first transmitting surface.

Further, it is preferable for the panoramic optical system to include an aperture at any position of an image plane side with respect to said front unit, wherein said aperture is located coaxially with said center axis.

Further, it is preferable that said rear unit comprises a rotationally symmetric, co-axial refracting optical system.

With the embodiments of the invention as recited above, it is possible to obtain a panoramic attachment optical system and a panoramic optical system, each of small-format size, reduced in flare light, having a wide angle of view in the vertical direction and of improved resolving power, which are designed to obtain an image having a full 360°-direction (full-panoramic) image or project an image at a full 360°-direction angle of view.

Still other objects and advantages of the invention will in part be obvious and will in part be apparent from the specification.

The invention accordingly comprises the features of construction, combinations of elements, and arrangement of parts which will be exemplified in the construction set forth, and the scope of the invention will be indicated in the claims.

BRIEF DESCRIPTION OF THE DRAWINGS

FIG. 43 is an aberration diagram for the whole optical system of Example 16.

DESCRIPTION OF THE PREFERRED EMBODIMENTS

The panoramic attachment optical system of the invention is now explained with reference to examples.

Figure 1:
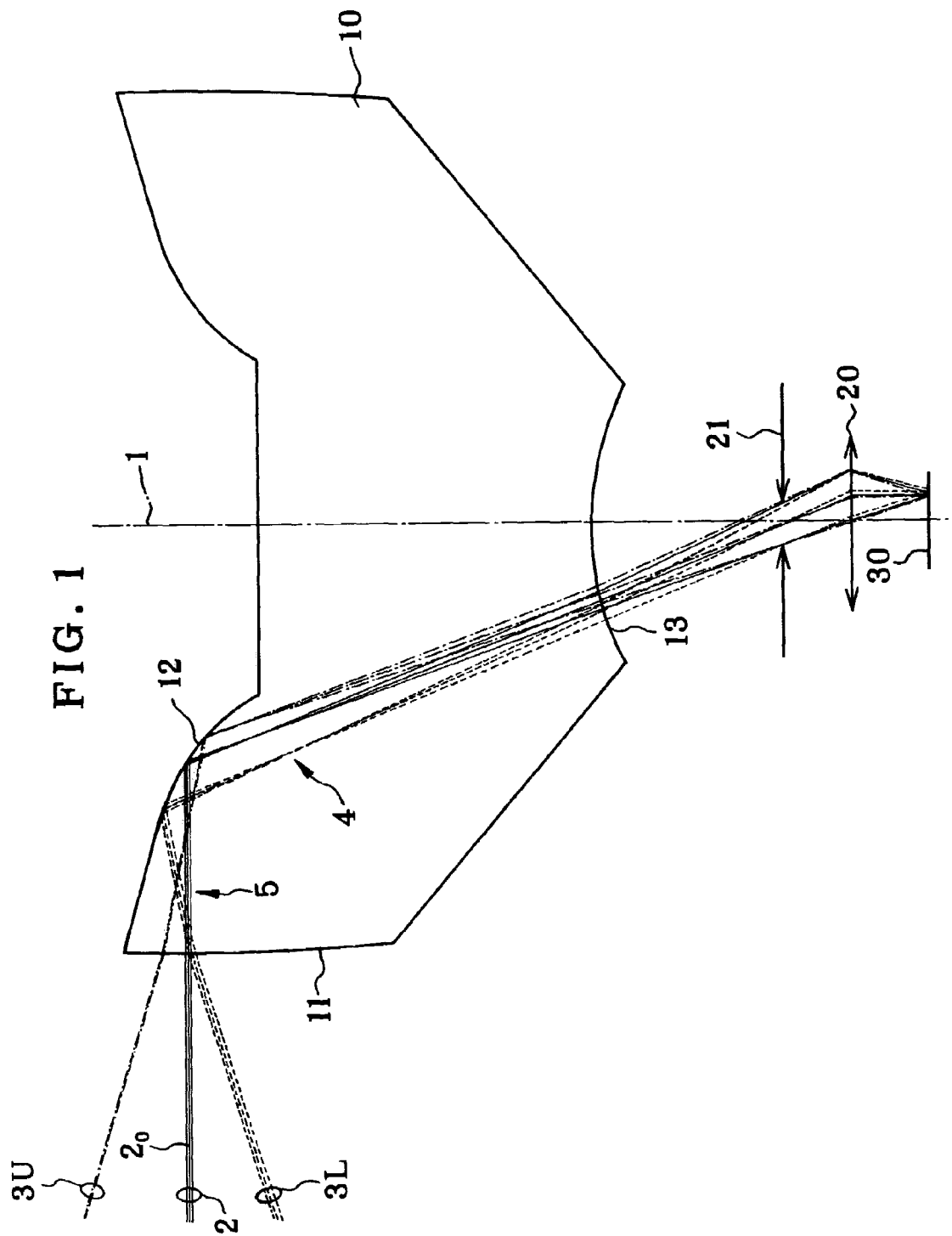
FIG. 1 is a Y-Z sectional view including an axis of rotational symmetry, showing the panoramic attachment optical system according to Example 1 of the invention, as attached to the entrance side of an image-formation lens.
Figure 2:
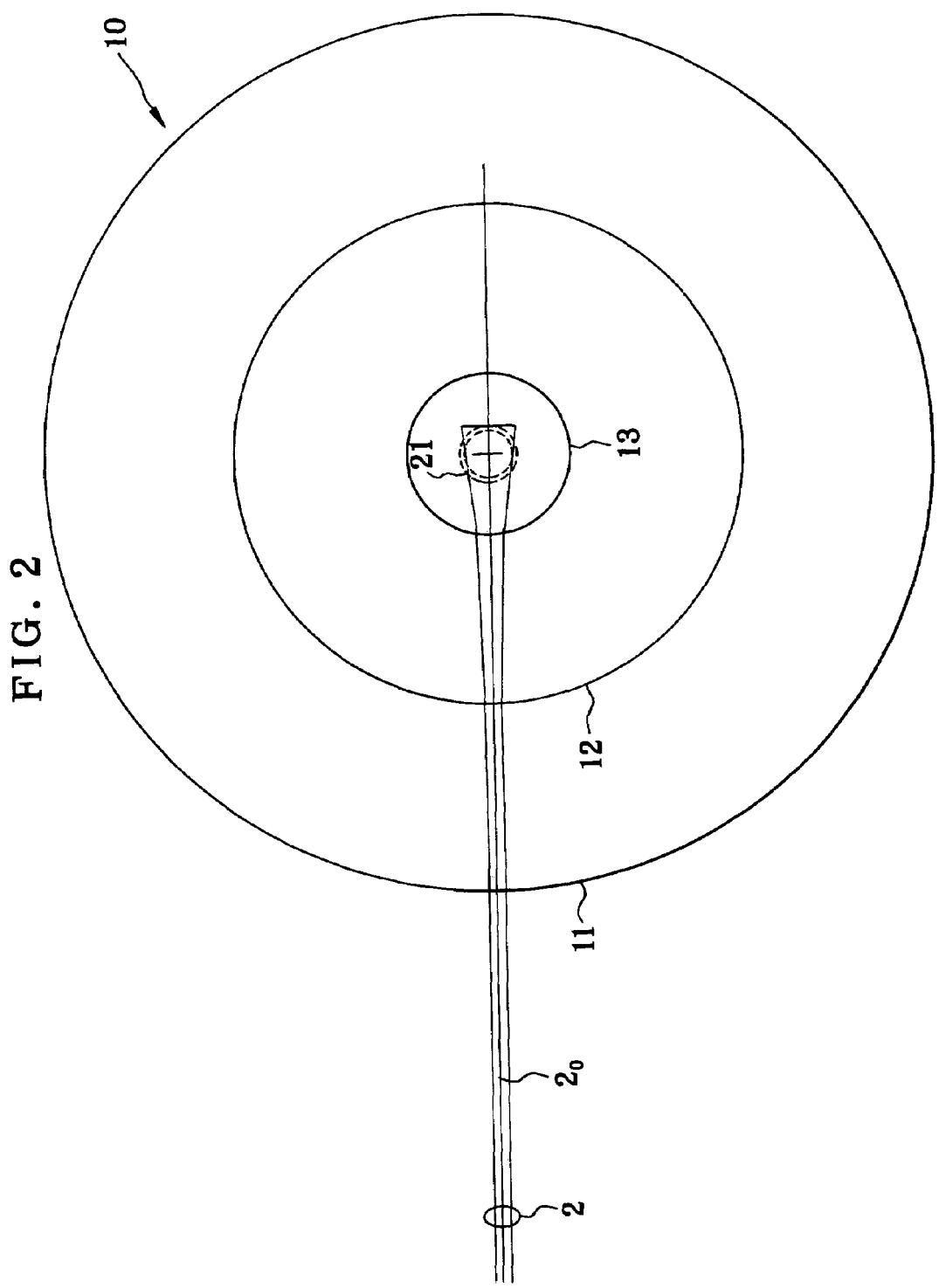
FIG. 2 is a plan view of an optical path through the panoramic attachment optical system of Example 1.

FIG. 1 is a sectional view of the panoramic attachment optical system according to Example 1, described later, taken along the center axis (the axis of rotational symmetry), as attached to the entrance side of an image-formation lens (ideal lens), and FIG. 2 is a plan view of an optical path through the panoramic attachment optical system. The panoramic attachment optical system of the invention is now explained more specifically with reference to FIGS. 1 and 2.

A panoramic attachment optical system 10 of the invention is attached to the entrance side of an image-formation lens 20 to form, for instance, a full 360°-direction (full-panoramic) image on an image plane 30 for capturing that image. The panoramic attachment optical system 10 is made up of a transparent medium rotationally symmetric about a center axis 1, and includes at least one internal reflecting surface 12 (one in FIG. 1) and at least two refracting surfaces 11 and 13. As the center axis 1 lies in the vertical direction, it allows a center light beam 2 coming from far away in the horizontal direction to enter the transparent medium of the panoramic attachment optical system 10 via the refracting surface 11 that is an entrance surface, reflect at the internal reflecting surface 12 (in the embodiment of FIG. 1 using one internal reflecting surface 12, there is one reflection), leaving the panoramic attachment optical system 10 through the refracting surface 13 that is an exit surface, and enter the image-formation lens 20 via a stop 21, forming an image at a radially given position of the image plane 30 off the center axis 1. The panoramic attachment optical system 10 is of rotationally symmetric shape about the center axis 1, and this goes for the refracting surfaces 11, 13 and the internal reflecting surface 12, too.

In the panoramic attachment optical system 10, light beams 2, 3U and 3L coming from far away (3U is a light beam coming from a distant place in the sky and 3L is a light beam coming from a distant place on the ground) pass through the reflecting surface and the refracting surfaces positioned on only one side with respect to the center axis 1. Such being the arrangement, shading of effective light beams passing through the panoramic attachment optical system 10, one particularly caused by interference with some portion of the reflecting surface, is easily avoidable to ensure a large angle of view in the direction of the center axis 1.

Further, the panoramic attachment optical system 10 of the invention is designed such that the light beams 2, 3U and 3L coming from far away form an image at least one time in a section including the axis 1 of rotational symmetry in FIG. 1 (in the embodiment of FIG. 1 they form an image one time at or near a position 4 in the transparent medium), but there is no image formation in a plane (FIG. 2) that is orthogonal to that section and includes a center light ray $2_0$ of the center light beam 2. This is the result of the arrangement where the light beams 2, 3U and 3L coming from far away pass through the reflecting surface and refracting surfaces positioned on only one side with respect to the center axis 1. Because in the section including the axis 1 of rotational symmetry, there is at least one image-formation by the light beams 2, 3U and 3L coming from far away so that the image (entrance pupil) of the stop 21 for the image-formation lens 20, too, is formed in or near the panoramic attachment optical system 10 (in the embodiment of FIG. 1, that image is formed at or near a position 5 in the transparent medium), the diameter of the light beams in the section including the axis 1 of rotational symmetry of the panoramic attachment optical system 10 can be reduced good enough to reduce the effective diameter per se of the panoramic attachment optical system 10.

In addition, it is possible to form the image (entrance pupil) of the stop 21 for the image-formation lens 20 at or near the entrance surface 11 of the panoramic attachment optical system 10, to keep flare or ghost-inducing unnecessary light against entering the panoramic attachment optical system 10 from a direction primarily along the axis 1 of rotational symmetry, and to view or pickup up an image with reduced flares.

With a back-surface mirror applied as the internal reflecting surface 12 in the panoramic attachment optical system 10 of the invention, it is possible to minimize the amount of aberrations produced.

It is preferable to set the angle of incidence of light on each internal reflecting surface 12 at 45° or smaller because it is likely to produce decentration aberrations.

In this connection, an account is now given of relations among the number of reflections in the panoramic attachment optical system 10, the number of image formations in the section including the axis 1 of rotational symmetry and the image formed on the image plane 30. When, in the section including the axis 1 of rotational symmetry, the number of image formations is one or an odd number and the number of reflections is one or an odd number as in the embodiment of FIG. 1, an image formed on the image plane 30 takes on a circle whose zenithal direction lies in the center direction of the image and whose horizon lies outside, as is the case with an image taken by a fisheye lens. When the number of image formations is two or an even number and the number of reflections is one or an odd number, on the contrary, an image formed on the image plane 30 takes on a circle whose zenithal direction turns away from the center of the image and whose horizon lies inside. When the number of image formations is two or an even number and the number of reflections is one or an odd number, an image formed on the image plane 30 takes on a circle whose zenithal direction turns away from the center of the image and whose horizon lies inside. When the number of image formations is two or an even number and the number of reflections is two or an even number, there is an image in the form of a circle whose zenithal direction turns away from the center direction of the image and whose horizon lies outside. Therefore, especially when there is an image in the form of a circle whose zenithal direction turns away from the center of the image and whose horizon lies inside, that image must be electronically processed and converted into an image whose zenithal direction lies in the center direction of the image and whose horizon lies outside. Otherwise, the resulting image will become a mirror image of an actual full-direction image.

It is noted, however, that the foregoing applies to the image plane 30 looking up at the zenithal direction. When the image plane 30 lies looking down at the group as is typically the case with Example 7 of FIG. 19, the zenithal direction and the horizon reverse in position with respect to the center of the image plane 30, with no change in the normal and mirror images of the image formed on the image plane 30.

Examples 1 to 14 of the panoramic attachment optical system according to the invention are now explained; however, the constructional parameters of these panoramic attachment optical systems will be given later. The constructional parameters of such examples have been determined as a result of normal ray tracing from an object plane at infinity to the image plane 30 via the panoramic attachment optical system 10 and the image-formation lens 20 comprising an ideal lens, as typically illustrated in FIG. 1.

Figure 3:
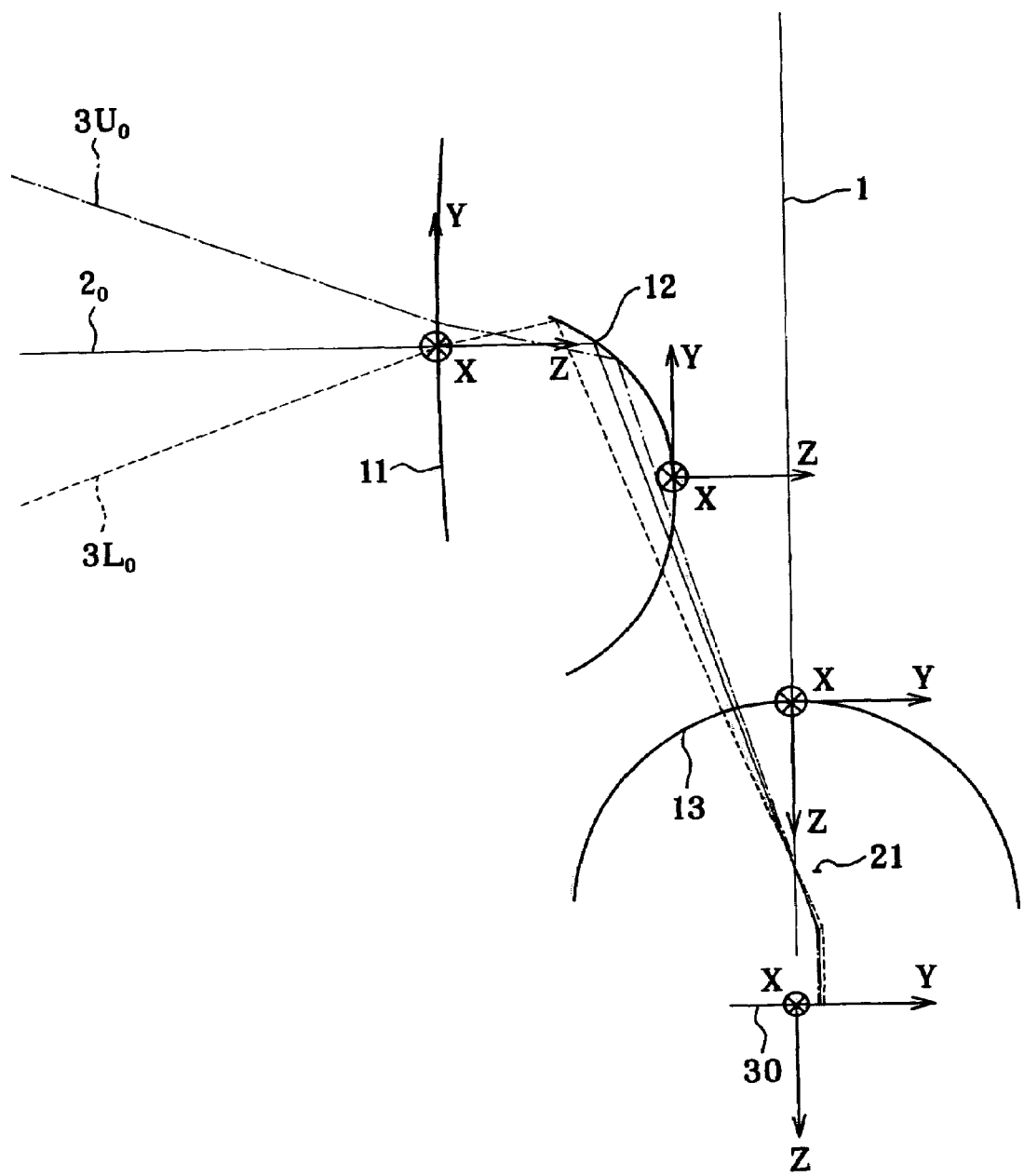
FIG. 3 is illustrative of coordinate systems for defining the surfaces in the panoramic attachment optical system of Example 1.

Referring first to Examples 1 to 5, assume that, in normal ray tracing as shown typically in FIG. 3, the origin of a decentered optical surface in a decentered optical system is defined by the center of the image plane 30, the Z-axis positive direction is defined by a direction of the axis 1 of rotational symmetry (center axis) along the direction of propagation of light, and the Y-Z plane is defined by the paper plane of FIG. 1. Further, the Y-axis positive direction is defined by the direction of travel of light from an infinite object surface in the paper of FIG. 1, and the X-axis positive direction is defined by an axis that forms with the Y- and Z-axes a right-handed orthogonal coordinate system.

For a decentered surface are the amount of decentration from the center of the origin of the aforesaid optical system on a coordinate system on which that surface is defined (X, Y and Z are indicative of the X-axis direction, the Y-axis direction, and the Z-axis direction, respectively), and the angles of tilt ($\alpha$, $\beta$, $\gamma$ (°)) of the coordinate systems for defining the surfaces with the centers on the X-, Y- and Z-axes, respectively. In that case, the positive for $\alpha$ and $\beta$ mean counterclockwise rotation with respect to the positive directions of the respective axes, and the positive for $\gamma$ means clockwise rotation with respect to the positive direction of the Z-axis. Referring here to how to perform $\alpha$-, $\beta$- and $\gamma$-rotations of the center axis of the surface, the coordinate system that defines each surface is first $\alpha$-rotated counterclockwise about the X-axis of the coordinate system that is defined at the origin of the optical system. Then, the coordinate system is $\beta$-rotated counterclockwise about the Y-axis of the rotated new coordinate system. Finally, the coordinate system is $\gamma$-rotated clockwise about the Z-axis of the rotated new another coordinate system.

When, of optical surfaces forming the optical system of each example, a specific surface and the subsequent surface form together a co-axial optical system, there is given a surface spacing. Besides, the radius of curvature of each surface and the refractive index and Abbe constant of the medium are given as usual.

It is noted that the term with respect to aspheric surfaces on which no data are mentioned in the constructional parameters, given later, is zero. Refractive indices and Abbe constants are given on a d-line (587.56 nm wavelength) basis, and length in mm. The decentration of each surface is given in terms of the amount of decentration from the image plane 30.

In this conjunction, an aspheric surface is a rotationally symmetric aspheric surface given by the following defining formula:

$$Z=(Y^2/R)/[1+\{1-(1+k)Y^2/R^2\}^{1/2}]+aY^4+bY^6+cY^8+dY^{10}+ \quad (a)$$

Here, Z is an optical axis (axial chief ray) provided that the direction of propagation of light is taken as positive, Y is a direction vertical to that optical axis, R is a paraxial radius of curvature, k is a conical coefficient, and a, b, c, d are the fourth-, sixth-, eighth-, tenth-order aspheric coefficients, respectively. The Z-axis in this defining formula becomes the axis of the rotationally symmetric aspheric surface.

Toric surfaces include an X-toric surface and a Y-toric surface defined by the following defining formulae, respectively. It is noted that a straight line that passes through the origin of a surface shape and is vertical to an optical surface becomes the axis of the toric surface. Taking an XYZ orthogonal coordinate system with respect to the origin of the surface shape, the X-toric surface is given by $$F(X)=Cx\cdot X^2/[1+\{1-(1+k)Cx^2\cdot X^2\}^{1/2}]+aX^4+bX^6+cX^8+dX^{10}$$

$$Z=F(X)+(\tfrac{1}{2})Cy\{Y^2+Z^2-F(X)^2\} \quad (b)$$

The curve F(X) is rotated about an axis that passes through the center of the Y-axis direction curvature Cy in the Z-axis direction and is parallel with the X-axis. As a result, that surface becomes an aspheric surface in the X-Z plane, and a circle in the Y-Z plane, respectively.

The Y-toric surface is given by $$F(Y) = Cy \cdot Y^2 / [1 + \{1 - (1+k)Cy^2 \cdot Y^2\}^{1/2}] + aY^4 + bY^6 + cY^8 + dY^{10}$$

$$Z = F(Y) + (1/2)Cx\{X^2 + Z^2 - F(Y)^2\} \quad (c)$$

The curve F(Y) is rotated about an axis that passes through the center of the X-axis direction curvature Cx in the Z-axis direction and is parallel with the Y-axis. As a result, that surface becomes an aspheric surface in the Y-Z plane, and a circle in the X-Z plane, respectively.

Here, Z is the amount of displacement of the surface shape from a tangent plane with respect to the origin, Cx is the X-axis direction curvature, Cy is the Y-axis direction curvature, K is a conical coefficient, and a, b, c, d are aspheric coefficients. Among the X-axis direction radius of curvature Rx, the Y-axis direction radius of curvature Ry and the curvatures Cx, Cy, there are relationships:

$$Rx = 1/Cx, \; Ry = 1/Cy$$

For a better understanding of the coordinate systems that define the surfaces in the following Examples 1 to 5, they are separately shown in FIGS. 3, 6, 9, 12 and 15, wherein $3U_0$ stands for the center ray of the light beam 3U coming from a distant plance in the sky, and $3L_0$ represents the center ray of the light beam 3L coming from a distant place on the ground.

Figure 16:
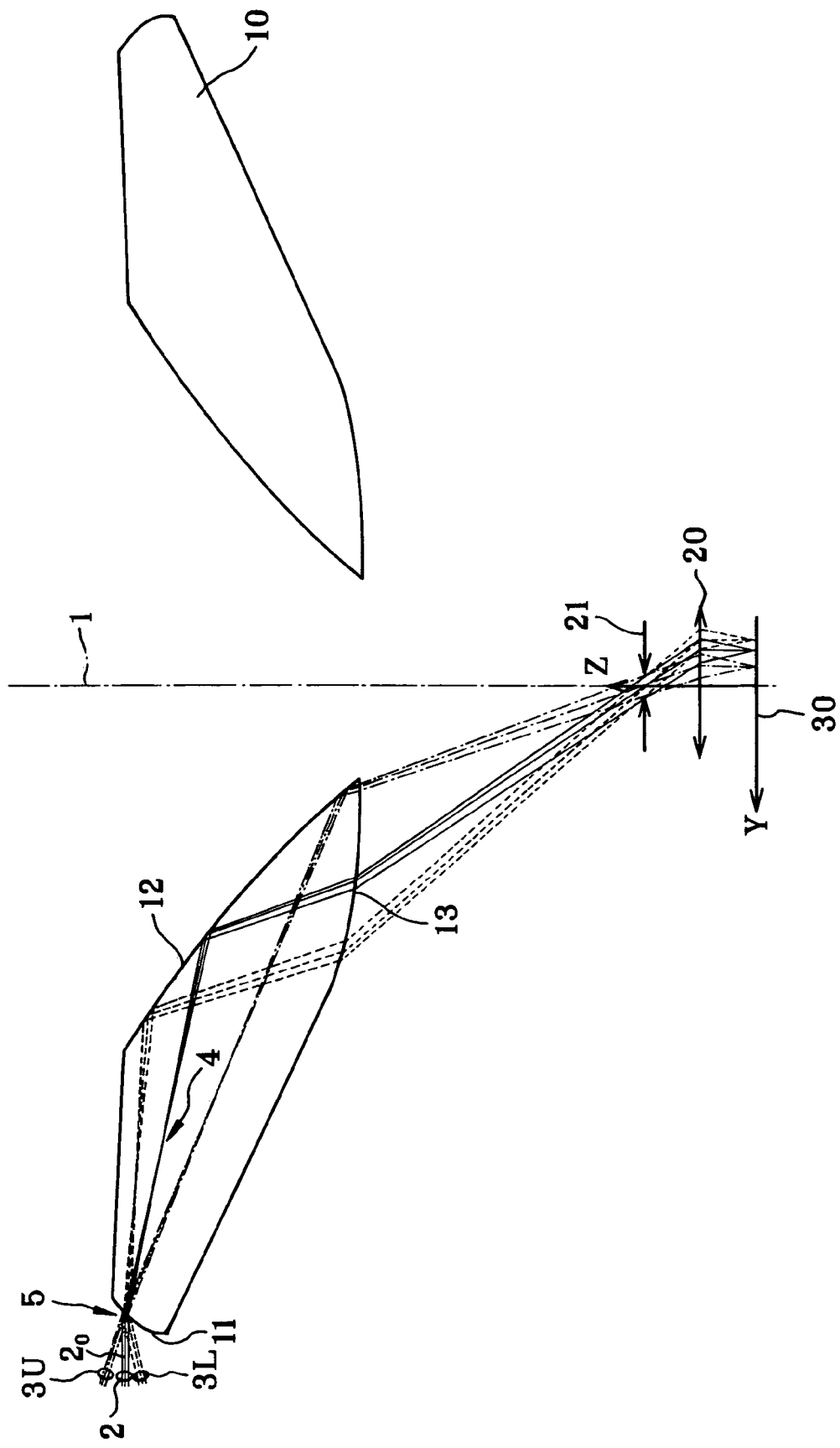
FIG. 16 is a Y-Z sectional view including the axis of rotational symmetry of the panoramic attachment optical system of Example 6 according to the invention, as attached to the entrance side of an image-formation lens.

Regarding Examples 6 and 11 of Examples 6 to 14, normal ray tracing is carried out assuming that the origin of a decentered optical surface in a decentered optical system is defined by the center of the image plane 30, the Z-axis positive direction is defined by a direction of the axis 1 of rotational symmetry (center axis) opposite to a direction along the direction of propagation of light, and the Y-Z plane is defined by the paper plane of FIG. 16 (Ex. 6). Further, the X-axis positive direction is defined by a direction opposite to the direction of propagation of light from an infinite object plane in the paper plane of FIG. 6, and the X-axis positive direction is defined by an axis that forms with the Y- and Z-axes a right-handed orthogonal coordinate system. In other words, the positive and negative of the Y-axis and X-axis are opposite to those in Examples 1 to 5. Regarding Examples 7-10 and 12-15, the X-, Y- and Z-axes are defined as in Examples 1 to 5.

When, of optical surfaces forming the optical system of each example, a specific surface and the subsequent surface form together a co-axial optical system, there is given a surface spacing. Besides, the radius of curvature of each surface and the refractive index and Abbe constant of the medium are given as usual.

It is noted that the term with respect to aspheric surfaces on which no data are mentioned in the constructional parameters, given later, is zero. Refractive indices and Abbe constants are given on a d-line (587.56 nm wavelength) basis, and length in mm. The decentration of each surface is given in terms of the amount of decentration from the image plane 30.

It is also noted that the aspheric surface is a rotationally symmetric one given by the aforesaid defining formula (a).

A Y-rotation free-form surface is here defined by the following defining formula (d).

$$R(Y) = C_1 + C_2 Y^2 + C_3 Y^2 + C_4 Y^3 + C_5 Y^4 + C_6 Y^5 + C_7 Y^6 \ldots + C_{21} Y^{20} + \ldots C_{n+1} Y^n$$

$$Z = \pm R(Y)[1 - [X/R(Y)]^2]^{1/2} \quad (d)$$

This Y-rotation free-form surface is a rotationally symmetric surface that is obtained by rotation of the curve R(Y) about the Y-axis. As a result, that surface becomes a free-form surface (free-form curve) in the Y-Z plane, and a circle with a radius $|C_1|$ in the X-Z plane, respectively.

EXAMPLE 1

FIG. 1 is a Y-Z sectional view including an axis 1 of rotational symmetry (center axis) of a panoramic attachment optical system 10, as attached to the entrance side of an image-formation lens (ideal lens) 20, and FIG. 2 is a plan view of an optical path through the panoramic attachment optical system 10. FIG. 3 is illustrative of coordinate systems that define surfaces 11, 12 and 13.

The panoramic attachment optical system 10 is attached to the entrance side of the image-formation lens 20 composed of an ideal lens to form on an image plane 30 an image, for instance, a full 360°-direction (full-panoramic) image in the form of a circle whose zenithal direction lies in the center direction of the image and whose horizon lies outside. The panoramic attachment optical system is made up of a transparent medium having one internal reflecting surface 12 that is rotationally symmetric about the center axis 1 and is composed of a Y-toric surface, an entrance (refracting) surface 11 composed of a Y-toric surface and an exit (refracting) surface 13 composed of a spherical surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects one time at the internal reflecting surface 12, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surface 12 and the refracting surfaces 11, 13 positioned on only one side of the center axis 1 in the panoramic attachment optical system 10. Light beams 2, 3U and 3L coming from far away form an image one time at or near a position 4 in the section of FIG. 1 including the rotationally symmetric axis 1, but they do not form any image in a plane (FIG. 2) that is orthogonal to that section and includes a center ray $2_0$ of the center light beam 2. An image (entrance pupil) of the stop 21 for the image-formation lens 20 is formed at or near a position 5 in the panoramic attachment optical system 10.

The specifications of Example 1 are:
Focal length of the ideal lens 20: 3.5 mm,
Horizontal angle of view: 360°,
Vertical angle of view: ±20°,
Entrance pupil diameter: 0.191 mm, and
Image size: φ2.42 to φ3.07 mm.

EXAMPLE 2

Figure 4:
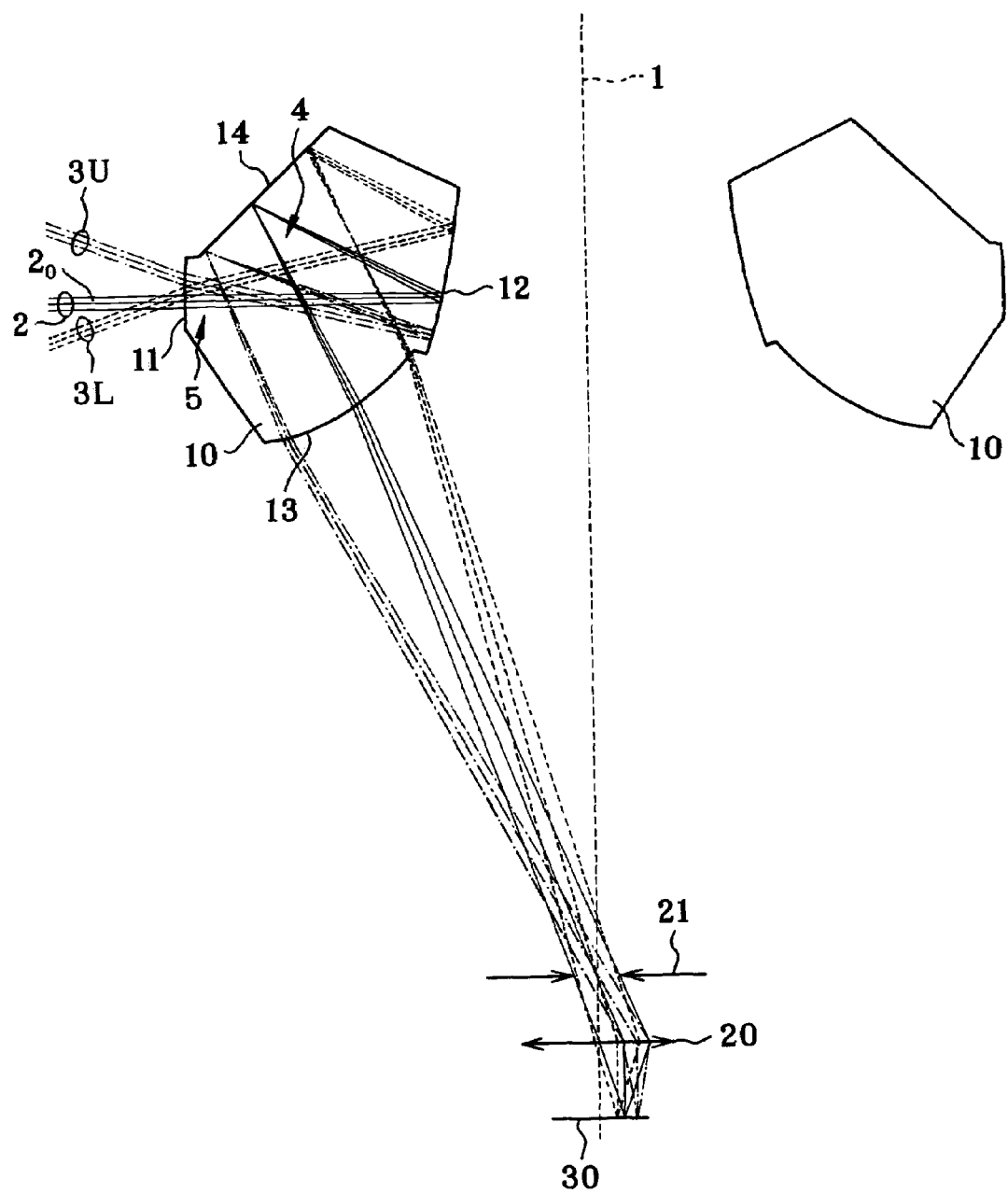
FIG. 4 is a view, as in FIG. 1, but with the panoramic attachment optical system of Example 2 according to the invention.
Figure 5:
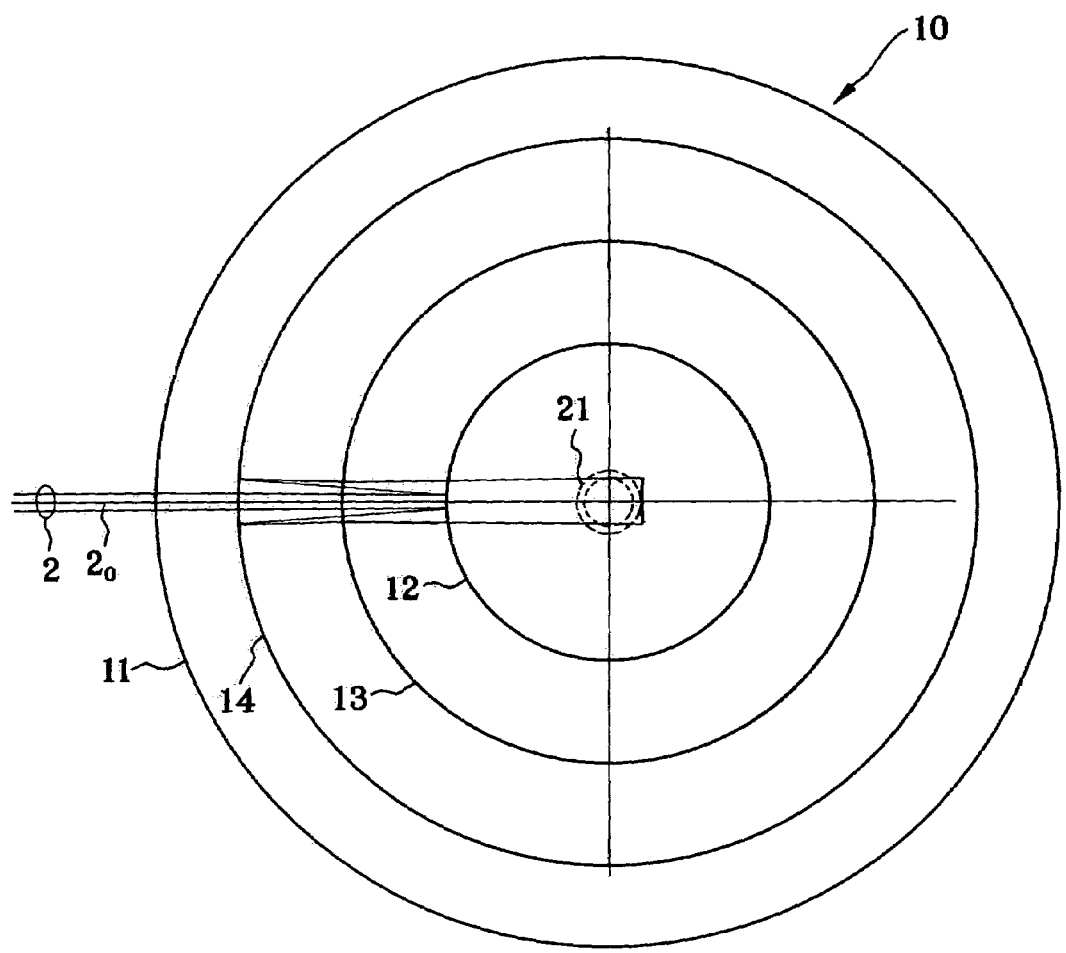
FIG. 5 is a view, as in FIG. 2, but with the panoramic attachment optical system of Example 2.
Figure 6:
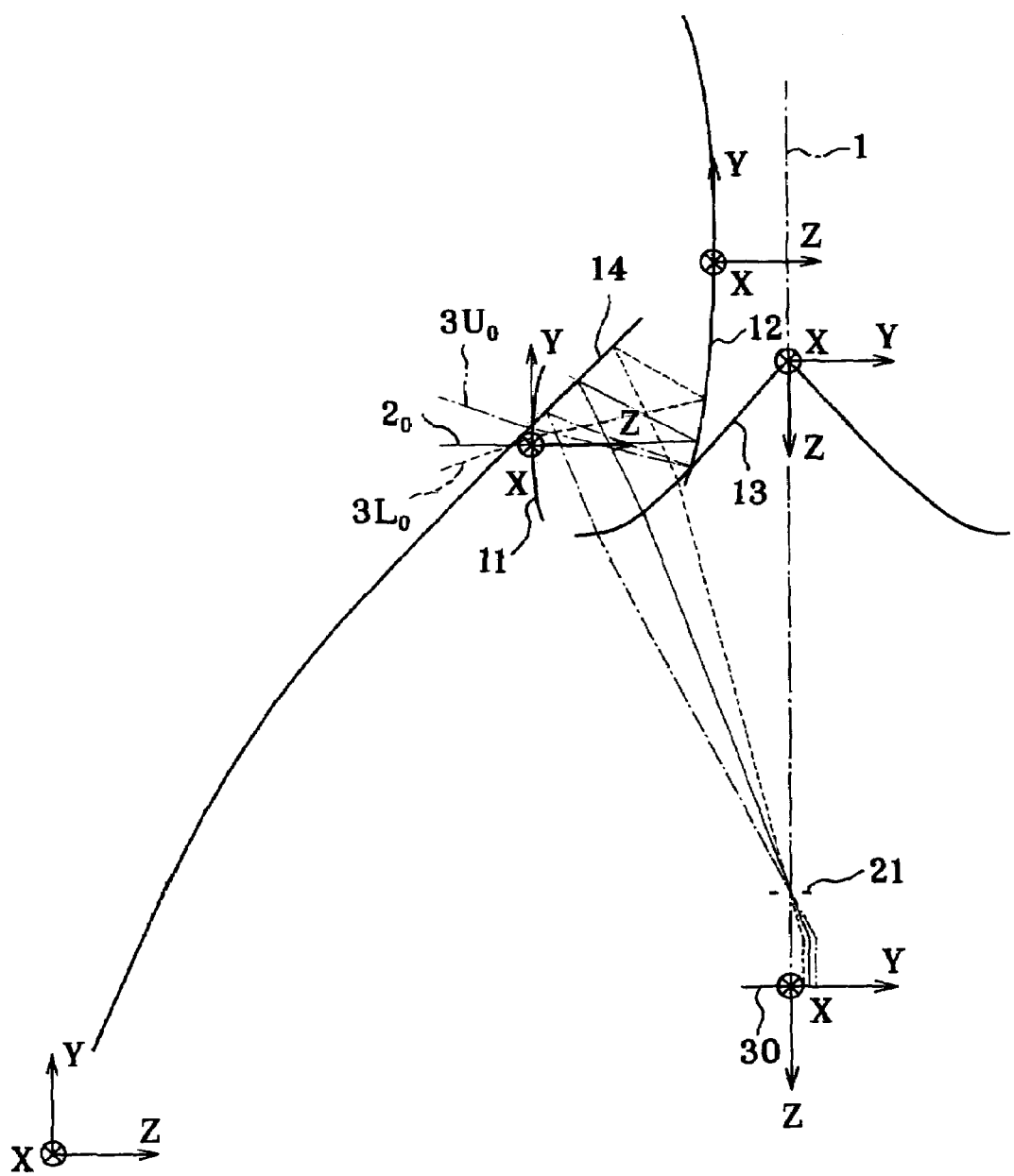
FIG. 6 is a view, as in FIG. 3, but with the panoramic attachment optical system of Example 2.

FIGS. 4, 5 and 6 for the panoramic attachment optical system 10 of Example 2 are similar to FIGS. 1, 2 and 3.

The panoramic attachment optical system 10 is attached to the entrance side of an image-formation lens 20 composed of an ideal lens to form on an image plane 30 an image, for instance, a full 360°-direction (full-panoramic) image in the form of a circle whose zenithal direction turns away from the center of the image and whose horizon lies inside. The panoramic attachment optical system is made up of a transparent medium having two internal reflecting surfaces 12 and 14 that are each rotationally symmetric about a center axis 1 and composed of a Y-toric surface, an entrance (refracting) surface 11 composed of a Y-toric surface and an exit (refracting) surface 13 composed of an aspheric surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects successively at the internal reflecting surfaces 12 and 14, one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14 and the refracting surfaces 11, 13 positioned on only one side of the center axis 1 in the panoramic attachment optical system 10. Light beams 2, 3U and 3L coming from far away form an image one time at or near a position 4 in the section of FIG. 4 including the rotationally symmetric axis 1, but they do not form any image in a plane (FIG. 8) that is orthogonal to that section and includes a center ray $2_0$ of the center light beam 2. An image (entrance pupil) of the stop 21 for the image-formation lens 20 is formed at or near a position 5 in the panoramic attachment optical system 10.

The specifications of Example 2 are:
Focal length of the ideal lens 20: 3.5 mm,
Horizontal angle of view: 360°,
Vertical angle of view: ±20°,
Entrance pupil diameter: 0.587 mm, and
Image size: φ1.85 to φ3.69 mm.

EXAMPLE 3

Figure 7:
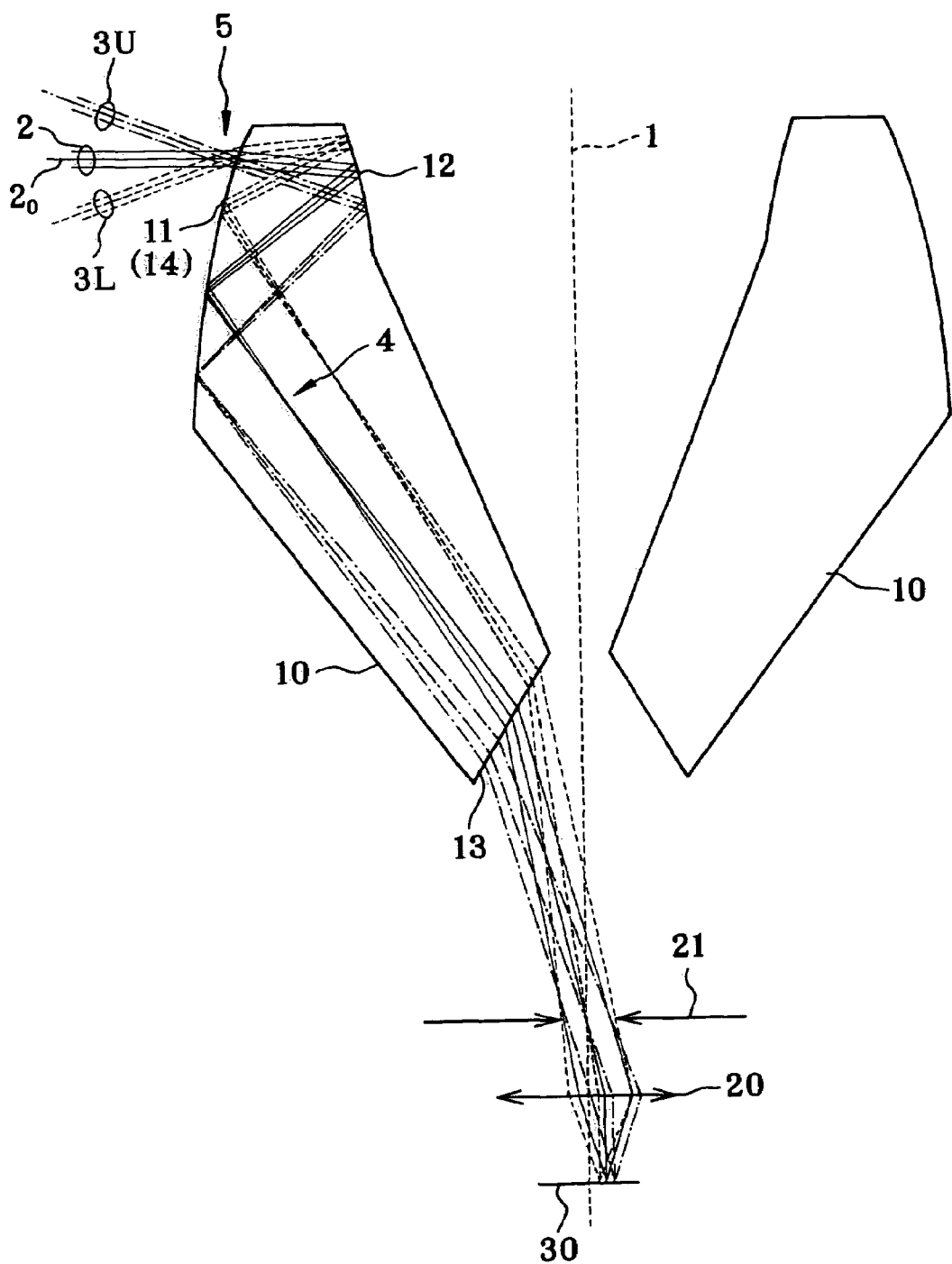
FIG. 7 is a view, as in FIG. 1, but with the panoramic attachment optical system of Example 3 according to the invention.
Figure 8:
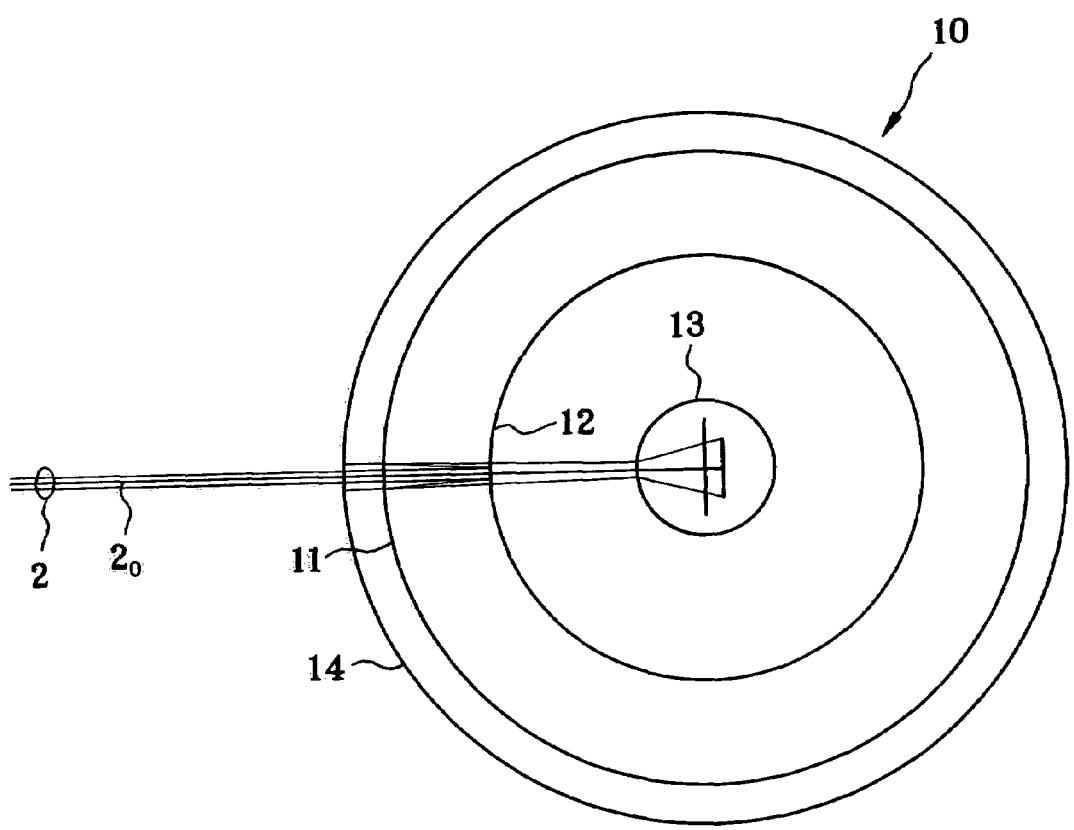
FIG. 8 is a view, as in FIG. 2, but with the panoramic attachment optical system of Example 3.
Figure 9:
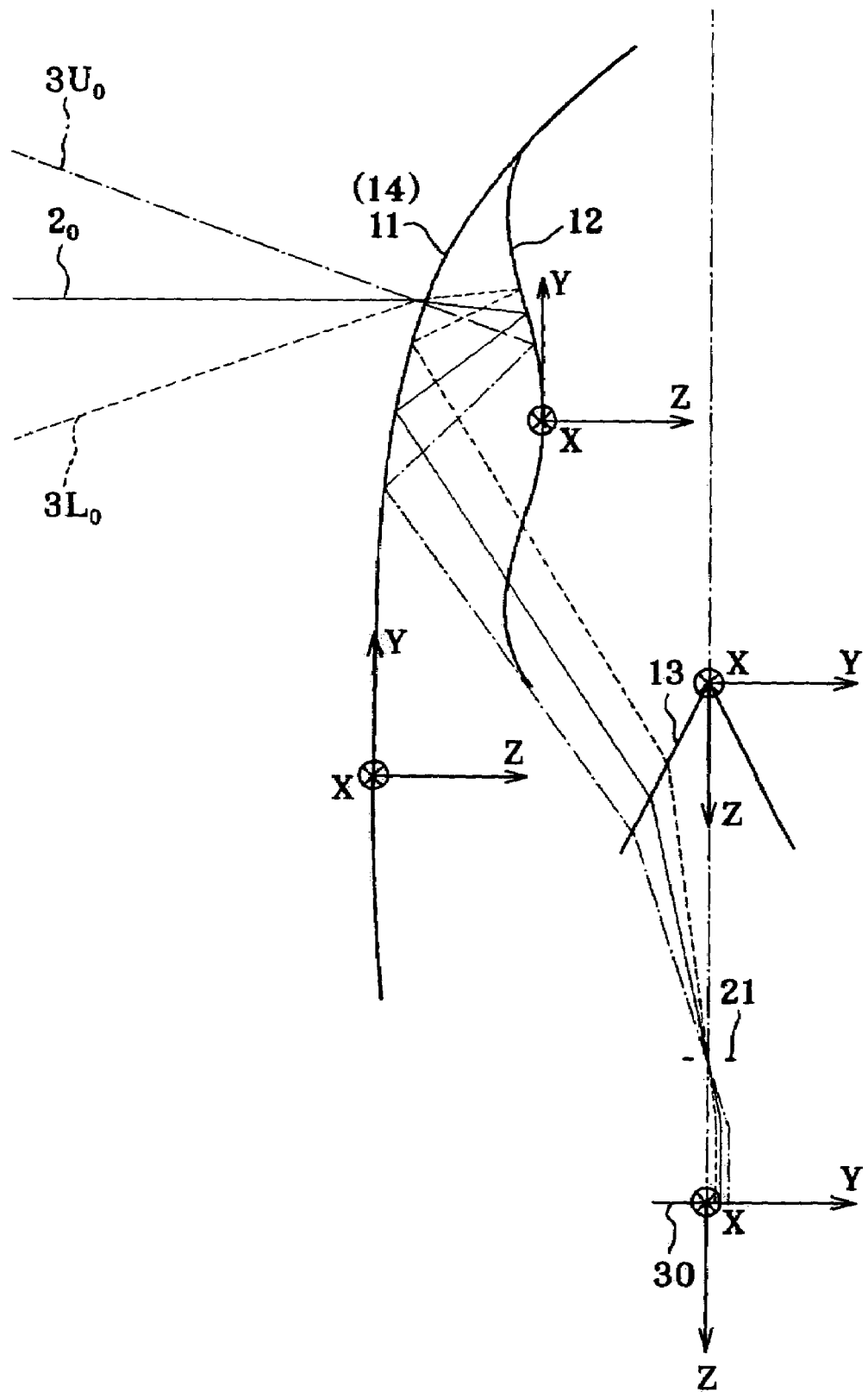
FIG. 9 is a view, as in FIG. 3, but with the panoramic attachment optical system of Example 3.

FIGS. 7, 8 and 9 for the panoramic attachment optical system 10 of Example 3 are similar to FIGS. 1, 2 and 3.

The panoramic attachment optical system 10 is attached to the entrance side of an image-formation lens 20 composed of an ideal lens to form on an image plane 30 an image, for instance, a full 360°-direction (full-panoramic) image in the form of a circle whose zenithal direction turns away from the center of the image and whose horizon lies inside. The panoramic attachment optical system is made up of a transparent medium comprising one internal reflecting surface 12 that is rotationally symmetric about a center axis 1 and is composed of a Y-toric surface, a surface that acts as an entrance (refracting) surface 11 composed of a Y-toric surface and also as an internal reflecting surface 14, and an exit (refracting) surface 13 composed of an aspheric surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects successively at the internal reflecting surface 12 and the internal reflecting surface 14 that acts also as the refracting surface 11, one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14 and the refracting surfaces 11, 13 positioned on only one side of the center axis 1 in the panoramic attachment optical system 10. Light beams 2, 3U and 3L coming from far away form an image one time at or near a position 4 in the section of FIG. 7 including the rotationally symmetric axis 1, but they do not form any image in a plane (FIG. 8) that is orthogonal to that section and includes a center ray $2_0$ of the center light beam 2. An image (entrance pupil) of the stop 21 for the image-formation lens 20 is formed at or near an aerial position 5 at or near the refracting surface 11 in the panoramic attachment optical system 10.

The specifications of Example 3 are:
Focal length of the ideal lens 20: 3.5 mm,
Horizontal angle of view: 360°,
Vertical angle of view: ±20°,
Entrance pupil diameter: 0.571 mm, and
Image size: φ0.958 to φ2.331 mm.

EXAMPLE 4

Figure 10:
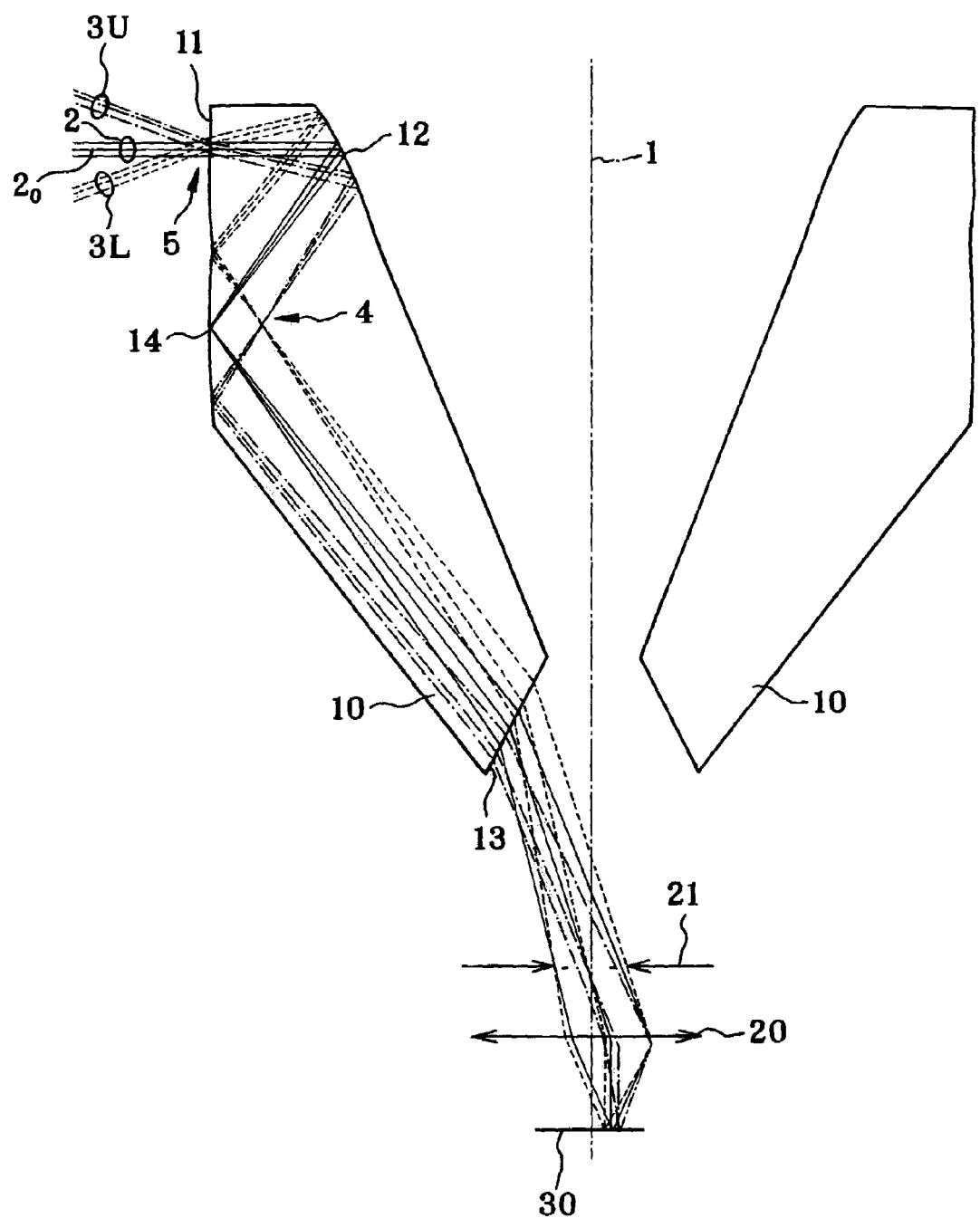
FIG. 10 is a view, as in FIG. 1, but with the panoramic attachment optical system of Example 4 according to the invention.
Figure 11:
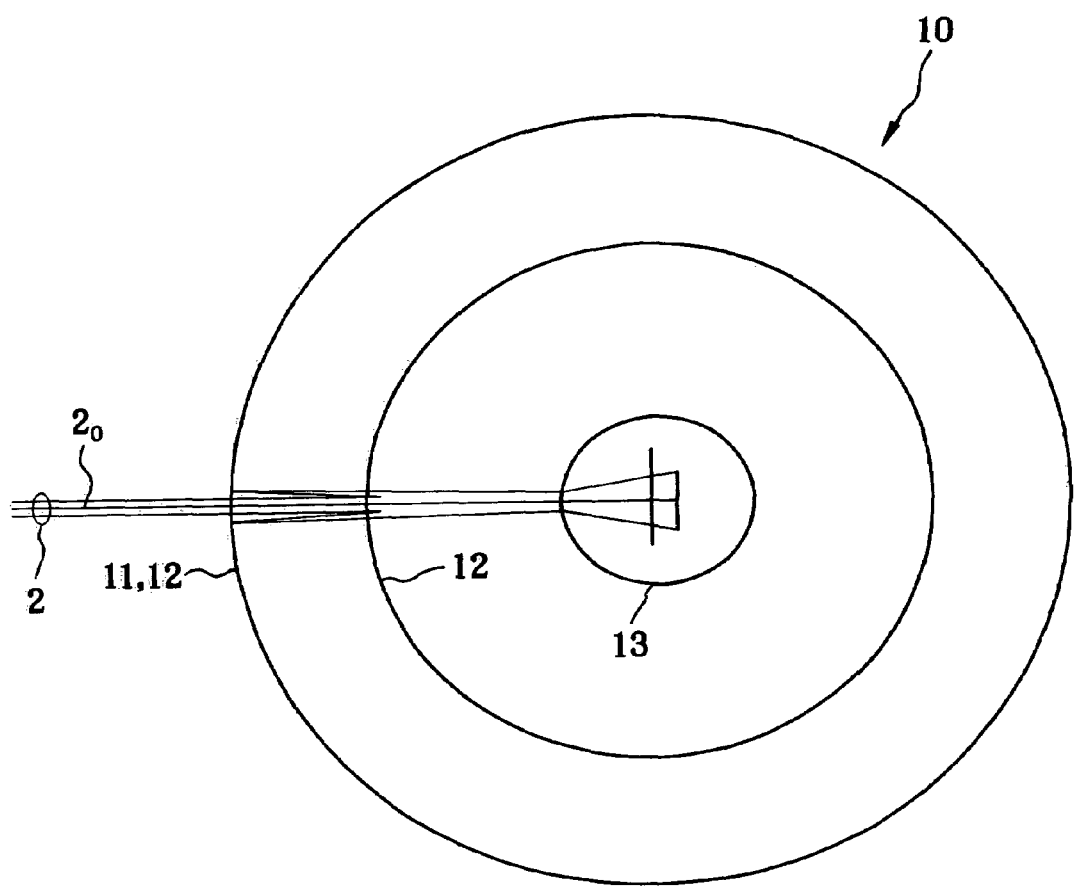
FIG. 11 is a view, as in FIG. 2, but with the panoramic attachment optical system of Example 4.
Figure 12:
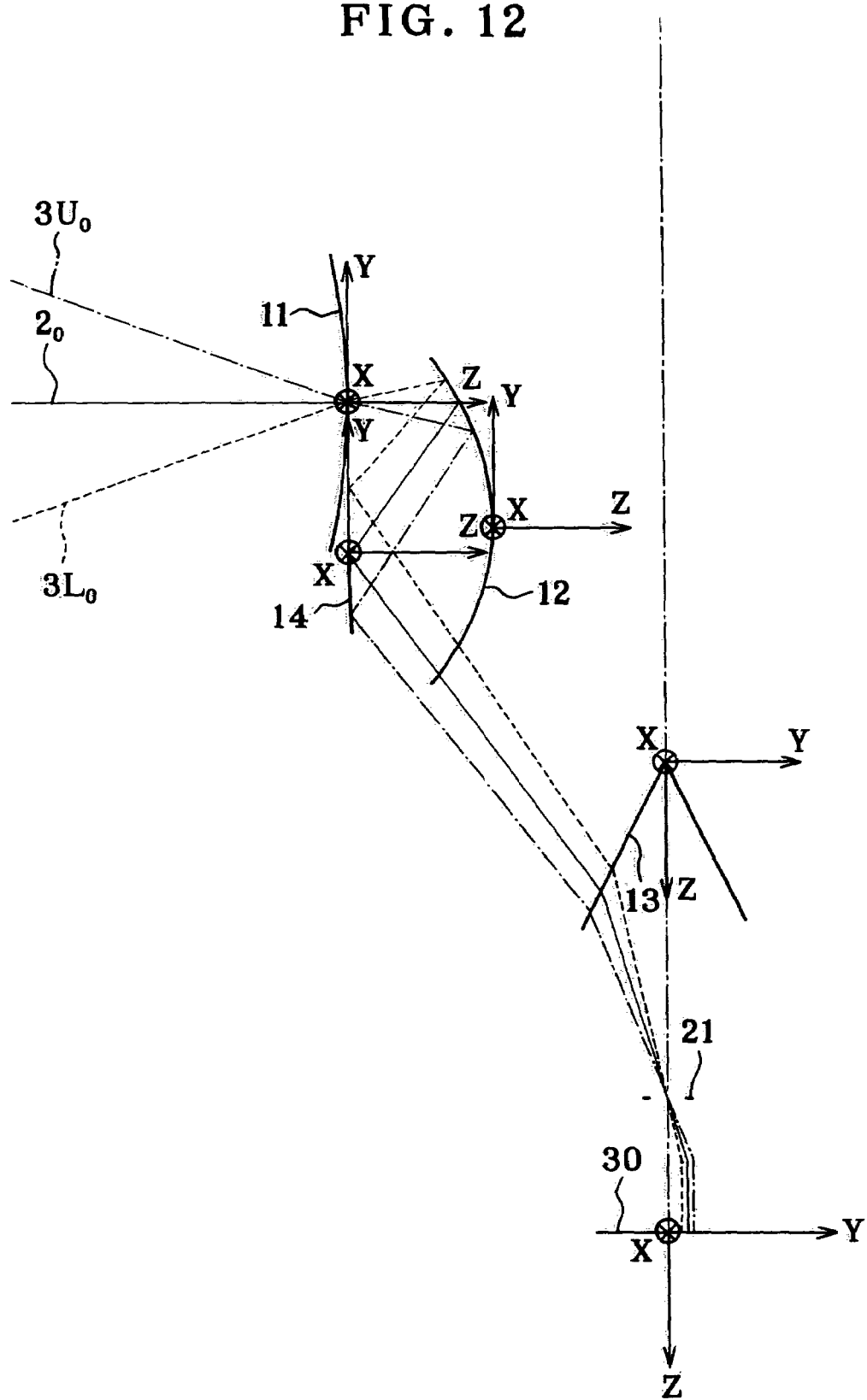
FIG. 12 is a view, as in FIG. 3, but with the panoramic attachment optical system of Example 4.

FIGS. 10, 11 and 12 for the panoramic attachment optical system 10 of Example 4 are similar to FIGS. 1, 2 and 3.

The panoramic attachment optical system 10 is attached to the entrance side of an image-formation lens 20 composed of an ideal lens to form on an image plane 30 an image, for instance, a full 360°-direction (full-panoramic) image in the form of a circle whose zenithal direction turns away from the center of the image and whose horizon lies inside. The panoramic attachment optical system is made up of a transparent medium having two internal reflecting surfaces 12 and 14 that are each rotationally symmetric about a center axis 1 and composed of a Y-toric surface, an entrance (refracting) surface 11 composed of a Y-toric surface and an exit (refracting) surface 13 composed of an aspheric surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects successively at the internal reflecting surfaces 12 and 14 one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14 and the refracting surfaces 11, 13 positioned on only one side of the center axis 1 in the panoramic attachment optical system 10. Light beams 2, 3U and 3L coming from far away form an image one time at or near a position 4 in the section of FIG. 10 including the rotationally symmetric axis 1, but they do not form any image in a plane (FIG. 11) that is orthogonal to that section and includes a center ray $2_0$ of the center light beam 2. An image (entrance pupil) of the stop 21 for the image-formation lens 20 is formed at an aerial position 5 at or near an aerial position 5 at or near the refracting surface 11 in the panoramic attachment optical system 10.

The specifications of Example 4 are:
Focal length of the ideal lens 20: 3.5 mm,
Horizontal angle of view: 360°,
Vertical angle of view: ±20°,
Entrance pupil diameter: 0.614 mm, and
Image size: φ1.58 to φ2.78 mm.

EXAMPLE 5

Figure 13:
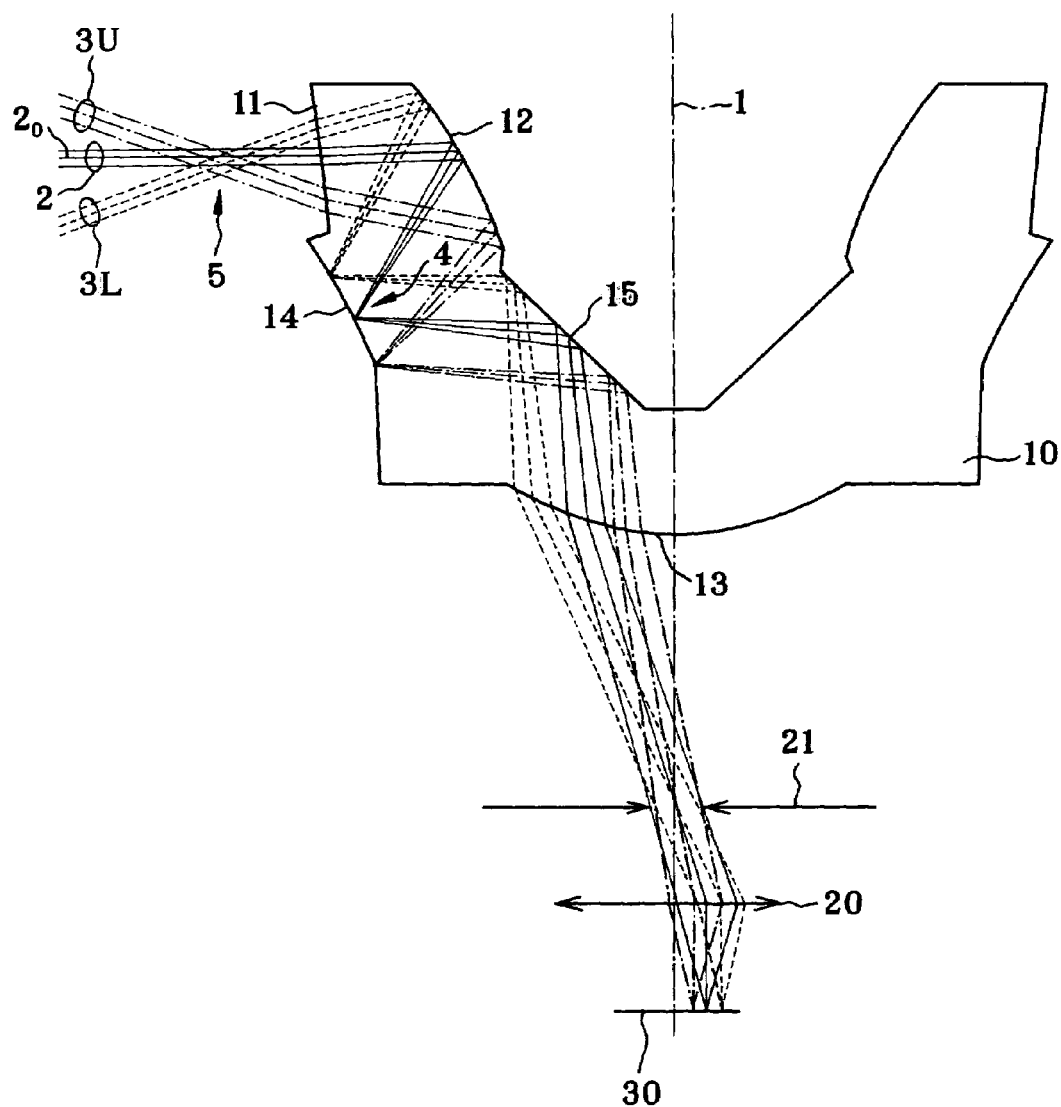
FIG. 13 is a view, as in FIG. 1, but with the panoramic attachment optical system of Example 5 according to the invention.
Figure 14:
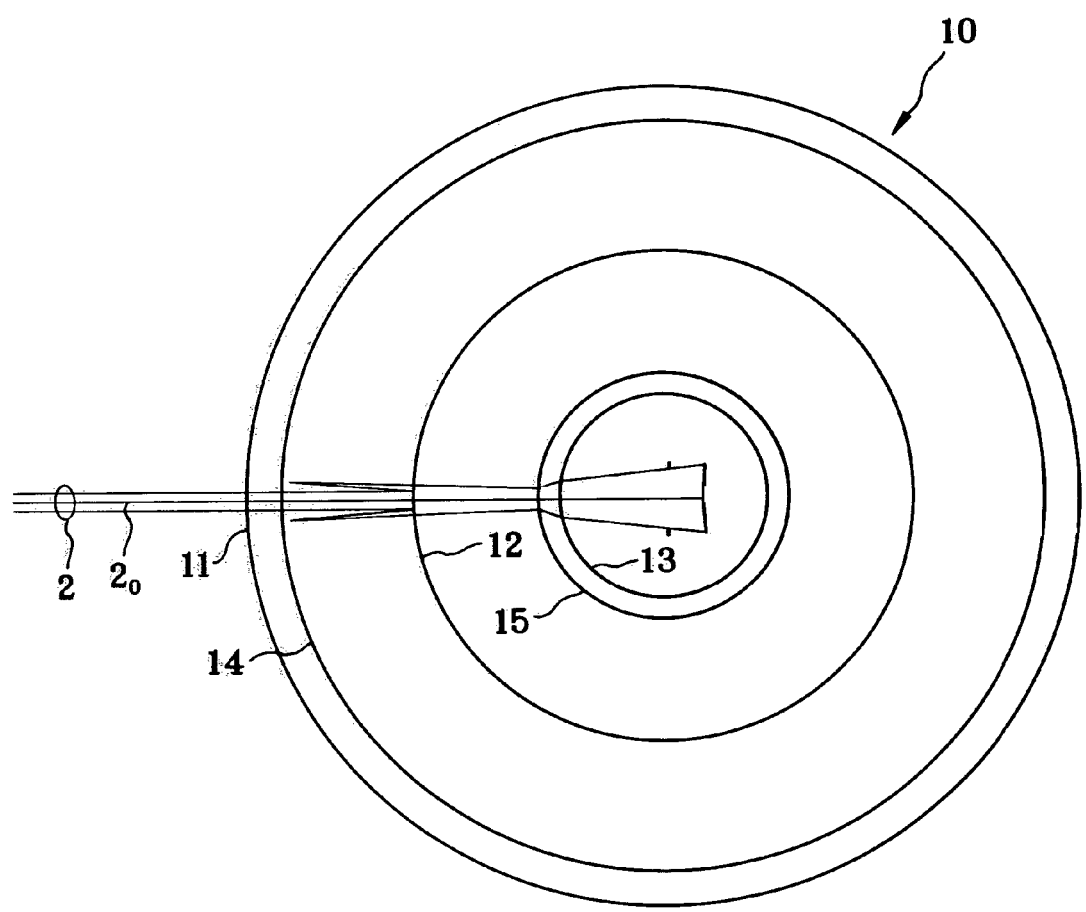
FIG. 14 is a view, as in FIG. 2, but with the panoramic attachment optical system of Example 5.
Figure 15:
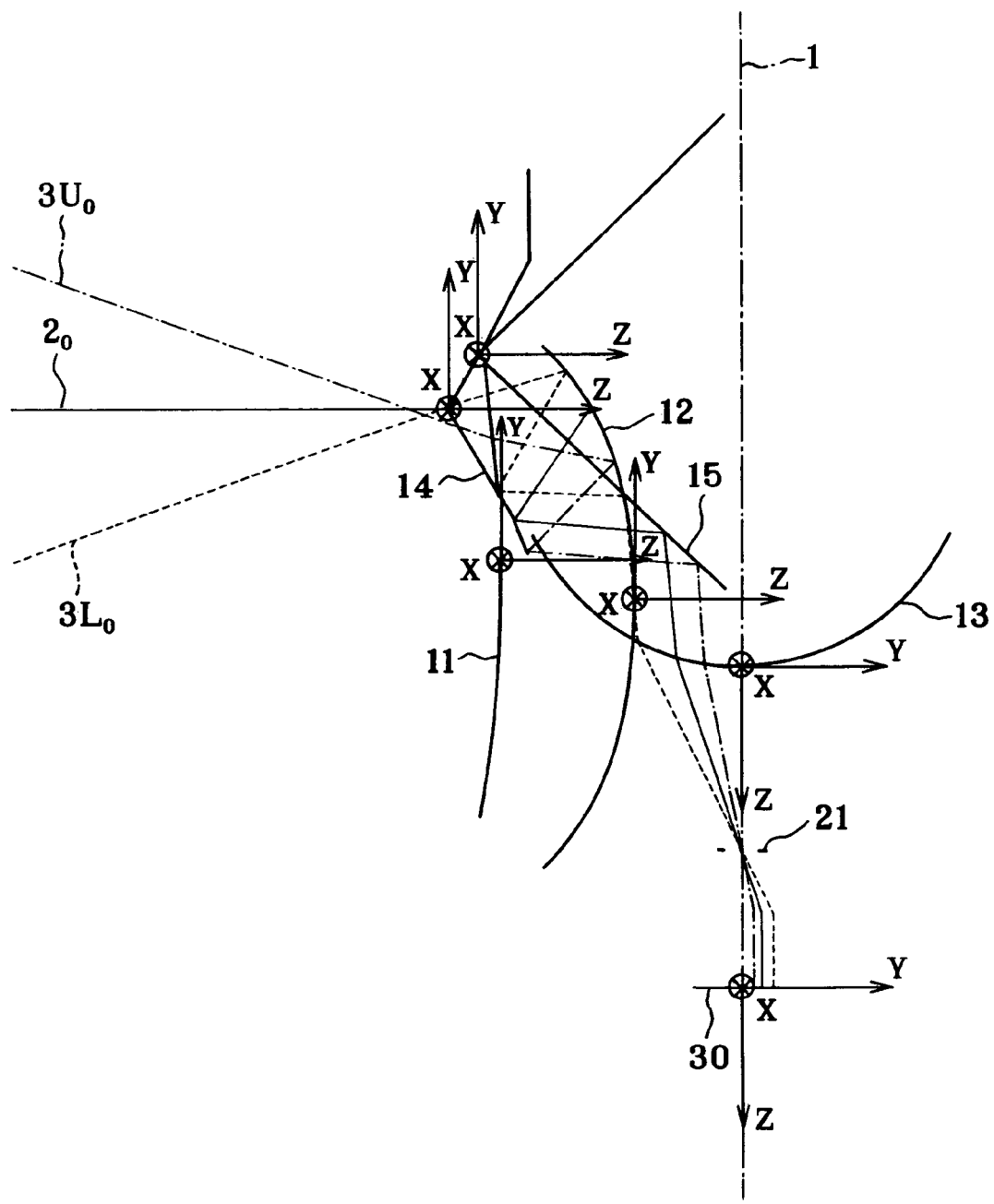
FIG. 15 is a view, as in FIG. 3, but with the panoramic attachment optical system of Example 5.

FIGS. 13, 14 and 15 for the panoramic attachment optical system 10 of Example 5 are similar to FIGS. 1, 2 and 3.

The panoramic attachment optical system 10 is attached to the entrance side of an image-formation lens 20 composed of an ideal lens to form on an image plane 30 an image, for instance, a full 360°-direction (full-panoramic) image in the form of a circle whose zenithal direction lies in the center direction of the image and whose horizon lies outside. The panoramic attachment optical system is made up of a transparent medium having three internal reflecting surfaces 12, 14 and 15 that are each rotationally symmetric about a center axis 1 and composed of a Y-toric surface, an entrance (refracting) surface 11 composed of a Y-toric surface and an exit (refracting) surface 13 composed of a spherical surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflecting successively at the internal reflecting surfaces 12, 14 and 15, one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14, 15 and the refracting surfaces 11, 13 positioned on only one side of the center axis 1 in the panoramic attachment optical system 10. Light beams 2, 3U and 3L coming from far away form an image one time at or near a position 4 in the section of FIG. 13 including the axis 1 of rotational symmetry, but they do not form any image in a plane (FIG. 14) that is orthogonal to that section and includes a center ray $2_0$ of the center light beam 2. An image (entrance pupil) of the stop 21 for the image-formation lens 20 is formed at an aerial position 5 at or near the refracting surface 11 in the panoramic attachment optical system 10.

The specifications of Example 5 are:
Focal length of the ideal lens 20: 3.5 mm,
Horizontal angle of view: 360°,
Vertical angle of view: ±20°,
Entrance pupil diameter: 0.620 mm, and
Image size: φ1.32 to φ3.40 mm.

EXAMPLE 6

Figure 17:
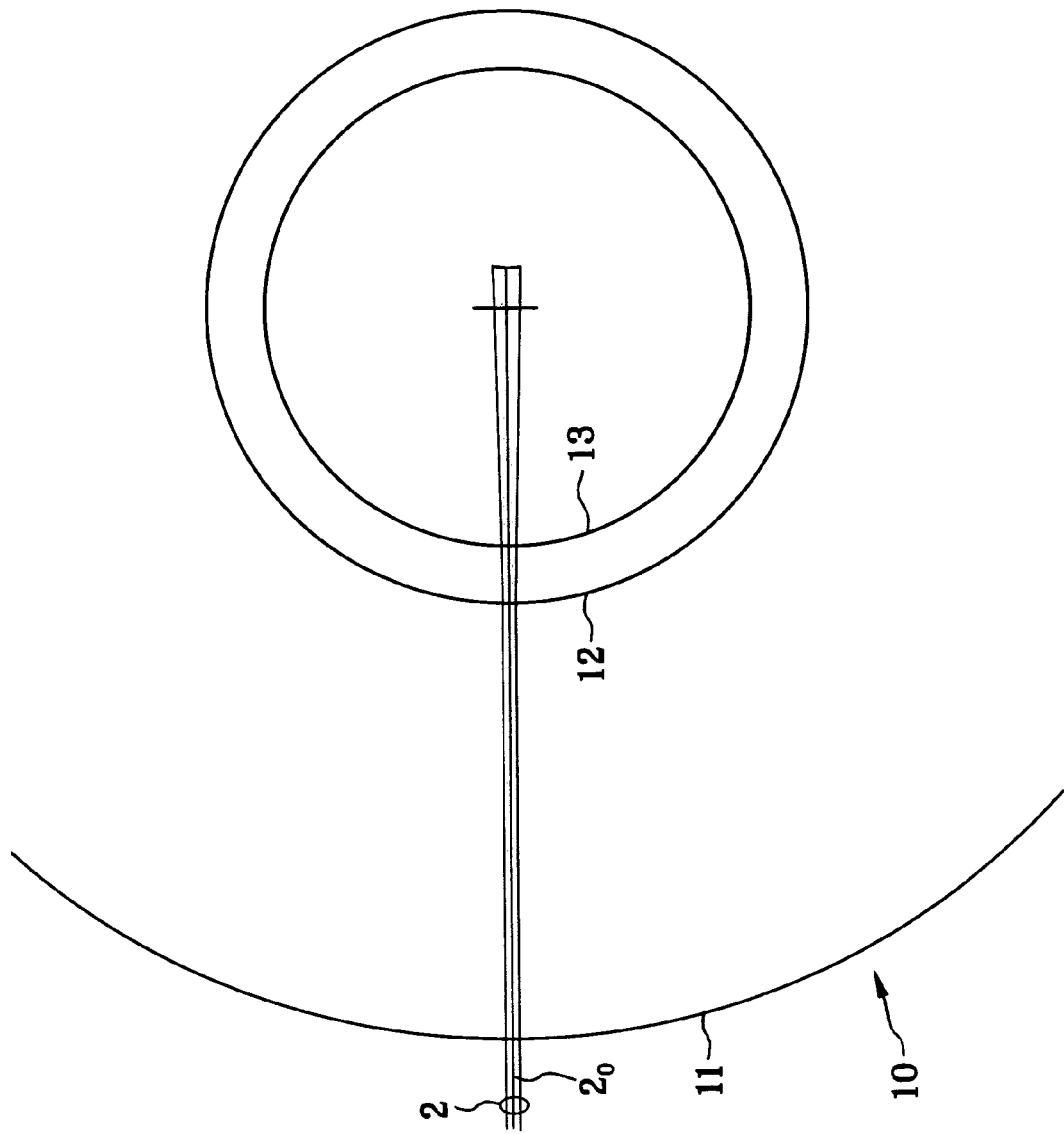
FIG. 17 is a plan view of an optical path through the panoramic attachment optical system of Example 6.
Figure 18:
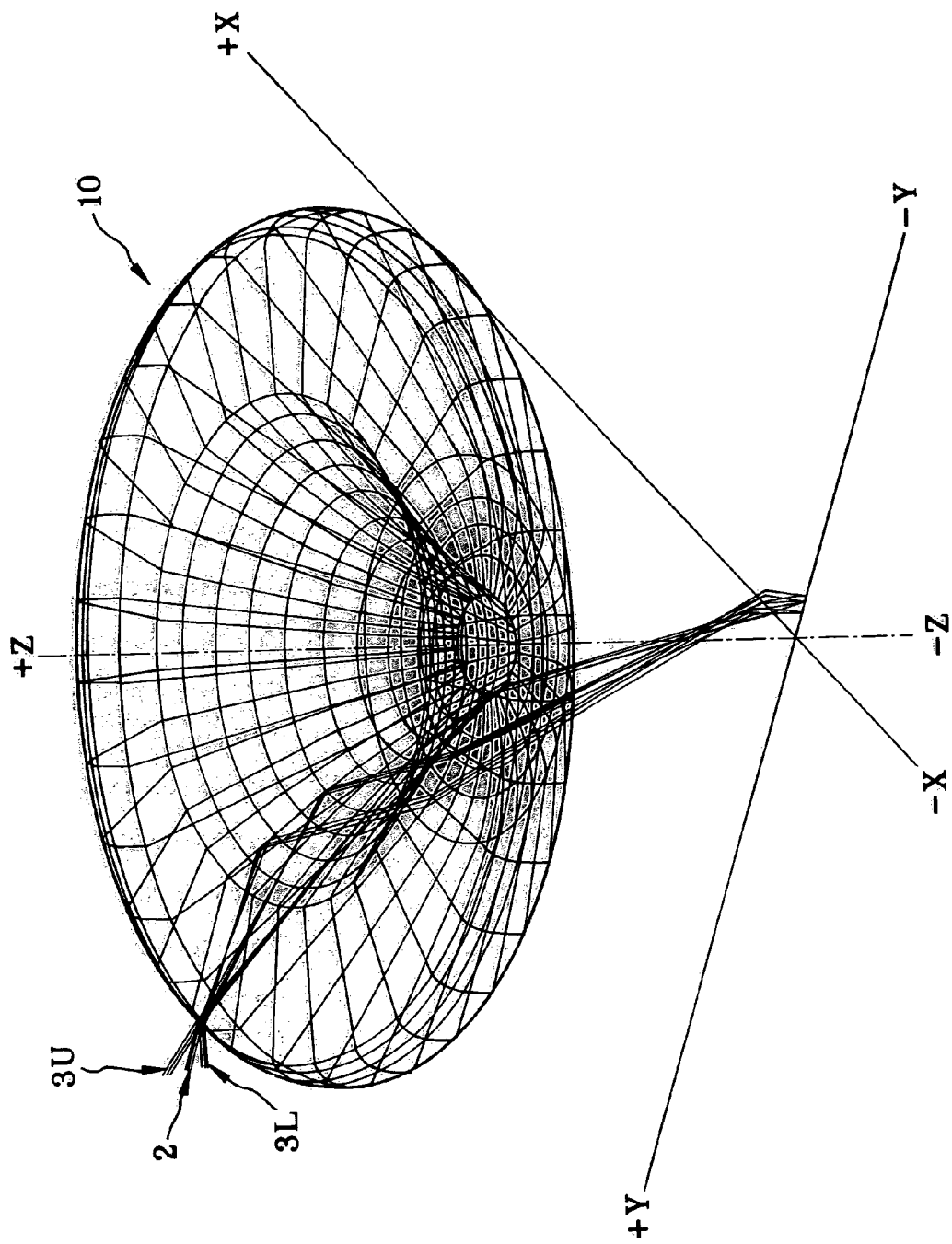
FIG. 18 is illustrative in perspective of a surface shape and an optical path in the panoramic attachment optical system of Example 6.

FIG. 16 is a Y-Z sectional view including an axis 1 of rotational symmetry (center axis) of a panoramic attachment optical system 10 of Example 6, as attached to the entrance side of an image-formation lens (ideal lens) 20, and FIG. 17 is a plan view of an optical path through the panoramic attachment optical system 10. FIG. 18 is illustrative in perspective of a surface shape and an optical path in this example. It is here noted that in the Y-Z sectional view of FIG. 16, the coordinate systems taken with respect to an image plane 30 are depicted, as will hereinafter shall.

The panoramic attachment optical system 10 is attached to the entrance side of the image-formation lens 20 composed of an ideal lens to form on an image plane 30 an image, for instance, a full 360°-direction (full-panoramic) image in the form of a circle whose zenithal direction lies in the center direction of the image and whose horizon lies outside. The panoramic attachment optical system is made up of a transparent medium having one internal reflecting surface 12 that is rotationally symmetric about the center axis 1 and is composed of a Y-rotation free-form surface, an entrance (refracting) surface 11 composed of a Y-rotation free-form surface and an exit (refracting) surface 13 composed of an aspheric surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects one time at the internal reflecting surface 12, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surface 12 and the refracting surfaces 11, 13 positioned on only one side of the center axis 1 in the panoramic attachment optical system 10. Light beams 2, 3U and 3L coming from far away form an image one time at or near a position 4 in the section of FIG. 16 including the axis 1 of rotational symmetry, but they do not form any image in a plane (FIG. 17) that is orthogonal to that section and includes a center ray $2_0$ of the center light beam 2. An image (entrance pupil) of the stop 21 for the image-formation lens 20 is formed at a position 5 at or near the refracting surface 11 in the panoramic attachment optical system 10.

The specifications of Example 6 are:
Focal length of the ideal lens 20: 3.5 mm,
Horizontal angle of view: 360°,
Vertical angle of view: ±20°,
Entrance pupil diameter: 0.58 mm, and
Image size: φ2.10 to φ5.23 mm.

Like Example 1, Example 6 ensures good enough processability, because the panoramic attachment optical system 10 is composed of three surfaces 11, 12 and 13. Because the optical system is powerless in the direction orthogonal to the axis 1 of rotational symmetry, it is preferable in view of correction of aberrations that, even in the plane including the axis 1 of rotational symmetry, an infinite virtual image is transmitted to the image-formation lens 20. To this end, it is preferable for the first surface 11 in the panoramic attachment optical system 10 to be composed of a transmitting surface and, at the same time, have strong positive power. This ensures that the primary image of the object in the axis-of-rotational-symmetry direction is located at an object side position outside the panoramic attachment optical system 10, and transmission of the infinite object image to the image-formation lens via other surface is facilitated as well. In addition, the primary object of the reflecting surface 12 that is the second surface is to provide a pupil relay, and at that surface an entrance pupil 15 can be located at or near the transmitting surface that is the first surface 11. To this end, it is preferable for the second surface 12 to have relatively strong positive power. Preferably in view of correction of aberrations, the third surface 13 is composed of a transmitting surface of positive power, because it transmits the primary image of the object formed in the panoramic attachment optical system 10 to the image-formation lens 20 as an afocal (infinite) image.

EXAMPLE 7

Figure 19:
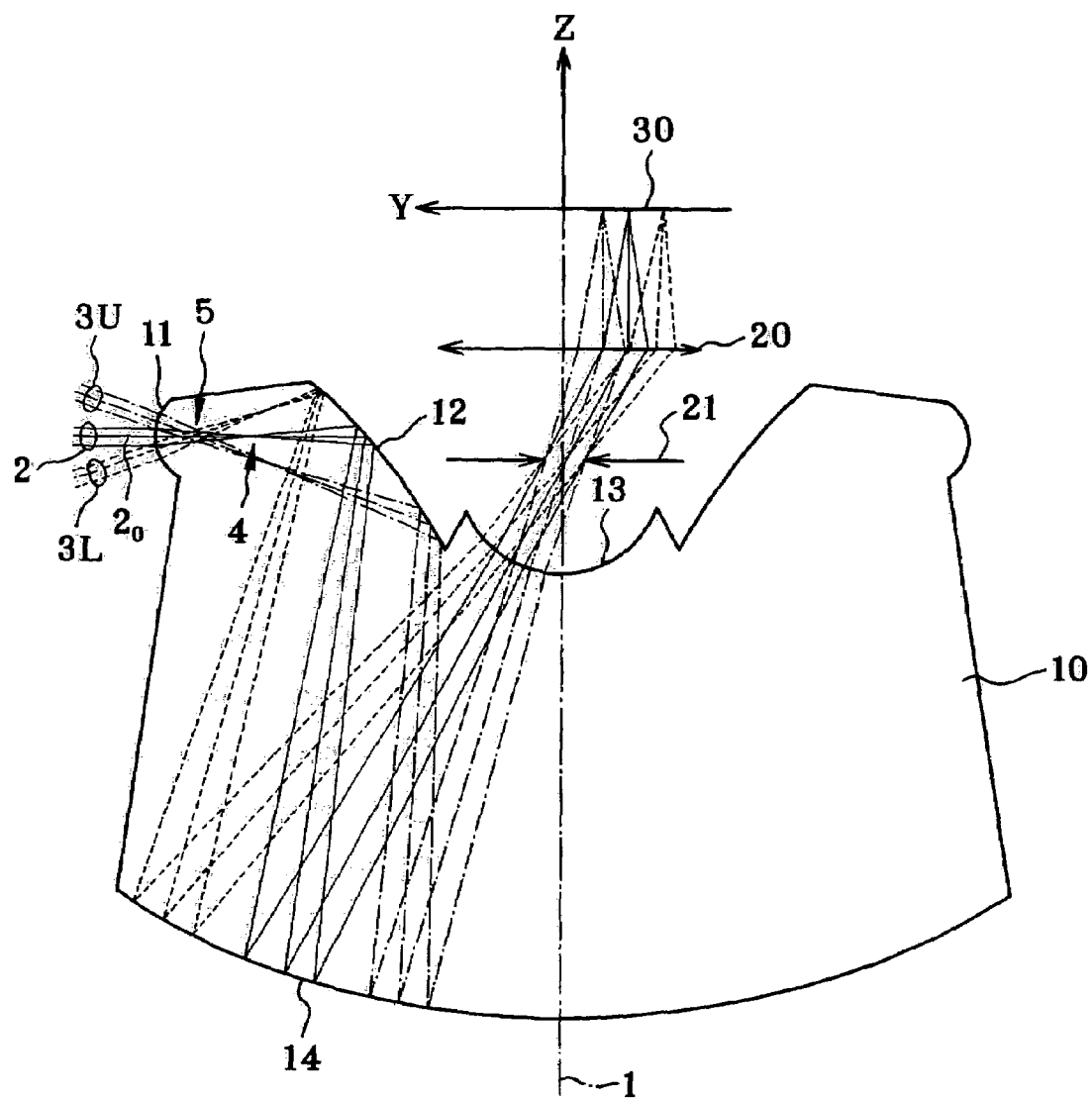
FIG. 19 is a view, as in FIG. 16, but with the panoramic attachment optical system of Example 7 according to the invention.
Figure 20:
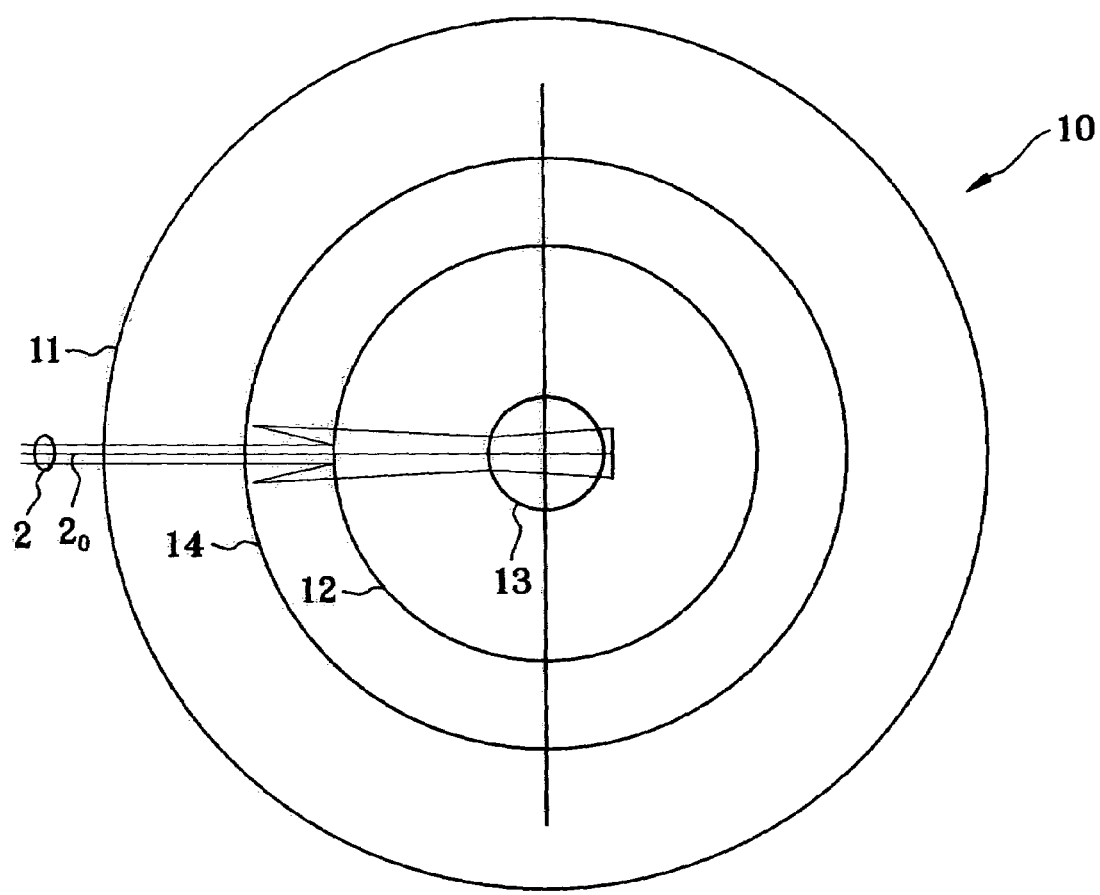
FIG. 20 is a view, as in FIG. 17, but with the panoramic attachment optical system of Example 7.

FIGS. 19 and 20 for the panoramic attachment optical system 10 of Example 7 are similar to FIGS. 16 and 17.

The panoramic attachment optical system 10 is attached to the entrance side of an image-formation lens 20 composed of an ideal lens, with an image plane 30 looking down at the ground, to form on that image plane 30 an image, for instance, a full 360°-direction (full-panoramic) image in the form of a circle whose zenithal direction lies in the center direction of the image and whose horizon lies outside. The panoramic attachment optical system is made up of a transparent medium having an internal reflecting surface 12 that is rotationally symmetric about a center axis 1 and composed of a Y-rotation free-form surface, an internal reflecting surface 14 composed of an aspheric surface, an entrance (refracting) surface 11 composed of a Y-rotation free-form surface and an exit (refracting) surface 13 composed of an aspheric surface.

When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects successively at the internal reflecting surface 12 and the internal reflecting surface 14, one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14 and the refracting surfaces 11, 13 positioned on only one side of the center axis 1 in the panoramic attachment optical system 10. Light beams 2, 3U and 3L coming from far away form an image one time at or near a position 4 in the section of FIG. 19 including the axis 1 of rotational symmetry, but they do not form any image in a plane (FIG. 20) that is orthogonal to that section and includes a center ray $2_0$ of the center light beam 2. An image (entrance pupil) of the stop 21 for the image-formation lens 20 is formed at a position 5 at or near the refracting surface 11 in the panoramic attachment optical system 10.

The specifications of Example 7 are:
Focal length of the ideal lens 20: 3.5 mm,
Horizontal angle of view: 360°,
Vertical angle of view: ±20°,
Entrance pupil diameter: 0.57 mm, and
Image size: $\phi$2.33 to $\phi$6.25 mm.

Basically, the arrangement of this example is common to that of Example 6, with an entrance pupil 5 located at or near the first surface 11 that is a transmitting surface. In addition, Example 7 allows the optical system to be successfully reduced in size by bending the optical path about 90° at the reflecting surface 12 that is the second surface. However, it is impossible to give relatively strong positive power to the reflecting surface 12, because a large bending of the optical path at that surface renders pupil aberrations likely to occur due to decentration. Preferably in view of keeping decentration aberrations good, relatively large power is given to the reflecting surface 14 that is the third surface. The reason is that the angle of bending the optical path at the third surface 14 is so relatively small that the amount of decentration aberrations produced is minimized. Further, location of the primary image of the object at or near the first reflecting surface 12 ensures that it is projected at infinity via the second reflecting surface 14 and transmitted to the image-formation lens 20 for better correction of aberrations.

EXAMPLE 8

Figure 21:
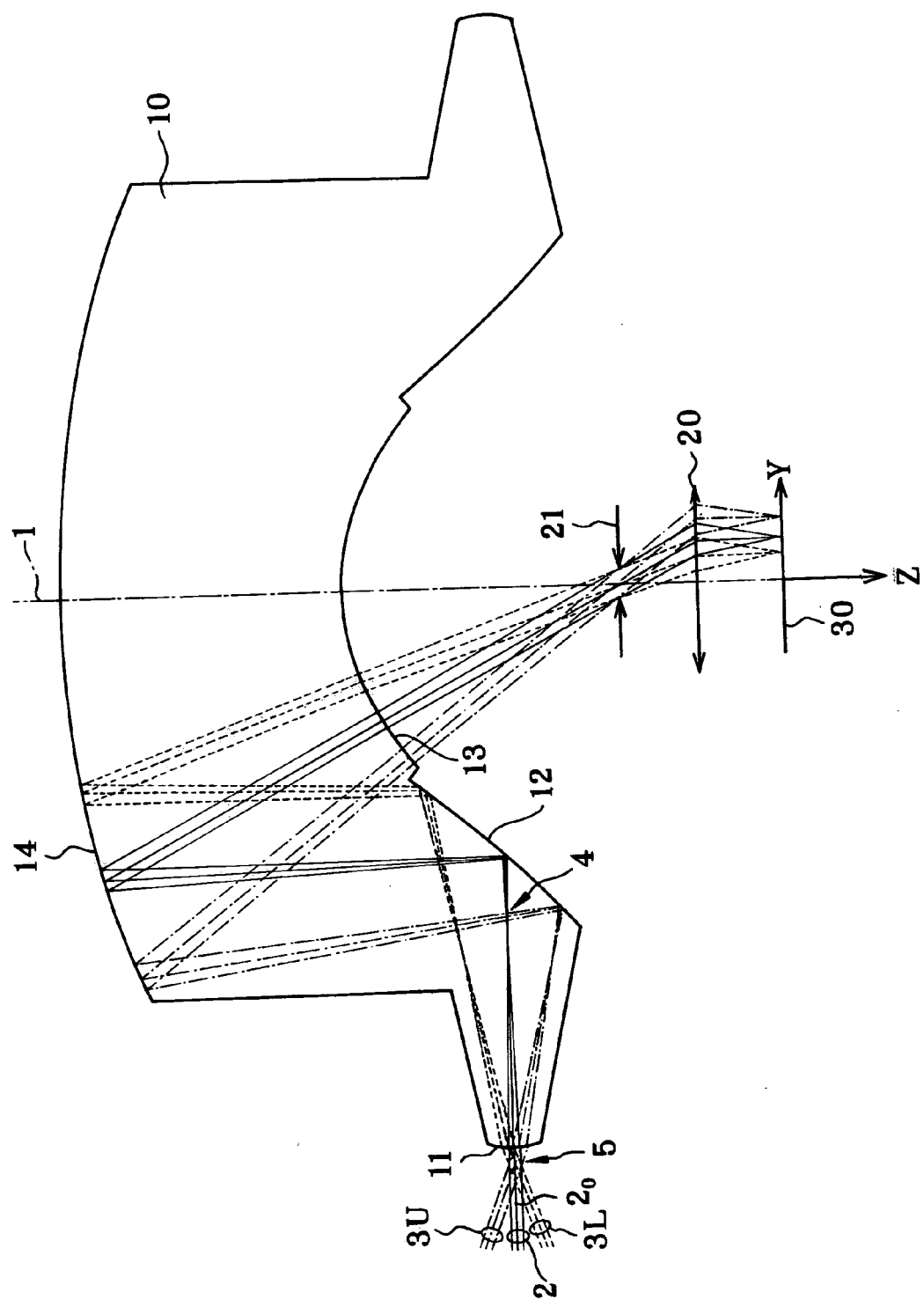
FIG. 21 is a view, as in FIG. 16, but with the panoramic attachment optical system of Example 8 according to the invention.
Figure 22:
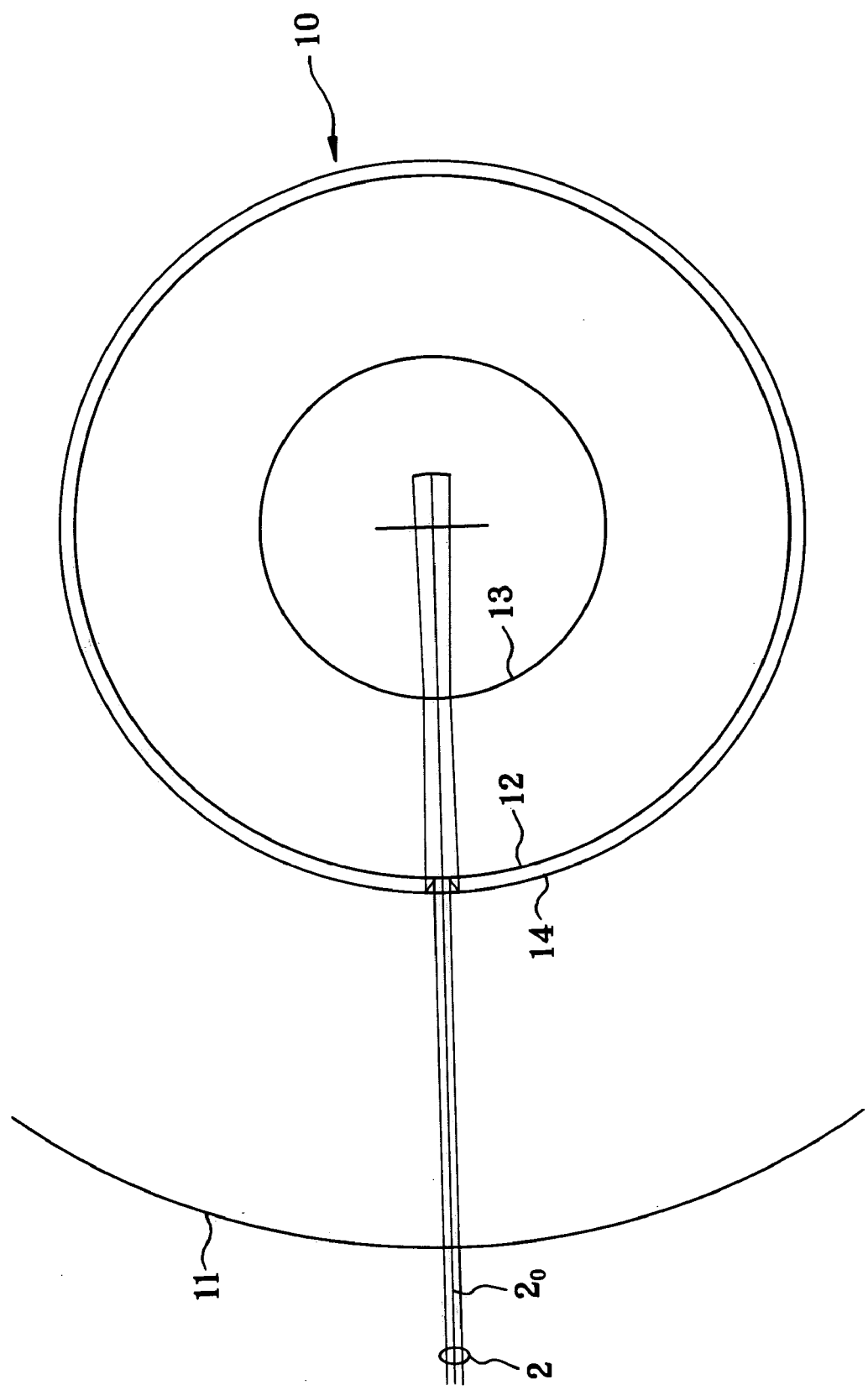
FIG. 22 is a view, as in FIG. 17, but with the panoramic attachment optical system of Example 8.

FIGS. 21 and 22 for the panoramic attachment optical system 10 of Example 8 are similar to FIGS. 16 and 17.

The panoramic attachment optical system 10 is attached to the entrance side of an image-formation lens 20 composed of an ideal lens, with an image plane 30 looking up at the zenith, to form on that image plane 30 an image, for instance, a full 360°-direction (full-panoramic) image in the form of a circle whose zenithal direction turns away from the center of the image and whose horizon lies inside. The panoramic attachment optical system is made up of a transparent medium having an internal reflecting surface 12 that is rotationally symmetric about a center axis 1 and composed of a Y-rotation free-form surface, an internal reflecting surface 14 composed of an aspheric surface, an entrance (refracting) surface 11 composed of a Y-rotation free-form surface and an exit (refracting) surface 13 composed of an aspheric surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects successively at the internal reflecting surface 12 and the internal reflecting surface 14, one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14 and the refracting surfaces 11, 13 positioned on only one side of the center axis 1 in the panoramic attachment optical system 10. Light beams 2, 3U and 3L coming from far away form an image one time at or near a position 4 in the section of FIG. 21 including the axis 1 of rotational symmetry, but they do not form any image in a plane (FIG. 22) that is orthogonal to that section and includes a center ray $2_0$ of the center light beam 2. An image (entrance pupil) of the stop 21 for the image-formation lens 20 is formed at a position 5 at or near the refracting surface 11 outside the panoramic attachment optical system 10.

The specifications of Example 8 are:
Focal length of the ideal lens 20: 3.5 mm,
Horizontal angle of view: 360°,
Vertical angle of view: ±20°,
Entrance pupil diameter: 0.59 mm, and
Image size: $\phi$2.57 to $\phi$5.93 mm.

Basically, the arrangement of this example is common to that of Example 6, with an entrance pupil 5 located at or near the first surface 11 that is a transmitting surface. In addition, Example 8 allows the optical system to be successfully reduced in size by bending the optical path about 90° at the reflecting surface 12 that is the second surface. However, it is impossible to give relatively strong positive power to the reflecting surface 12, because a large bending of the optical path at that surface renders pupil aberrations likely to occur due to decentration. Preferably in view of keeping decentration aberrations good, relatively large power is given to the reflecting surface 14 that is the third surface. The reason is that the angle of bending the optical path at the third surface 14 is so relatively small that the amount of decentration aberrations produced is minimized. Further, location of the primary image of the object at or near the first reflecting surface 12 ensures that it is projected at infinity via the second reflecting surface 14 and transmitted to the image-formation lens 20 for better correction of aberrations.

EXAMPLE 9

Figure 23:
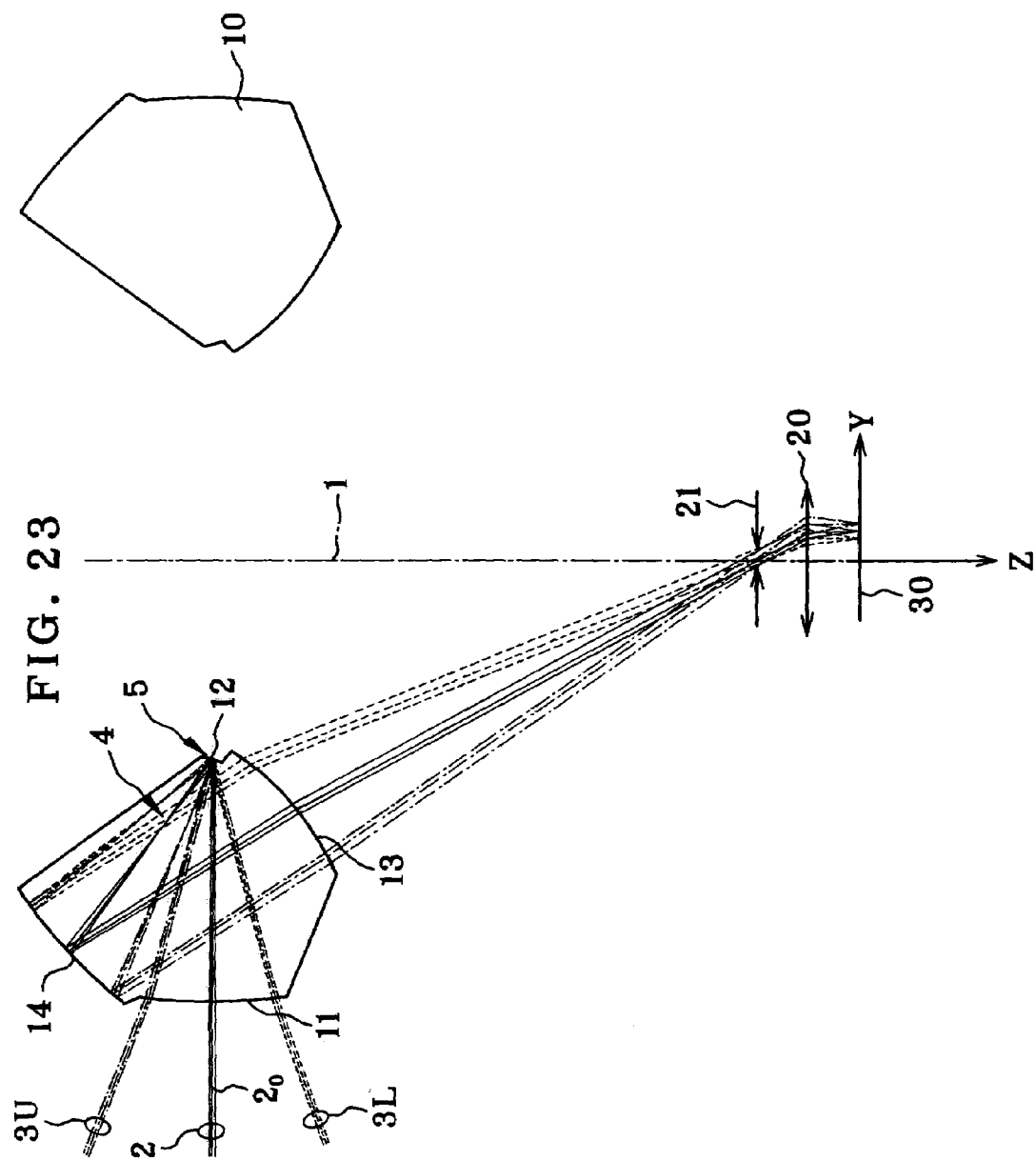
FIG. 23 is a view, as in FIG. 16, but with the panoramic attachment optical system of Example 9 according to the invention.
Figure 24:
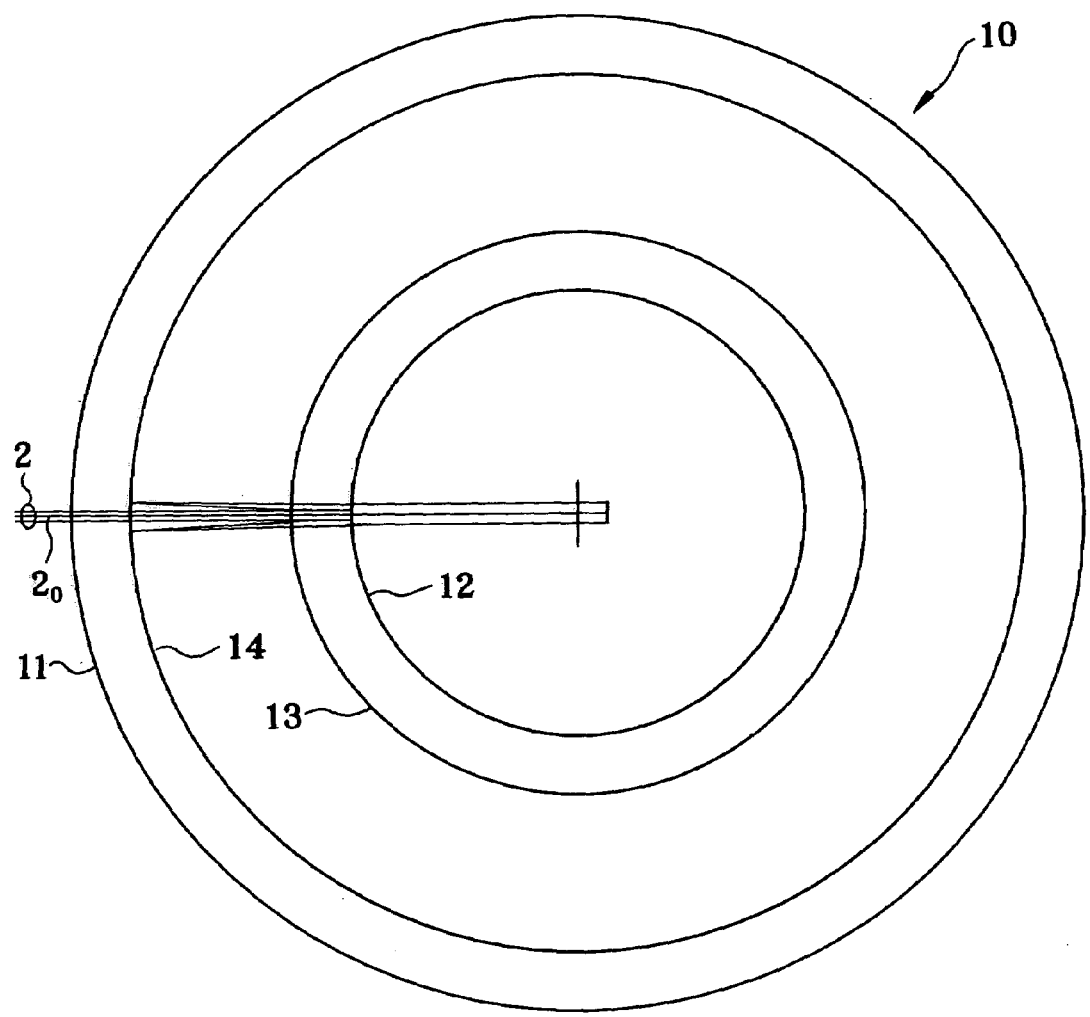
FIG. 24 is a view, as in FIG. 17, but with the panoramic attachment optical system of Example 9.

FIGS. 23 and 24 for the panoramic attachment optical system 10 of Example 9 are similar to FIGS. 16 and 17.

This example is directed to a panoramic attachment optical system 10 similar to that of Example 2. The panoramic attachment optical system 10 is attached to the entrance side of an image-formation lens 20 composed of an ideal lens to form on an image plane 30 an image, for instance, a full 360°-direction (full-panoramic) image in the form of a circle whose zenithal direction turns away from the center of the image and whose horizon lies inside. The panoramic attachment optical system is made up of a transparent medium having two internal reflecting surfaces 12 and 14 that are each rotationally symmetric about a center axis 1 and composed of a Y-rotation free-form surface, an entrance (refracting) surface 11 composed of a Y-rotation free-form surface and an exit (refracting) surface 13 composed of a Y-rotation free-form surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects successively at the internal reflecting surfaces 12 and 14, one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14 and the refracting surfaces 11, 13 positioned on only one side of the center axis 1 in the panoramic attachment optical system 10. Light beams 2, 3U and 3L coming from far away form an image once at or near a position 4 in the section of FIG. 23 including the rotationally symmetric axis 1, but they do not form any image in a plane (FIG. 24) that is orthogonal to that section and includes a center ray $2_0$ of the center light beam 2. An image (entrance pupil) of the stop 21 for the image-formation lens 20 is formed at a position 5 at or near the reflecting surface 12 in the panoramic attachment optical system 10.

The specifications of Example 9 are:
Focal length of the ideal lens 20: 3.5 mm,
Horizontal angle of view: 360°,
Vertical angle of view: ±20°,
Entrance pupil diameter: 0.59 mm, and
Image size: φ2.98 to φ5.13 mm.

EXAMPLE 10

Figure 25:
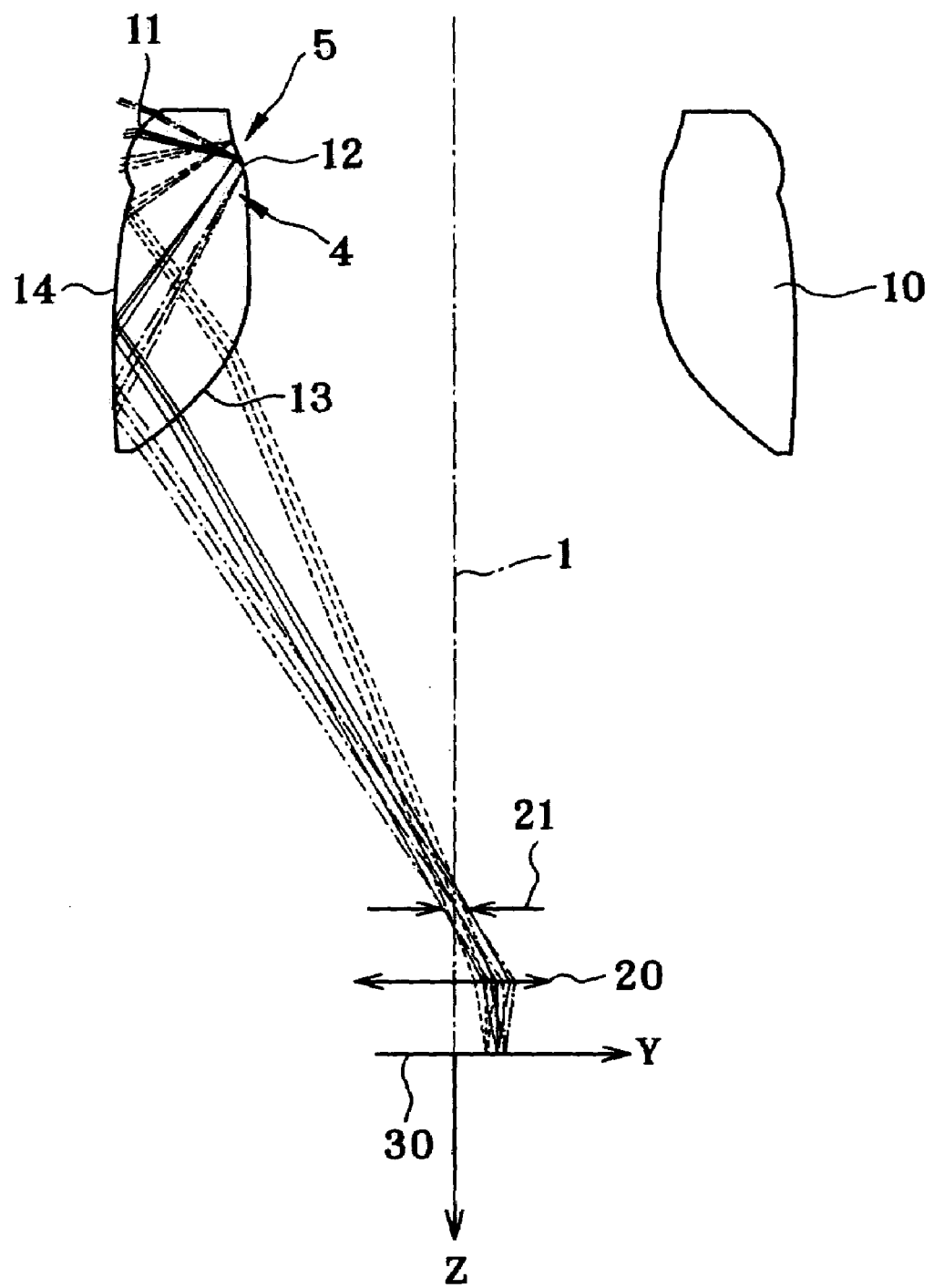
FIG. 25 is a view, as in FIG. 16, but with the panoramic attachment optical system of Example 10 according to the invention.
Figure 26:
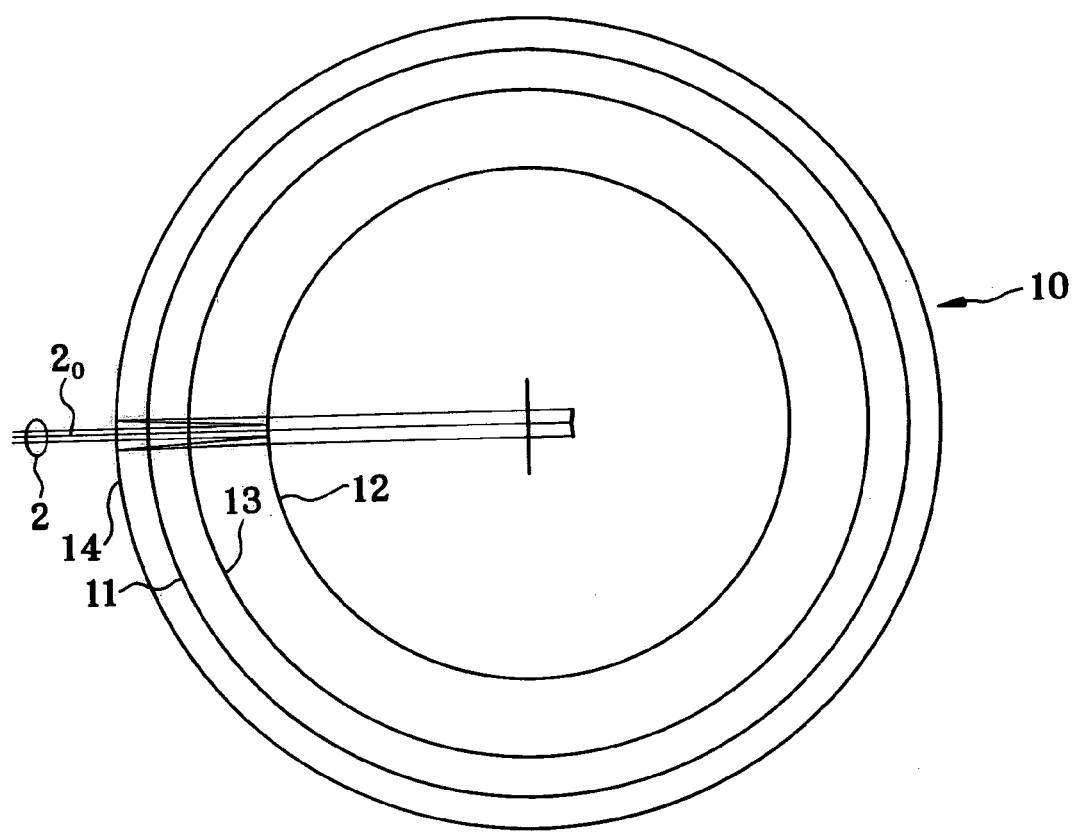
FIG. 26 is a view, as in FIG. 17, but with the panoramic attachment optical system of Example 10.

FIGS. 25 and 26 for the panoramic attachment optical system 10 of Example 10 are similar to FIGS. 16 and 17.

This example is directed to a panoramic attachment optical system 10 similar to that of Example 9 with the exception that the optical path does not cross over itself in the panoramic attachment optical system 10.

The panoramic attachment optical system 10 is attached to the entrance side of an image-formation lens 20 composed of an ideal lens to form on an image plane 30 an image, for instance, a full 360°-direction (full-panoramic) image in the form of a circle whose zenithal direction turns away from the center of the image and whose horizon lies inside. The panoramic attachment optical system is made up of a transparent medium having two internal reflecting surfaces 12 and 14 that are each rotationally symmetric about a center axis 1 and composed of a Y-rotation free-form surface, an entrance (refracting) surface 11 composed of a Y-rotation free-form surface and an exit (refracting) surface 13 of a Y-ration free-form surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects successively at the internal reflecting surfaces 12 and 14, one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14 and the refracting surfaces 11, 13 positioned on only one side of the center axis 1 in the panoramic attachment optical system 10. Light beams 2, 3U and 3L coming from far away form an image once at or near a position 4 in the section of FIG. 25 including the rotationally symmetric axis 1, but they do not form any image in a plane (FIG. 26) that is orthogonal to that section and includes a center ray $2_0$ of the center light beam 2. An image (entrance pupil) of the stop 21 for the image-formation lens 20 is formed at a position 5 at or near the reflecting surface 12 in the panoramic attachment optical system 10.

The specifications of Example 109 are:
Focal length of the ideal lens 20: 3.5 mm,
Horizontal angle of view: 360°,
Vertical angle of view: ±20°,
Entrance pupil diameter: 0.59 mm, and
Image size: φ2.83 to φ4.64 mm.

EXAMPLE 11

Figure 27:
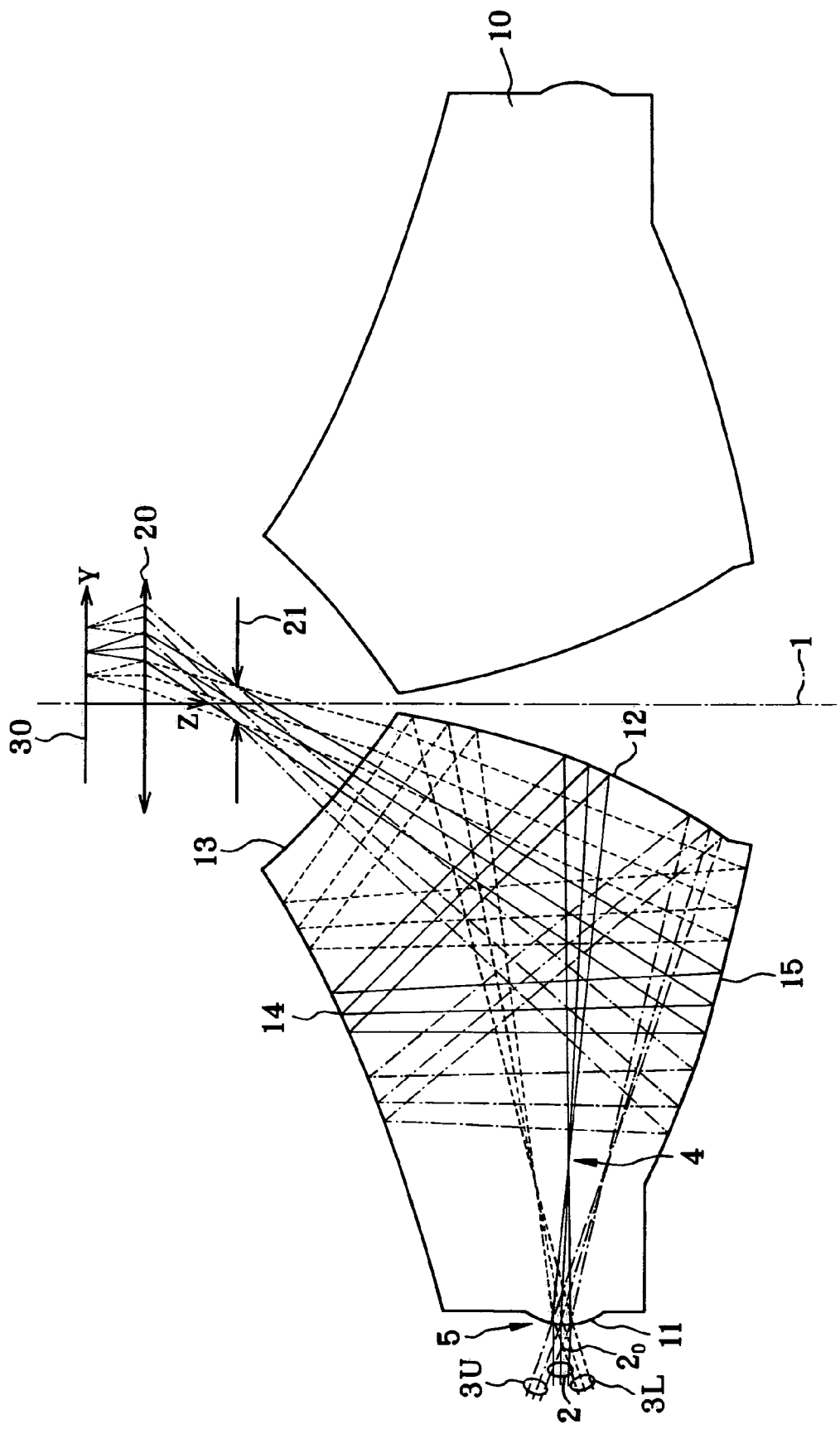
FIG. 27 is a view, as in FIG. 16, but with the panoramic attachment optical system of Example 11 according to the invention.
Figure 28:
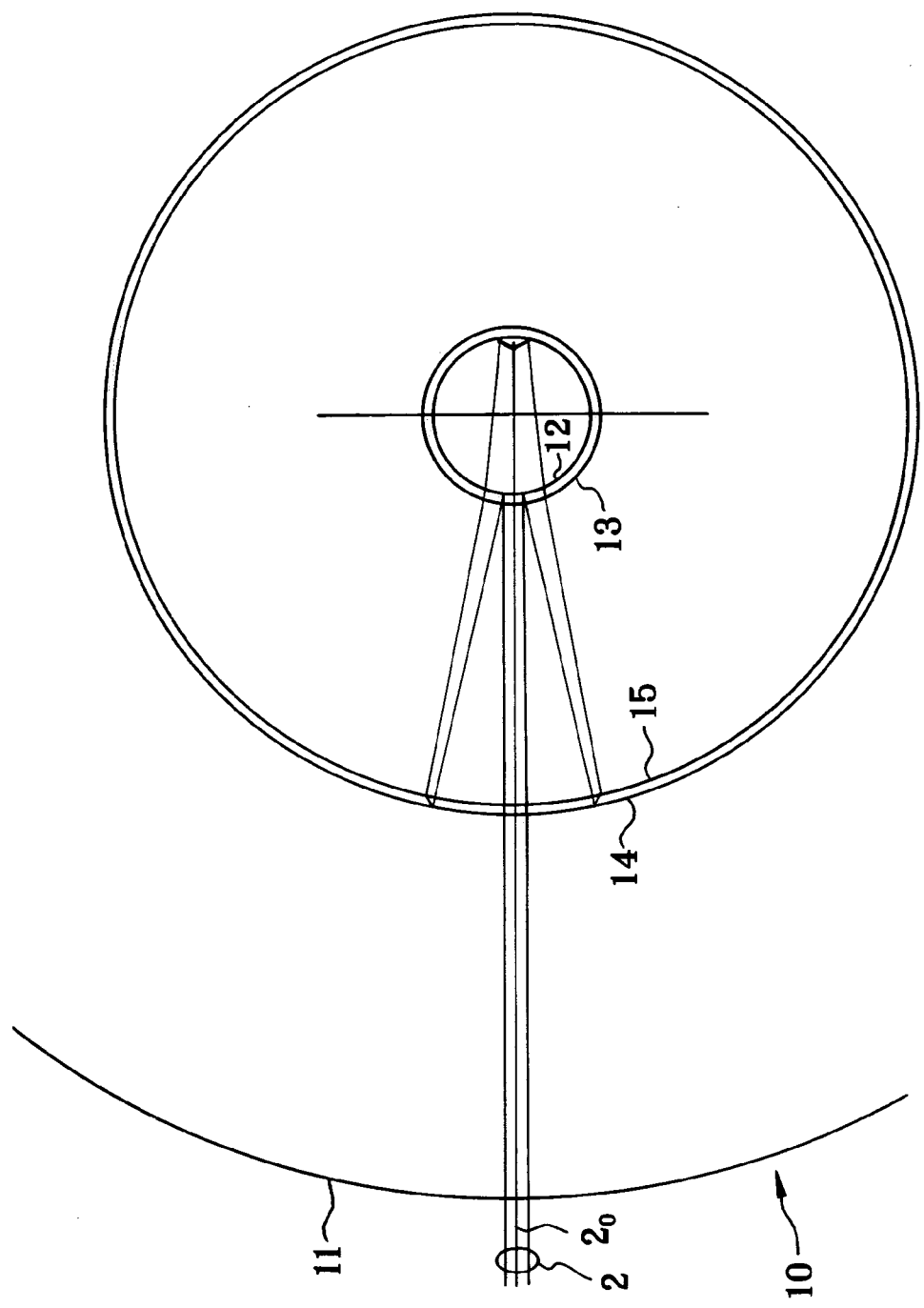
FIG. 28 is a view, as in FIG. 17, but with the panoramic attachment optical system of Example 11.

FIGS. 27 and 28 for the panoramic attachment optical system 10 of Example 11 are similar to FIGS. 16 and 17.

The panoramic attachment optical system 10 is attached to the entrance side of an image-formation lens 20 composed of an ideal lens, with an image plane 30 looking down at the ground, to form on that image plane 30 an image, for instance, a full 360°-direction (full-panoramic) image in the form of a circle whose zenithal direction turns away from the center of the image and whose horizon lies inside. The panoramic attachment optical system is made up of a transparent medium having two internal reflecting surfaces 12 and 14 that are each rotationally symmetric about a center axis 1 and composed of a Y-rotation free-form surface, an internal reflecting surface 15 composed of an aspheric surface, an entrance (refracting) surface 11 composed of a Y-rotation free-form surface and an exit (refracting) surface 13 composed of a Y-rotation free-form surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects successively at the internal reflecting surfaces 12, 14 and 15, one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14, 15 and the refracting surfaces 11, 13 positioned on only one side of the center axis 1 in the panoramic attachment optical system 10. Light beams 2, 3U and 3L coming from far away form an image once at or near a position 4 in the section of FIG. 27 including the axis 1 of rotational symmetry, but they do not form any image in a plane (FIG. 28) that is orthogonal to that section and includes a center ray $2_0$ of the center light beam 2. An image (entrance pupil) of the stop 21 for the image-formation lens 20 is formed at a position 5 at or near the refracting surface 11 in the panoramic attachment optical system 10.

The specifications of Example 11 are:
Focal length of the ideal lens 20: 3.5 mm,
Horizontal angle of view: 360°,
Vertical angle of view: ±20°,
Entrance pupil diameter: 0.65 mm, and
Image size: φ2.24 to φ5.90 mm.

As in Example 5, this example is composed of three reflecting surfaces 12, 14 and 15, and as many as three reflecting surfaces ensure that the aberrations produced are minimized.

More preferably, the three reflecting surfaces 12, 14 and 15 have a +−+ power profile in such a way as to achieve a general triplet arrangement, resulting in much more reductions in field curvature (field curvature that is about the chief ray and is not due to decentration). More preferably, the optical path crosses over itself in the panoramic attachment optical system 10, and if the angles of reflection at the reflecting surfaces 12, 14 and 15 are substantially equal to one another, it is also possible to reduce the decentration aberrations produced. Satisfactory correction of aberrations at the reflecting surfaces permits the power of the transmitting surface 12 that is the fifth surface to be decreased. This is preferable for correction of aberrations, because there is no strong power given to the transmitting surface likely to produce chromatic aberrations.

EXAMPLE 12

Figure 29:
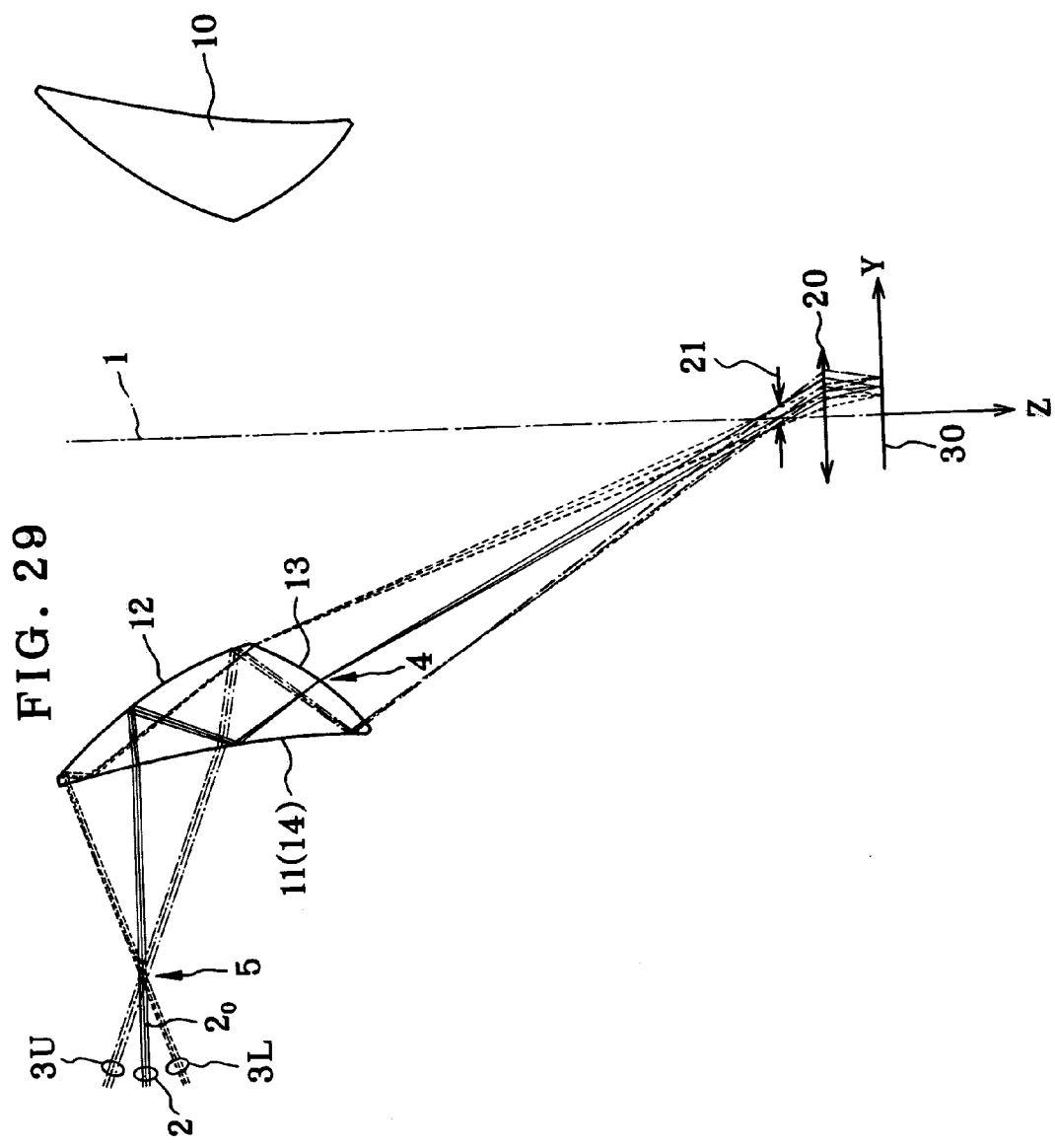
FIG. 29 is a view, as in FIG. 16, but with the panoramic attachment optical system of Example 12 according to the invention.
Figure 30:
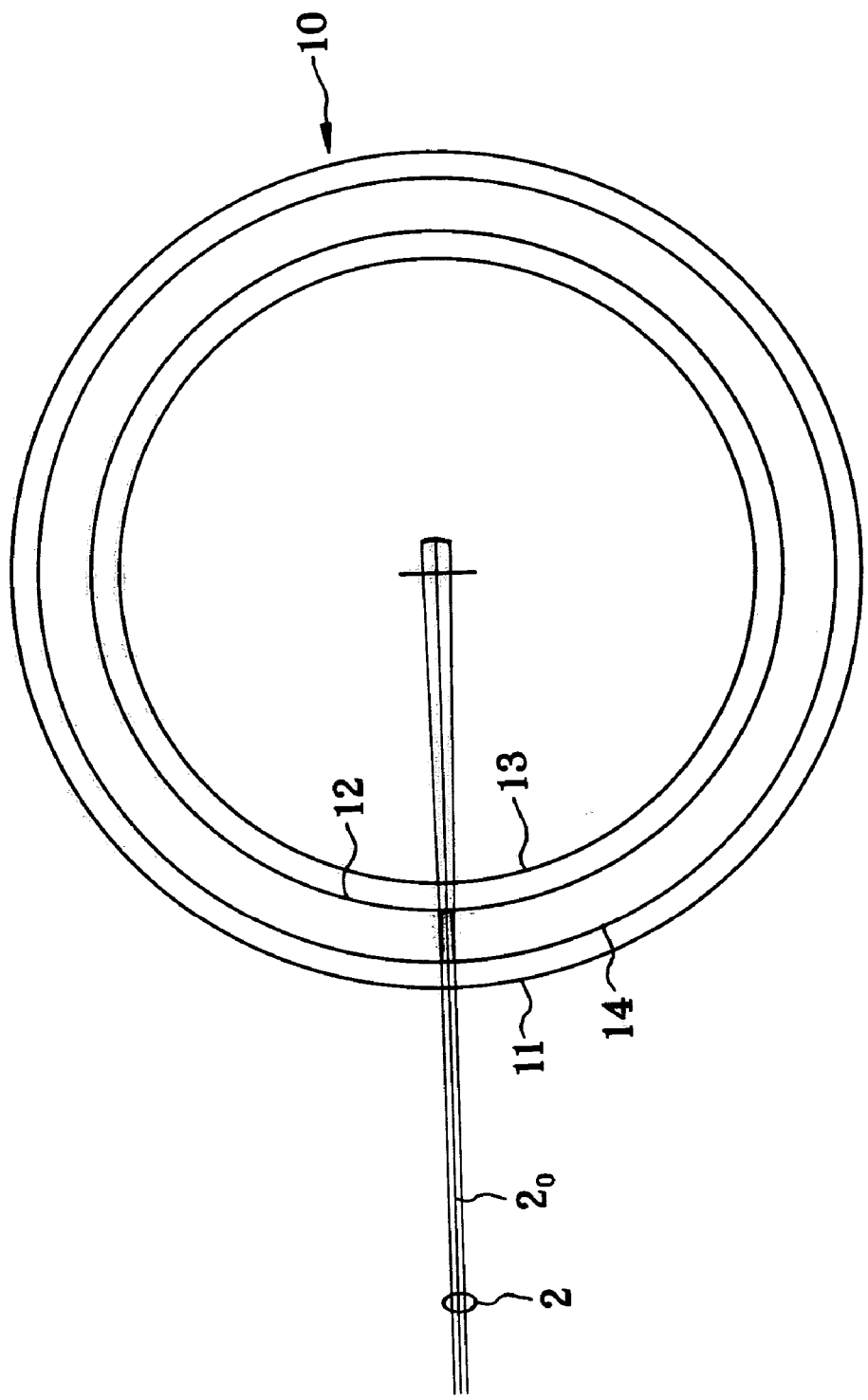
FIG. 30 is a view, as in FIG. 17, but with the panoramic attachment optical system of Example 12.

FIGS. 29 and 30 for the panoramic attachment optical system 10 of Example 12 are similar to FIGS. 16 and 17.

This example is directed to a panoramic attachment optical system 10 similar to that of Example 3. The panoramic attachment optical system 10 is attached to the entrance side of an image-formation lens 20 composed of an ideal lens to form on an image plane 30 an image, for instance, a full 360°-direction (full-panoramic) image in the form of a circle whose zenithal direction turns away from the center of the image and whose horizon lies inside. The panoramic attachment optical system is made up of a transparent medium having one internal reflecting surface 12 that is rotationally symmetric about a center axis 1 and composed of a Y-rotation free-form surface, a surface that acts as an entrance (refracting) surface 11 composed of a Y-rotation free-form surface and also as an internal reflecting surface 14 and an exit (refracting) surface 13 composed of a Y-rotation free-form surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects successively at the internal reflecting surface 12 and the internal reflecting surface 14 that acts also as the refracting surface 11, one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14 and the refracting surfaces 11, 13 positioned on only one side of the center axis 1 in the panoramic attachment optical system 10. Light beams 2, 3U and 3L coming from far away form an image once at or near a position 4 in the section of FIG. 29 including the rotationally symmetric axis 1, but they do not form any image in a plane (FIG. 30) that is orthogonal to that section and includes a center ray $2_0$ of the center light beam 2. An image (entrance pupil) of the stop 21 for the image-formation lens 20 is formed at an aerial position 5 on an object side with respect to the refracting surface 11 in the panoramic attachment optical system 10.

The specifications of Example 12 are:
Focal length of the ideal lens 20: 3.5 mm,
Horizontal angle of view: 360°,
Vertical angle of view: ±20°,
Entrance pupil diameter: 0.58 mm, and
Image size: φ2.94 to φ5.18 mm.

In Example 12, one surface of the same shape located at the same position acts as the transmitting surface 11 that is the first surface of the panoramic attachment optical system 10, and works as the reflecting surface 14 that is the third surface, too. To allow that one surface to act as a reflecting surface, it is located at an angle exceeding the critical angle to make full use of total reflection, so that light can be reflected at that surface without recourse to any reflective coating.

EXAMPLE 13

Figure 31:
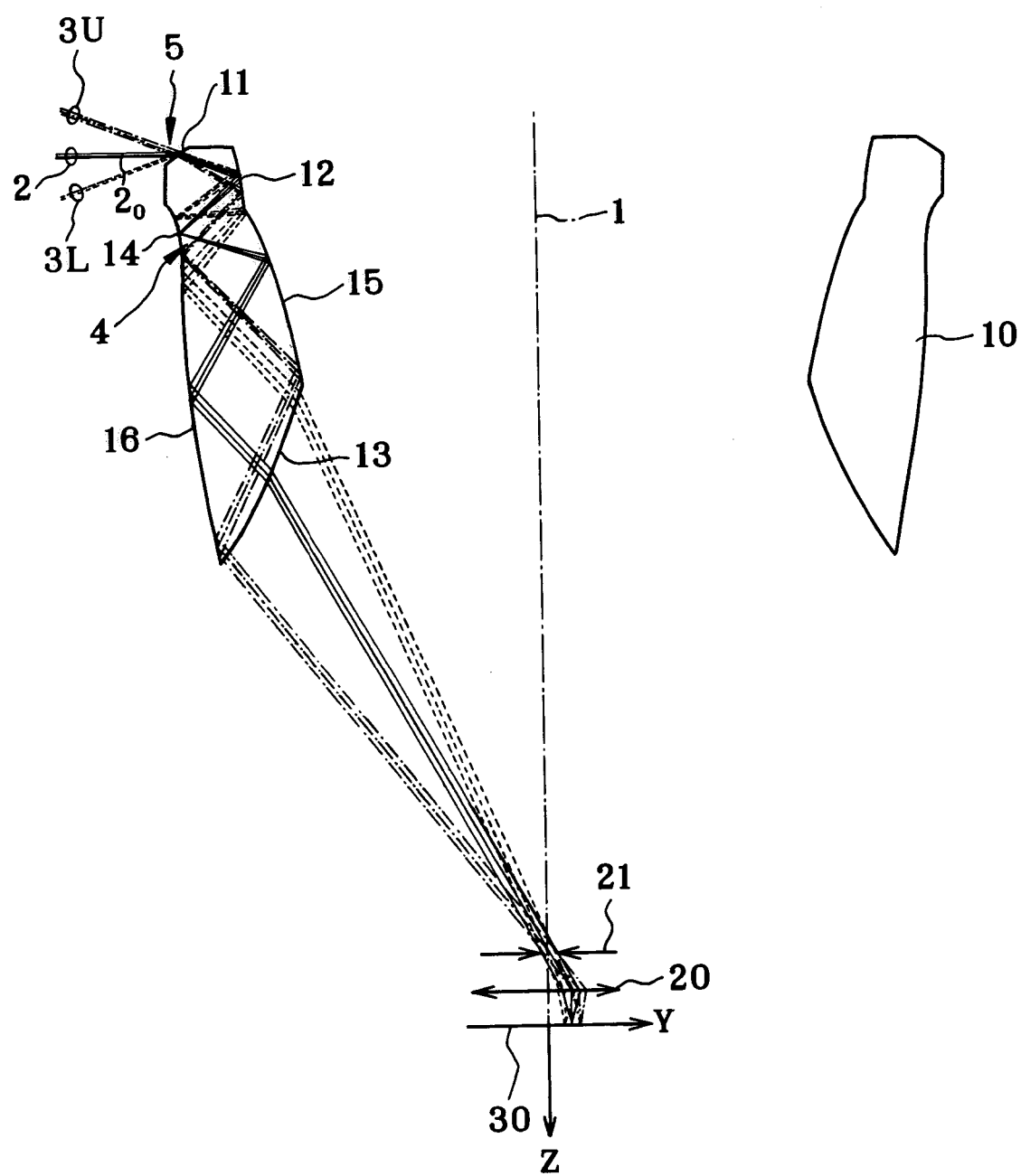
FIG. 31 is a view, as in FIG. 16, but with the panoramic attachment optical system of Example 13 according to the invention.
Figure 32:
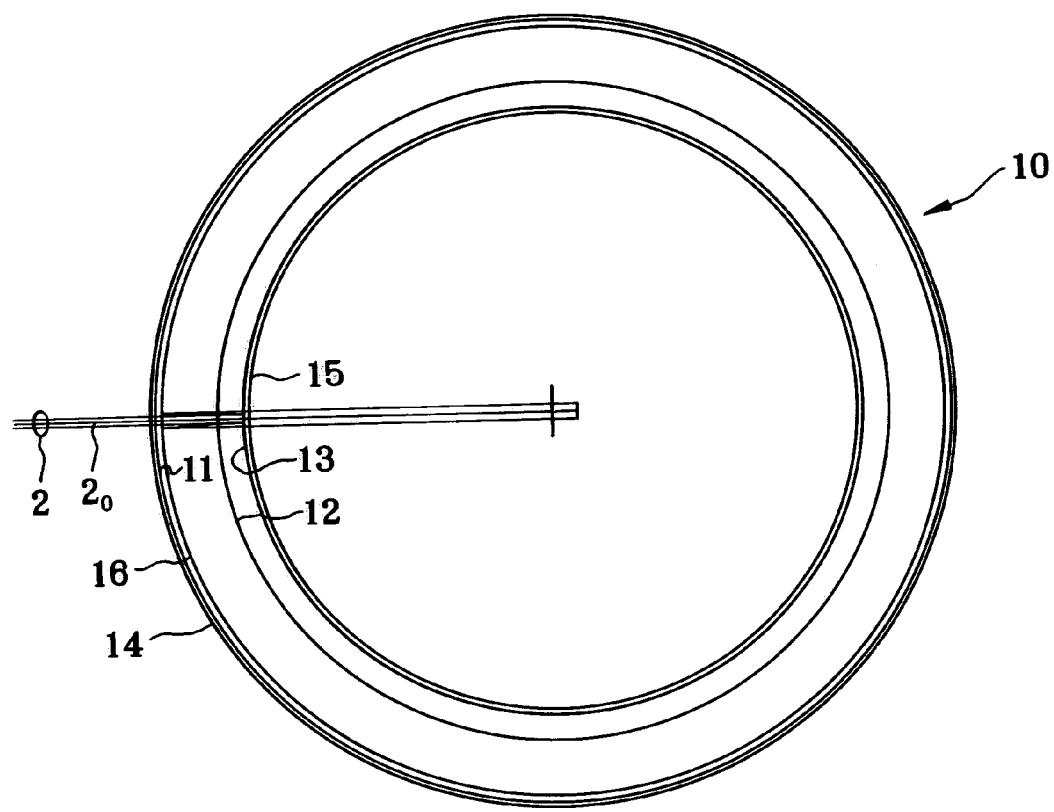
FIG. 32 is a view, as in FIG. 17, but with the panoramic attachment optical system of Example 13.

FIGS. 31 and 32 for the panoramic attachment optical system 10 of Example 13 are similar to FIGS. 16 and 17.

The panoramic attachment optical system 10 is attached to the entrance side of an image-formation lens 20 composed of an ideal lens to form on an image plane 30 an image, for instance, a full 360°-direction (full-panoramic) image in the form of a circle whose zenithal direction turns away from the center of the image and whose horizon lies inside. The panoramic attachment optical system is made up of a transparent medium having four internal reflecting surfaces 12, 14, 15 and 16 that are each rotationally symmetric about a center axis 1 and composed of a Y-rotation free-form surface, an entrance (refracting) surface 11 composed of a Y-rotation free-form surface and an exit (refracting) surface 13 composed of a Y-rotation free-form surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects successively at the internal reflecting surfaces 12, 14, 15 and 16, one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14, 15, 16 and the refracting surfaces 11, 13 positioned on only one side of the center axis 1 in the panoramic attachment optical system 10. Light beams 2, 3U and 3L coming from far away form an image one time at or near a position 4 in the section of FIG. 31 including the rotationally symmetric axis 1, but they do not form any image in a plane (FIG. 32) that is orthogonal to that section and includes a center ray $2_0$ of the center light beam 2. An image (entrance pupil) of the stop 21 for the image-formation lens 20 is formed at an aerial position 5 at or near the refracting surface 11 in the panoramic attachment optical system 10.

The specifications of Example 13 are:
Focal length of the ideal lens 20: 3.5 mm,
Horizontal angle of view: 360°,
Vertical angle of view: ±20°,
Entrance pupil diameter: 0.59 mm, and
Image size: φ3.07 to φ5.60 mm.

Example 13 is built up of four reflecting surfaces 12, 14, 15 and 16. With this example where the primary object image is located between the reflecting surfaces, they can be used chiefly for the formation of the primary image, ensuring that the power load of the transmitting surface that is the first surface is eased up. This is particularly preferable for correction of chromatic aberrations. Especially with this example, it is also possible to locate the reflecting surfaces 12, 14, 15 and 16 substantially parallel with each other. This is preferable for the case where there is another optical system for forming an image in the perpendicular direction to the image plane 30 not via the panoramic attachment optical system 10.

EXAMPLE 14

Figure 33:
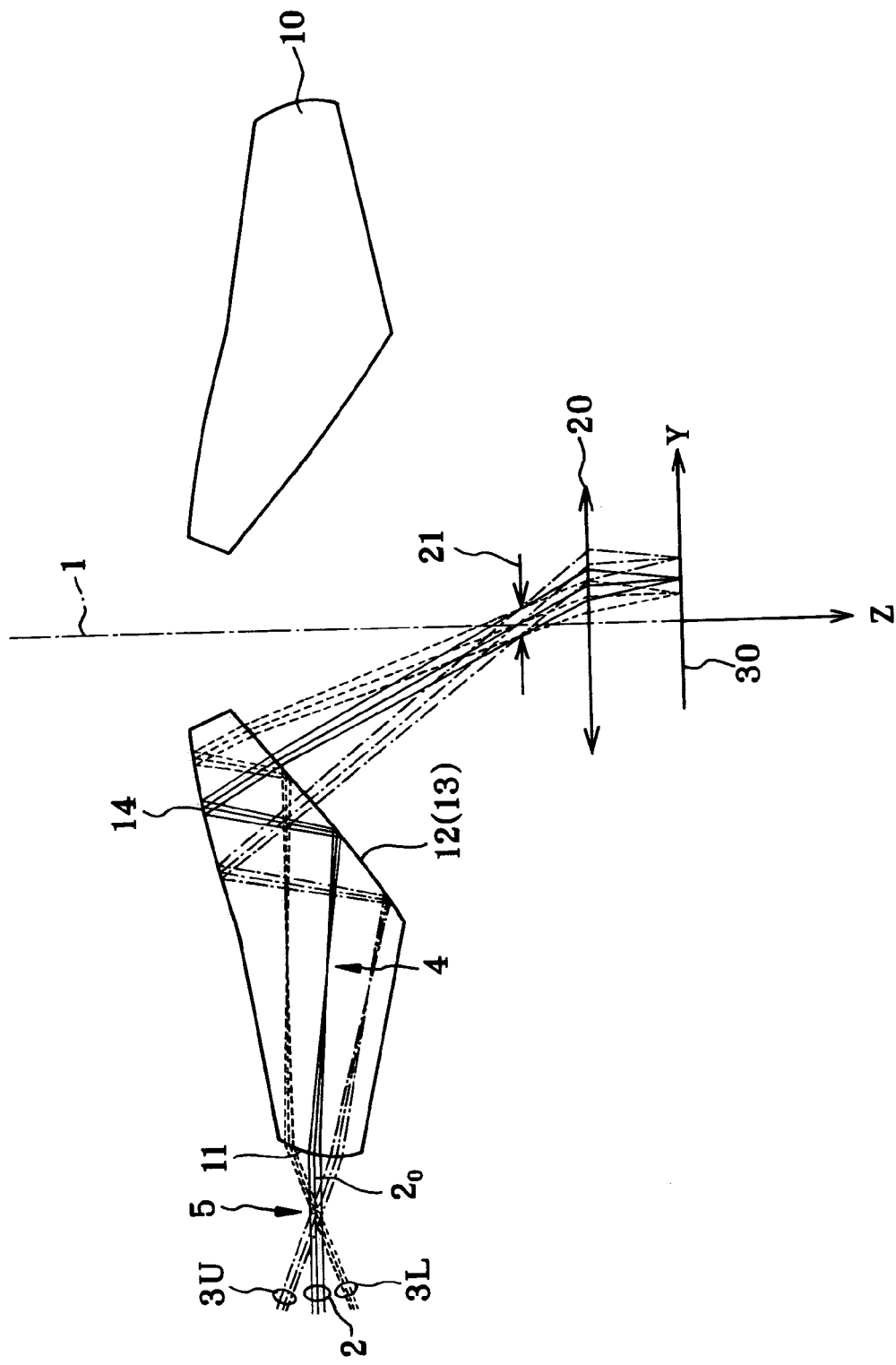
FIG. 33 is a view, as in FIG. 16, but with the panoramic attachment optical system of Example 14 according to the invention.
Figure 34:
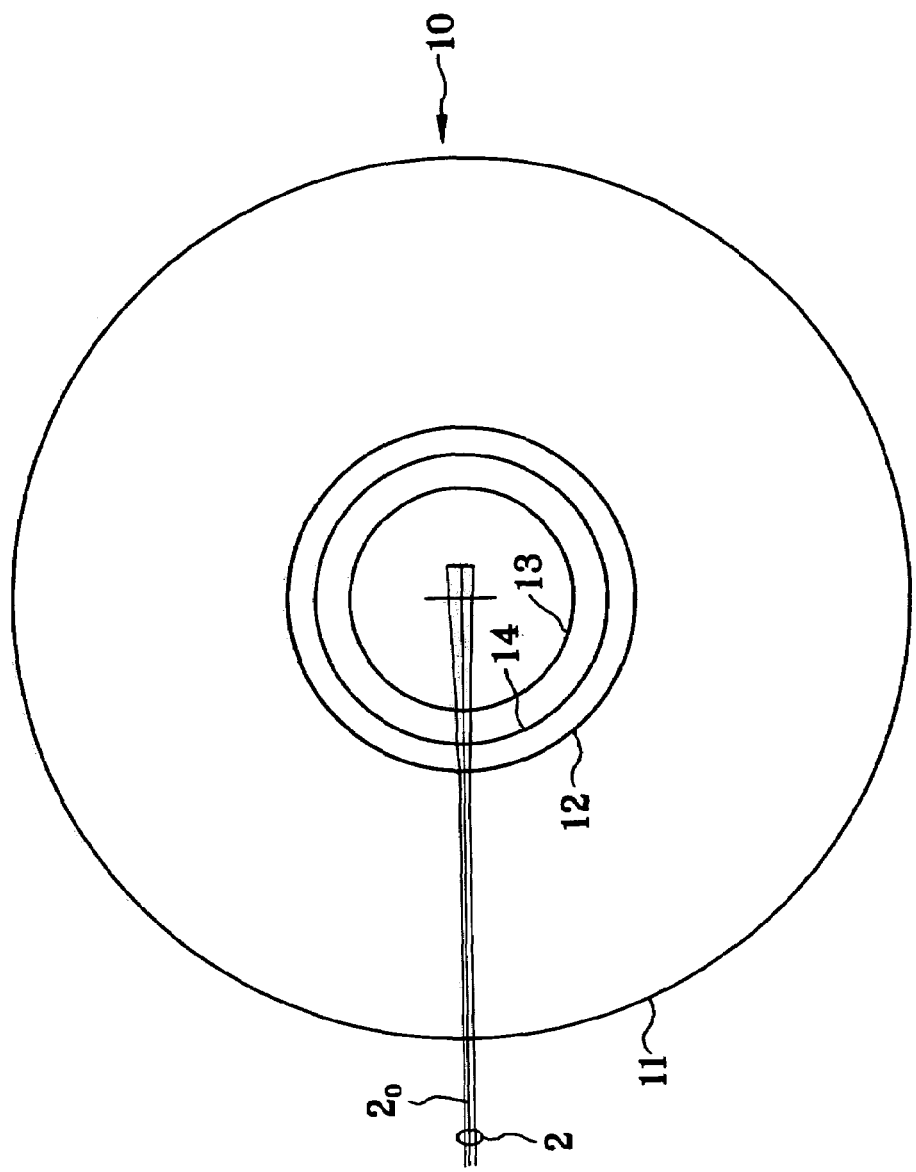
FIG. 34 is a view, as in FIG. 17, but with the panoramic attachment optical system of Example 14.

FIGS. 33 and 34 for the panoramic attachment optical system 10 of Example 14 are similar to FIGS. 16 and 17.

This example is directed to a panoramic attachment optical system 10 similar to that of Example 12 in that it comprises two internal reflecting surfaces, one of which is a combined total reflection and transmitting surface. The panoramic attachment optical system 10 is attached to the entrance side of an image-formation lens 20 composed of an ideal lens to form on an image plane 30 an image, for instance, a full 360°-direction (full-panoramic) image in the form of a circle whose zenithal direction turns away from the center of the image and whose horizon lies inside. The panoramic attachment optical system is made up of a transparent medium having a surface that is rotationally symmetric about a center axis 1 and composed of a Y-rotation free-form surface and that acts as an exit (refracting) surface 13 and also as an internal reflecting surface 12, an internal reflecting surface 14 composed of a Y-rotation free-form surface and an entrance (refracting) surface 11 composed of a Y-rotation free-form surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, and reflects successively at the internal reflecting surface 12 that also acts as the refracting surface 13 and the internal reflecting surface 14, one time each, leaving the panoramic attachment optical system 10 through the exit refracting surface 13, whereupon the light beam forms an image at a radially given position of the image plane 30 off the center axis 1 via a stop 21 for the image-formation lens 20.

In this example, the light beam passes through the reflecting surfaces 12, 14 and the refracting surfaces 11, 13 positioned on only one side of the center axis 1 in the panoramic attachment optical system 10. Light beams 2, 3U and 3L coming from far away form an image one time at or near a position 4 in the section of FIG. 33 including the rotationally symmetric axis 1, but they do not form any image in a plane (FIG. 34) that is orthogonal to that section and includes a center ray $2_0$ of the center light beam 2. An image (entrance pupil) of the stop 21 for the image-formation lens 20 is formed at an aerial position 5 on an object side with respect to the refracting surface 11 in the panoramic attachment optical system 10.

The specifications of Example 14 are:
Focal length of the ideal lens 20: 3.5 mm,
Horizontal angle of view: 360°,
Vertical angle of view: ±20°,
Entrance pupil diameter: 0.58 mm, and
Image size: φ2.69 to φ6.12 mm.

The constructional parameters in Examples 1-14 are now enumerated below. The acronyms "YTR", "ASS", "YRFS", "IDL" and "RE" used below stand for a Y-toric surface, an aspheric surface, a Y-rotation free-form surface, an ideal lens and a reflecting surface, respectively.

EXAMPLE 1

| Surface No. | Radius of curvature | Surface separation | Displacement and tilt | Refractive index | Abbe's No. |
|---|---|---|---|---|---|
| 1 | ∞(Object Plane) | | (1) | | |
| 2 | YTR[1] | | (2) | 1.5163 | 64.1 |
| 3 | YTR[2] (RE) | | (3) | 1.5163 | 64.1 |
| 4 | 12.82 | | (4) | | |
| 5 | ∞(Stop) | | (5) | | |
| 6 | IDL | | (6) | | |
| Image plane | ∞ | | | | |

YTR[1]

| | |
|---|---|
| Rx | 19.74 |
| Ry | 163.97 |
| k | 0 |

YTR[2]

| | |
|---|---|
| Rx | 6.66 |
| Ry | −19.44 |
| k | −1.0267 |
| a | −0.3123 × 10$^{-3}$ |
| b | 0.1191 × 10$^{-6}$ |

Displacement and tilt(1)

| | | | | | |
|---|---|---|---|---|---|
| X | 0.00 | Y | −∞ | Z | −39.11 |
| α | 90.00 | β | 0.00 | γ | 0.00 |

Displacement and tilt(2)

| | | | | | |
|---|---|---|---|---|---|
| X | 0.00 | Y | −19.74 | Z | −39.11 |
| α | 90.00 | β | 0.00 | γ | 0.00 |

Displacement and tilt(3)

| | | | | | |
|---|---|---|---|---|---|
| X | 0.00 | Y | −6.66 | Z | −29.91 |
| α | 90.00 | β | 0.00 | γ | 0.00 |

Displacement and tilt(4)

| | | | | | |
|---|---|---|---|---|---|
| X | 0.00 | Y | 0.00 | Z | −17.71 |
| α | 0.00 | β | 0.00 | γ | 0.00 |

Displacement and tilt(5)

| | | | | | |
|---|---|---|---|---|---|
| X | 0.00 | Y | 0.00 | Z | −7.71 |
| α | 0.00 | β | 0.00 | γ | 0.00 |

Displacement and tilt(6)

| | | | | | |
|---|---|---|---|---|---|
| X | 0.00 | Y | 0.00 | Z | −4.21 |
| α | 0.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| 1 | ∞(Object Plane) | | (1) | | |
| 2 | YTR[1] | | (2) | 1.5163 | 64.1 |
| 3 | YTR[2] (RE) | | (3) | 1.5163 | 64.1 |
| 4 | YTR[3] (RE) | | (4) | 1.5163 | 64.1 |
| 5 | ASS[1] | | (5) | | |
| 6 | ∞(Stop) | | (6) | | |
| 7 | IDL | | (7) | | |
| Image plane | ∞ | | | | |

YTR[1]

| | |
|---|---|
| Rx | 19.29 |
| Ry | 26.24 |
| k | 0 |

YTR[2]

| | |
|---|---|
| Rx | 5.54 |
| Ry | −119.40 |

-continued

|  |  |
|---|---|
| k | −4.8596 |
| a | −0.1128 × 10$^{-4}$ |

YTR[3]

|  |  |
|---|---|
| Rx | 49.04 |
| Ry | 66.93 |
| k | −1.1136 |
| a | 0.8469 × 10$^{-7}$ |

ASS[1]

|  |  |
|---|---|
| R | 0.2074 × 10$^{-5}$ |
| k | −1.7518 |
| a | −0.7777 × 10$^{-4}$ |

Displacement and tilt(1)

| X | 0.00 | Y | −∞ | Z | −41.87 |
|---|---|---|---|---|---|
| α | 90.00 | β | 0.00 | γ | 0.00 |

Displacement and tilt(2)

| X | 0.00 | Y | −19.29 | Z | −41.87 |
|---|---|---|---|---|---|
| α | 90.00 | β | 0.00 | γ | 0.00 |

Displacement and tilt(3)

| X | 0.00 | Y | −5.54 | Z | −56.11 |
|---|---|---|---|---|---|
| α | 90.00 | β | 0.00 | γ | 0.00 |

Displacement and tilt(4)

| X | 0.00 | Y | −49.04 | Z | 19.20 |
|---|---|---|---|---|---|
| α | 90.00 | β | 0.00 | γ | 0.00 |

Displacement and tilt(5)

| X | 0.00 | Y | 0.00 | Z | −48.25 |
|---|---|---|---|---|---|
| α | 0.00 | β | 0.00 | γ | 0.00 |

Displacement and tilt(6)

| X | 0.00 | Y | 0.00 | Z | −7.20 |
|---|---|---|---|---|---|
| α | 0.00 | β | 0.00 | γ | 0.00 |

Displacement and tilt(7)

| X | 0.00 | Y | 0.00 | Z | −3.70 |
|---|---|---|---|---|---|
| α | 0.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| 1 | ∞(Object Plane) |  | (1) |  |  |
| 2 | YTR[1] |  | (2) | 1.5163 | 64.1 |
| 3 | YTR[2] (RE) |  | (3) | 1.5163 | 64.1 |
| 4 | YTR[1] (RE) |  | (2) | 1.5163 | 64.1 |
| 5 | ASS[1] |  | (4) |  |  |
| 6 | ∞(Stop) |  | (5) |  |  |
| 7 | IDL |  | (6) |  |  |
| Image plane | ∞ |  |  |  |  |

YTR[1]

|  |  |
|---|---|
| Rx | 17.32 |
| Ry | 164.11 |
| k | −3376.0460 |
| a | 0.682813 × 10$^{-5}$ |

YTR[2]

|  |  |
|---|---|
| Rx | 8.77 |
| Ry | −14.56 |
| k | −1.0539 |
| a | 0.1483 × 10$^{-3}$ |

ASS[1]

|  |  |
|---|---|
| R | 0.1586 × 10$^{-31}$ |
| k | −1.2235 |
| a | −0.7285 × 10$^{-3}$ |

Displacement and tilt(1)

| X | 0.00 | Y | −∞ | Z | −47.97 |
|---|---|---|---|---|---|
| α | 90.00 | β | 0.00 | γ | 0.00 |

Displacement and tilt(2)

| X | 0.00 | Y | −17.32 | Z | −24.26 |
|---|---|---|---|---|---|
| α | 90.00 | β | 0.00 | γ | 0.00 |

Displacement and tilt(3)

| X | 0.00 | Y | −8.77 | Z | −42.12 |
|---|---|---|---|---|---|
| α | 90.00 | β | 0.00 | γ | 0.00 |

Displacement and tilt(4)

| X | 0.00 | Y | 0.00 | Z | −27.97 |
|---|---|---|---|---|---|
| α | 90.00 | β | 0.00 | γ | 0.00 |

Displacement and tilt(5)

| X | 0.00 | Y | 0.00 | Z | −7.62 |
|---|---|---|---|---|---|
| α | 0.00 | β | 0.00 | γ | 0.00 |

Displacement and tilt(6)

| X | 0.00 | Y | 0.00 | Z | −4.12 |
|---|---|---|---|---|---|
| α | 0.00 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| 1 | ∞(Object Plane) |  | (1) |  |  |
| 2 | YTR[1] |  | (2) | 1.5163 | 64.1 |
| 3 | YTR[2] (RE) |  | (3) | 1.5163 | 64.1 |
| 4 | YTR[3] (RE) |  | (4) | 1.5163 | 64.1 |
| 5 | ASS[1] |  | (5) |  |  |
| 6 | ∞(Stop) |  | (6) |  |  |
| 7 | IDL |  | (7) |  |  |
| Image plane | ∞ |  |  |  |  |

YTR[1]

|  |  |
|---|---|
| Rx | 17.11 |
| Ry | −34.45 |
| k | 0 |

YTR[2]

|  |  |
|---|---|
| Rx | 9.40 |
| Ry | −12.21 |
| k | −1.3085 |

YTR[3]

|  |  |
|---|---|
| Rx | 17.11 |
| Ry | 107.143 |
| k | 526.7861 |

ASS[1]

|  |  |
|---|---|
| R | 0.2074 × 10$^{-5}$ |
| k | −1.2235 |

Displacement and tilt(1)

| X | 0.00 | Y | −∞ | Z | −46.63 |
|---|---|---|---|---|---|
| α | 90.00 | β | 0.00 | γ | 0.00 |

-continued

Displacement and tilt(2)

| | | | | | |
|---|---|---|---|---|---|
| X | 0.00 | Y | −17.11 | Z | −46.63 |
| α | 90.00 | β | 0.00 | γ | 0.00 |

Displacement and tilt(3)

| | | | | | |
|---|---|---|---|---|---|
| X | 0.00 | Y | −9.40 | Z | −40.07 |
| α | 90.00 | β | 0.00 | γ | 0.00 |

Displacement and tilt(4)

| | | | | | |
|---|---|---|---|---|---|
| X | 0.00 | Y | −17.11 | Z | −38.24 |
| α | 90.00 | β | 0.00 | γ | 0.00 |

Displacement and tilt(5)

| | | | | | |
|---|---|---|---|---|---|
| X | 0.00 | Y | 0.00 | Z | −26.59 |
| α | 0.00 | β | 0.00 | γ | 0.00 |

Displacement and tilt(6)

| | | | | | |
|---|---|---|---|---|---|
| X | 0.00 | Y | 0.00 | Z | −7.68 |
| α | 0.00 | β | 0.00 | γ | 0.00 |

Displacement and tilt(7)

| | | | | | |
|---|---|---|---|---|---|
| X | 0.00 | Y | 0.00 | Z | −4.18 |
| α | 0.00 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| 1 | ∞(Object Plane) | | (1) | | |
| 2 | YTR[1] | | (2) | 1.5163 | 64.1 |
| 3 | YTR[2] (RE) | | (3) | 1.5163 | 64.1 |
| 4 | YTR[3] (RE) | | (4) | 1.5163 | 64.1 |
| 5 | YTR[4] (RE) | | (5) | 1.5163 | 64.1 |
| 6 | −11.93 | | (6) | | |
| 7 | ∞(Stop) | | (7) | | |
| 8 | IDL | | (8) | | |
| Image plane | ∞ | | | | |

YTR[1]

| | |
|---|---|
| Rx | 12.57 |
| Ry | −79.55 |
| k | 0 |

YTR[2]

| | |
|---|---|
| Rx | 5.52 |
| Ry | −34.79 |
| k | 1.5640 |
| a | −0.3885 × 10$^{-4}$ |

YTR[3]

| | |
|---|---|
| Rx | 15.30 |
| Ry | 0.28 |
| k | −3.7837 |
| a | −0.1149 × 10$^{-3}$ |

YTR[4]

| | |
|---|---|
| Rx | 13.74 |
| Ry | 0.28 |
| k | −1.8975 |
| a | −0.1224 × 10$^{-4}$ |

Displacement and tilt(1)

| | | | | | |
|---|---|---|---|---|---|
| X | 0.00 | Y | −∞ | Z | −31.51 |
| α | 90.00 | β | 0.00 | γ | 0.00 |

-continued

Displacement and tilt(2)

| | | | | | |
|---|---|---|---|---|---|
| X | 0.00 | Y | −12.57 | Z | −22.59 |
| α | 90.00 | β | 0.00 | γ | 0.00 |

Displacement and tilt(3)

| | | | | | |
|---|---|---|---|---|---|
| X | 0.00 | Y | −5.52 | Z | −20.69 |
| α | 90.00 | β | 0.00 | γ | 0.00 |

Displacement and tilt(4)

| | | | | | |
|---|---|---|---|---|---|
| X | 0.00 | Y | −15.30 | Z | −31.49 |
| α | 90.00 | β | 0.00 | γ | 0.00 |

Displacement and tilt(5)

| | | | | | |
|---|---|---|---|---|---|
| X | 0.00 | Y | −13.74 | Z | −34.40 |
| α | 90.00 | β | 0.00 | γ | 0.00 |

Displacement and tilt(6)

| | | | | | |
|---|---|---|---|---|---|
| X | 0.00 | Y | 0.00 | Z | −17.47 |
| α | 0.00 | β | 0.00 | γ | 0.00 |

Displacement and tilt(7)

| | | | | | |
|---|---|---|---|---|---|
| X | 0.00 | Y | 0.00 | Z | −7.47 |
| α | 0.00 | β | 0.00 | γ | 0.00 |

Displacement and tilt(8)

| | | | | | |
|---|---|---|---|---|---|
| X | 0.00 | Y | 0.00 | Z | −3.97 |
| α | 0.00 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | ∞ | (1) | | |
| 1 | ∞ (Entrance Pupil) | | (2) | | |
| 2 | YRFS[1] | | (3) | 1.5163 | 64.1 |
| 3 | YRFS[2] (RE) | | (4) | 1.5163 | 64.1 |
| 4 | ASS[1] | | (5) | | |
| 5 | ∞(Stop) | | (6) | | |
| 6 | IDL | | (7) | | |
| Image plane | ∞ | | | | |

YRFS[1]

| | | | | | |
|---|---|---|---|---|---|
| $C_1$ | −3.5383 × 10 | $C_2$ | 8.7111 × 10$^{-1}$ | $C_3$ | 1.7567 × 10$^{-1}$ |

YRFS[2]

| | | | | | |
|---|---|---|---|---|---|
| $C_1$ | −1.4169 × 10 | $C_2$ | −1.0078 | $C_3$ | −1.8279 × 10$^{-2}$ |
| $C_4$ | −2.8146 × 10$^{-4}$ | | | | |

ASS[1]

| | |
|---|---|
| R | 0.03 |
| k | −1.7097 × 10$^{23}$ |
| a | 2.1865 × 10$^{-5}$ |

Displacement and tilt(1)

| | | | | | |
|---|---|---|---|---|---|
| X | 0.00 | Y | ∞ | Z | 43.60 |
| α | −90.00 | β | 0.00 | γ | 0.00 |

Displacement and tilt(2)

| | | | | | |
|---|---|---|---|---|---|
| X | 0.00 | Y | 35.20 | Z | 43.60 |
| α | −90.00 | β | 0.00 | γ | 0.00 |

-continued

| | | | | | |
|---|---|---|---|---|---|
| Displacement and tilt(3) | | | | | |
| X | 0.00 | Y | 0.00 | Z | 43.60 |
| α | −90.00 | β | 0.00 | γ | 0.00 |
| Displacement and tilt(4) | | | | | |
| X | 0.00 | Y | 0.00 | Z | 37.75 |
| α | −90.00 | β | 0.00 | γ | 0.00 |
| Displacement and tilt(5) | | | | | |
| X | 0.00 | Y | 0.00 | Z | 27.31 |
| α | 0.00 | β | 0.00 | γ | 0.00 |
| Displacement and tilt(6) | | | | | |
| X | 0.00 | Y | 0.00 | Z | 7.37 |
| α | 0.00 | β | 0.00 | γ | 0.00 |
| Displacement and tilt(7) | | | | | |
| X | 0.00 | Y | 0.00 | Z | 3.87 |
| α | 0.00 | β | 0.00 | γ | 0.00 |

EXAMPLE 7

| Surface No. | Radius of curvature | Surface separation | Displacement and tilt | Refractive index | Abbe's No. |
|---|---|---|---|---|---|
| Object plane | ∞ | ∞ | (1) | | |
| 1 | ∞ (Entrance Pupil) | | (2) | | |
| 2 | YRFS[1] | | (3) | 1.5163 | 64.1 |
| 3 | YRFS[2] (RE) | | (3) | 1.5163 | 64.1 |
| 4 | ASS[1] (RE) | | (4) | 1.5163 | 64.1 |
| 5 | ASS[2] | | (5) | | |
| 6 | ∞(Stop) | | (6) | | |
| 7 | IDL | | (7) | | |
| Image plane | ∞ | | | | |

| | | | | | |
|---|---|---|---|---|---|
| YRFS[1] | | | | | |
| $C_1$ | −1.2852 × 10 | $C_3$ | 4.5019 × 10⁻¹ | | |
| YRFS[2] | | | | | |
| $C_1$ | −6.2300 | $C_2$ | −8.6484 × 10⁻¹ | $C_3$ | −5.6275 × 10⁻² |
| $C_4$ | −4.3710 × 10⁻³ | | | | |
| ASS[1] | | | | | |
| R | | 30.63 | | | |
| k | | −9.9408 × 10⁻¹ | | | |
| a | | 1.7365 × 10⁻⁵ | | | |
| ASS[2] | | | | | |
| R | | 5.64 | | | |
| k | | 0.0000 | | | |
| a | | 1.0508 × 10⁻² | | | |
| Displacement and tilt(1) | | | | | |
| X | 0.00 | Y | ∞ | Z | −7.26 |
| α | −90.00 | β | 0.00 | γ | 0.00 |
| Displacement and tilt(2) | | | | | |
| X | 0.00 | Y | 11.69 | Z | −7.26 |
| α | −90.00 | β | 0.00 | γ | 0.00 |
| Displacement and tilt(3) | | | | | |
| X | 0.00 | Y | 0.00 | Z | −7.26 |
| α | −90.00 | β | 0.00 | γ | 0.00 |

-continued

| | | | | | |
|---|---|---|---|---|---|
| Displacement and tilt(4) | | | | | |
| X | 0.00 | Y | 0.00 | Z | −25.47 |
| α | 0.00 | β | 0.00 | γ | 0.00 |
| Displacement and tilt(5) | | | | | |
| X | 0.00 | Y | 0.00 | Z | −11.39 |
| α | 0.00 | β | 0.00 | γ | 0.00 |
| Displacement and tilt(6) | | | | | |
| X | 0.00 | Y | 0.00 | Z | −7.86 |
| α | 0.00 | β | 0.00 | γ | 0.00 |
| Displacement and tilt(7) | | | | | |
| X | 0.00 | Y | 0.00 | Z | −4.36 |
| α | 0.00 | β | 0.00 | γ | 0.00 |

EXAMPLE 8

| Surface No. | Radius of curvature | Surface separation | Displacement and tilt | Refractive index | Abbe's No. |
|---|---|---|---|---|---|
| Object plane | ∞ | ∞ | (1) | | |
| 1 | ∞ (Entrance Pupil) | | (2) | | |
| 2 | YRFS[1] | | (3) | 1.5163 | 64.1 |
| 3 | YRFS[2] (RE) | | (3) | 1.5163 | 64.1 |
| 4 | ASS[1] (RE) | | (4) | 1.5163 | 64.1 |
| 5 | ASS[2] | | (5) | | |
| 6 | ∞(Stop) | | (6) | | |
| 7 | IDL | | (7) | | |
| Image plane | ∞ | | | | |

| | | | | | |
|---|---|---|---|---|---|
| YRFS[1] | | | | | |
| $C_1$ | −2.6070 × 10 | $C_3$ | 1.4404 × 10⁻¹ | | |
| YRFS[2] | | | | | |
| $C_1$ | −1.2742 × 10 | $C_2$ | 9.7226 × 10⁻¹ | $C_3$ | −1.8719 × 10⁻² |
| ASS[1] | | | | | |
| R | | 60.70 | | | |
| k | | 0.0000 | | | |
| a | | 5.5059 × 10⁻⁶ | | | |
| ASS[2] | | | | | |
| R | | 10.59 | | | |
| k | | 0.0000 | | | |
| a | | −1.6602 × 10⁻⁴ | | | |
| Displacement and tilt(1) | | | | | |
| X | 0.00 | Y | ∞ | Z | −12.76 |
| α | 90.00 | β | 0.00 | γ | 0.00 |
| Displacement and tilt(2) | | | | | |
| X | 0.00 | Y | −26.77 | Z | −12.76 |
| α | 90.00 | β | 0.00 | γ | 0.00 |
| Displacement and tilt(3) | | | | | |
| X | 0.00 | Y | 0.00 | Z | −12.76 |
| α | 90.00 | β | 0.00 | γ | 0.00 |
| Displacement and tilt(4) | | | | | |
| X | 0.00 | Y | 0.00 | Z | −32.60 |
| α | 0.00 | β | 0.00 | γ | 0.00 |

-continued

| | | Displacement and tilt(5) | | | |
|---|---|---|---|---|---|
| X | 0.00 | Y | 0.00 | Z | −19.84 |
| α | 0.00 | β | 0.00 | γ | 0.00 |
| | | Displacement and tilt(6) | | | |
| X | 0.00 | Y | 0.00 | Z | −7.32 |
| α | 0.00 | β | 0.00 | γ | 0.00 |
| | | Displacement and tilt(7) | | | |
| X | 0.00 | Y | 0.00 | Z | −3.82 |
| α | 0.00 | β | 0.00 | γ | 0.00 |

EXAMPLE 9

| Surface No. | Radius of curvature | Surface separation | Displacement and tilt | Refractive index | Abbe's No. |
|---|---|---|---|---|---|
| Object plane | ∞ | ∞ | (1) | | |
| 1 | ∞ (Entrance Pupil) | | (2) | | |
| 2 | YRFS[1] | | (3) | 1.5163 | 64.1 |
| 3 | YRFS[2] (RE) | | (3) | 1.5163 | 64.1 |
| 4 | YRFS[3] (RE) | | (4) | 1.5163 | 64.1 |
| 5 | YRFS[4] | | (5) | | |
| 6 | ∞(Stop) | | (6) | | |
| 7 | IDL | | (7) | | |
| Image plane | ∞ | | | | |

| YRFS[1] | | | | | |
|---|---|---|---|---|---|
| $C_1$ | $-3.0440 \times 10$ | $C_2$ | $-5.3356 \times 10^{-16}$ | $C_3$ | $1.0000 \times 10^{-2}$ |
| YRFS[2] | | | | | |
| $C_1$ | $-1.3822 \times 10$ | $C_2$ | $3.2869 \times 10^{-1}$ | $C_3$ | $-5.0144 \times 10^{-2}$ |
| YRFS[3] | | | | | |
| $C_1$ | $-2.7077 \times 10$ | $C_2$ | $1.0779$ | $C_3$ | $4.5428 \times 10^{-2}$ |
| $C_4$ | $1.2867 \times 10^{-3}$ | | | | |
| YRFS[4] | | | | | |
| $C_1$ | $-1.7361 \times 10$ | $C_2$ | $1.3428$ | $C_3$ | $-1.2568 \times 10^{-1}$ |
| $C_4$ | $7.1725 \times 10^{-3}$ | | | | |

| | | Displacement and tilt(1) | | | |
|---|---|---|---|---|---|
| X | 0.00 | Y | ∞ | Z | −43.04 |
| α | 90.00 | β | 0.00 | γ | 0.00 |
| | | Displacement and tilt(2) | | | |
| X | 0.00 | Y | −18.69 | Z | −43.04 |
| α | 90.00 | β | 0.00 | γ | 0.00 |
| | | Displacement and tilt(3) | | | |
| X | 0.00 | Y | 0.00 | Z | −43.04 |
| α | 90.00 | β | 0.00 | γ | 0.00 |
| | | Displacement and tilt(4) | | | |
| X | 0.00 | Y | 0.00 | Z | −52.81 |
| α | 90.00 | β | 0.00 | γ | 0.00 |
| | | Displacement and tilt(5) | | | |
| X | 0.00 | Y | 0.00 | Z | −37.32 |
| α | 90.00 | β | 0.00 | γ | 0.00 |
| | | Displacement and tilt(6) | | | |
| X | 0.00 | Y | 0.00 | Z | −7.02 |
| α | 0.00 | β | 0.00 | γ | 0.00 |
| | | Displacement and tilt(7) | | | |
| X | 0.00 | Y | 0.00 | Z | −3.52 |
| α | 0.00 | β | 0.00 | γ | 0.00 |

EXAMPLE 10

| Surface No. | Radius of curvature | Surface separation | Displacement and tilt | Refractive index | Abbe's No. |
|---|---|---|---|---|---|
| Object plane | ∞ | ∞ | (1) | | |
| 1 | ∞ (Entrance Pupil) | | (2) | | |
| 2 | YRFS[1] | | (3) | 1.5163 | 64.1 |
| 3 | YRFS[2] (RE) | | (4) | 1.5163 | 64.1 |
| 4 | YRFS[3] (RE) | | (5) | 1.5163 | 64.1 |
| 5 | YRFS[4] | | (6) | | |
| 6 | ∞(Stop) | | (7) | | |
| 7 | IDL | | (8) | | |
| Image plane | ∞ | | | | |

| YRFS[1] | | | | | |
|---|---|---|---|---|---|
| $C_1$ | $-1.6405 \times 10$ | $C_2$ | $6.6473 \times 10^{-1}$ | $C_3$ | $2.0000 \times 10^{-1}$ |
| YRFS[2] | | | | | |
| $C_1$ | $-1.1082 \times 10$ | $C_2$ | $-3.7446 \times 10^{-1}$ | $C_3$ | $-7.7055 \times 10^{-2}$ |
| $C_4$ | $4.7531 \times 10^{-2}$ | | | | |
| YRFS[3] | | | | | |
| $C_1$ | $-1.7643 \times 10$ | $C_2$ | $2.5415 \times 10^{-2}$ | $C_3$ | $1.1674 \times 10^{-1}$ |
| $C_4$ | $2.5568 \times 10^{-4}$ | | | | |
| YRFS[4] | | | | | |
| $C_1$ | $-1.4545 \times 10$ | $C_2$ | $1.1254$ | $C_3$ | $-8.0058 \times 10^{-2}$ |

| | | Displacement and tilt(1) | | | |
|---|---|---|---|---|---|
| X | 0.00 | Y | ∞ | Z | −47.29 |
| α | 90.00 | β | 0.00 | γ | 0.00 |
| | | Displacement and tilt(2) | | | |
| X | 0.00 | Y | −12.73 | Z | −47.29 |
| α | 90.00 | β | 0.00 | γ | 0.00 |
| | | Displacement and tilt(3) | | | |
| X | 0.00 | Y | 0.00 | Z | −47.29 |
| α | 90.00 | β | 0.00 | γ | 0.00 |
| | | Displacement and tilt(4) | | | |
| X | 0.00 | Y | 0.00 | Z | −46.14 |
| α | 90.00 | β | 0.00 | γ | 0.00 |
| | | Displacement and tilt(5) | | | |
| X | 0.00 | Y | 0.00 | Z | −37.34 |
| α | 90.00 | β | 0.00 | γ | 0.00 |
| | | Displacement and tilt(6) | | | |
| X | 0.00 | Y | 0.00 | Z | −32.71 |
| α | 90.00 | β | 0.00 | γ | 0.00 |
| | | Displacement and tilt(7) | | | |
| X | 0.00 | Y | 0.00 | Z | −7.08 |
| α | 0.00 | β | 0.00 | γ | 0.00 |

-continued

|  | Displacement and tilt(8) | | | | |
|---|---|---|---|---|---|
| X | 0.00 | Y | 0.00 | Z | −3.58 |
| α | 0.00 | β | 0.00 | γ | 0.00 |

EXAMPLE 11

| Surface No. | Radius of curvature | Surface separation | Displacement and tilt | Refractive index | Abbe's No. |
|---|---|---|---|---|---|
| Object plane | ∞ | ∞ | (1) | | |
| 1 | ∞(Entrance Pupil) | | (2) | | |
| 2 | YRFS[1] | | (3) | 1.5163 | 64.1 |
| 3 | YRFS[2] (RE) | | (4) | 1.5163 | 64.1 |
| 4 | YRFS[3] (RE) | | (5) | 1.5163 | 64.1 |
| 5 | ASS[1] (RE) | | (6) | 1.5163 | 64.1 |
| 6 | YRFS[4] | | (7) | | |
| 7 | ∞(Stop) | | (8) | | |
| 8 | IDL | | (9) | | |
| Image plane | ∞ | | | | |

YRFS[1]

$C_1$ −2.3906 × 10  $C_2$ 1.2749 × 10$^{-1}$  $C_3$ 2.3851 × 10$^{-1}$

YRFS[2]

$C_1$ −2.4035  $C_2$ 4.2282 × 10$^{-1}$  $C_3$ −2.1995 × 10$^{-2}$
$C_4$ 2.6644 × 10$^{-4}$

YRFS[3]

$C_1$ −1.2146 × 10  $C_2$ 2.2395  $C_3$ −1.5821 × 10$^{-1}$
$C_4$ 1.1353 × 10$^{-2}$

YRFS[4]

$C_1$ −2.6985  $C_2$ −1.3266  $C_3$ 6.2969 × 10$^{-2}$

ASS[1]

R  42.83
k  −1.0252
a  2.1854 × 10$^{-6}$

|  | Displacement and tilt(1) | | | | |
|---|---|---|---|---|---|
| X | 0.00 | Y | ∞ | Z | 17.94 |
| α | 90.00 | β | 0.00 | γ | 0.00 |
|  | Displacement and tilt(2) | | | | |
| X | 0.00 | Y | −23.77 | Z | 17.94 |
| α | 90.00 | β | 0.00 | γ | 0.00 |
|  | Displacement and tilt(3) | | | | |
| X | 0.00 | Y | 0.00 | Z | 17.94 |
| α | 90.00 | β | 0.00 | γ | 0.00 |
|  | Displacement and tilt(4) | | | | |
| X | 0.00 | Y | 0.00 | Z | 18.88 |
| α | 90.00 | β | 0.00 | γ | 0.00 |
|  | Displacement and tilt(5) | | | | |
| X | 0.00 | Y | 0.00 | Z | 9.68 |
| α | 90.00 | β | 0.00 | γ | 0.00 |
|  | Displacement and tilt(6) | | | | |
| X | 0.00 | Y | 0.00 | Z | 25.32 |
| α | −180.00 | β | 0.00 | γ | 0.00 |

-continued

|  | Displacement and tilt(7) | | | | |
|---|---|---|---|---|---|
| X | 0.00 | Y | 0.00 | Z | 10.05 |
| α | 90.00 | β | 0.00 | γ | 0.00 |
|  | Displacement and tilt(8) | | | | |
| X | 0.00 | Y | 0.00 | Z | 5.68 |
| α | 0.00 | β | 0.00 | γ | 0.00 |
|  | Displacement and tilt(9) | | | | |
| X | 0.00 | Y | 0.00 | Z | 2.18 |
| α | 0.00 | β | 0.00 | γ | 0.00 |

EXAMPLE 12

| Surface No. | Radius of curvature | Surface separation | Displacement and tilt | Refractive index | Abbe's No. |
|---|---|---|---|---|---|
| Object plane | ∞ | ∞ | (1) | | |
| 1 | ∞(Entrance Pupil) | | (2) | | |
| 2 | YRFS[1] | | (3) | 1.5163 | 64.1 |
| 3 | YRFS[2] (RE) | | (4) | 1.5163 | 64.1 |
| 4 | YRFS[1] (RE) | | (3) | 1.5163 | 64.1 |
| 5 | YRFS[3] | | (5) | | |
| 6 | ∞(Stop) | | (6) | | |
| 7 | IDL | | (7) | | |
| Image plane | ∞ | | | | |

YRFS[1]

$C_1$ −2.0957 × 10  $C_2$ −1.4367 × 10$^{-1}$  $C_3$ −8.4858 × 10$^{-3}$
$C_4$ 3.1420 × 10$^{-4}$

YRFS[2]

$C_1$ −1.8248 × 10  $C_2$ −7.4474 × 10$^{-1}$  $C_3$ −3.1827 × 10$^{-2}$
$C_4$ −5.1999 × 10$^{-4}$

YRFS[3]

$C_1$ −1.6800 × 10  $C_2$ 7.7566 × 10$^{-1}$  $C_3$ −7.4491 × 10$^{-2}$
$C_4$ 6.8835 × 10$^{-3}$

|  | Displacement and tilt(1) | | | | |
|---|---|---|---|---|---|
| X | 0.00 | Y | ∞ | Z | −49.80 |
| α | 90.00 | β | 0.00 | γ | 0.00 |
|  | Displacement and tilt(2) | | | | |
| X | 0.00 | Y | −36.45 | Z | −49.80 |
| α | 90.00 | β | 0.00 | γ | 0.00 |
|  | Displacement and tilt(3) | | | | |
| X | 0.00 | Y | 0.00 | Z | −42.97 |
| α | 90.00 | β | 0.00 | γ | 0.00 |
|  | Displacement and tilt(4) | | | | |
| X | 0.00 | Y | 0.00 | Z | −50.09 |
| α | 90.00 | β | 0.00 | γ | 0.00 |
|  | Displacement and tilt(5) | | | | |
| X | 0.00 | Y | 0.00 | Z | −37.49 |
| α | 90.00 | β | 0.00 | γ | 0.00 |
|  | Displacement and tilt(6) | | | | |
| X | 0.00 | Y | 0.00 | Z | −7.36 |
| α | 0.00 | β | 0.00 | γ | 0.00 |

|  | -continued | | | | |
|---|---|---|---|---|---|
| | Displacement and tilt(7) | | | | |
| X | 0.00 | Y | 0.00 | Z | −3.86 |
| α | 0.00 | β | 0.00 | γ | 0.00 |

EXAMPLE 13

| Surface No. | Radius of curvature | Surface separation | Displacement and tilt | Refractive index | Abbe's No. |
|---|---|---|---|---|---|
| Object plane | ∞ | ∞ | (1) | | |
| 1 | ∞(Entrance Pupil) | | (2) | | |
| 2 | YRFS[1] | | (3) | 1.5163 | 64.1 |
| 3 | YRFS[2] (RE) | | (4) | 1.5163 | 64.1 |
| 4 | YRFS[3] (RE) | | (5) | 1.5163 | 64.1 |
| 5 | YRFS[4] (RE) | | (6) | 1.5163 | 64.1 |
| 6 | YRFS[5] (RE) | | (7) | 1.5163 | 64.1 |
| 7 | YRFS[6] | | (8) | | |
| 8 | ∞(Stop) | | (9) | | |
| 9 | IDL | | (10) | | |
| Image plane | ∞ | | | | |

| | | YRFS[1] | | | |
|---|---|---|---|---|---|
| $C_1$ | $-3.0515 \times 10$ | $C_2$ | 1.5355 | $C_3$ | $2.0000 \times 10^{-1}$ |
| | | YRFS[2] | | | |
| $C_1$ | $-2.5421 \times 10$ | $C_2$ | $-1.6454 \times 10^{-1}$ | $C_3$ | $-1.6776 \times 10^{-2}$ |
| $C_4$ | $9.4176 \times 10^{-4}$ | | | | |
| | | YRFS[3] | | | |
| $C_1$ | $-3.0605 \times 10$ | $C_2$ | $-2.1550 \times 10^{-1}$ | $C_3$ | $-7.1384 \times 10^{-2}$ |
| $C_4$ | $-7.6576 \times 10^{-3}$ | | | | |
| | | YRFS[4] | | | |
| $C_1$ | $-2.3115 \times 10$ | $C_2$ | $-3.8354 \times 10^{-1}$ | $C_3$ | $-1.4435 \times 10^{-2}$ |
| $C_4$ | $-2.2044 \times 10^{-4}$ | | | | |
| | | YRFS[5] | | | |
| $C_1$ | $-2.9802 \times 10$ | $C_2$ | $-1.0856 \times 10^{-1}$ | $C_3$ | $3.9619 \times 10^{-3}$ |
| $C_4$ | $8.1575 \times 10^{-5}$ | | | | |
| | | YRFS[6] | | | |
| $C_1$ | $-2.3262 \times 10$ | $C_2$ | $4.6529 \times 10^{-1}$ | $C_3$ | $-1.1954 \times 10^{-2}$ |
| $C_7$ | $-2.5168 \times 10^{-8}$ | | | | |

| | Displacement and tilt(1) | | | | |
|---|---|---|---|---|---|
| X | 0.00 | Y | ∞ | Z | −75.86 |
| α | 90.00 | β | 0.00 | γ | 0.00 |
| | Displacement and tilt(2) | | | | |
| X | 0.00 | Y | −30.46 | Z | −75.86 |
| α | 90.00 | β | 0.00 | γ | 0.00 |
| | Displacement and tilt(3) | | | | |
| X | 0.00 | Y | 0.00 | Z | −75.86 |
| α | 90.00 | β | 0.00 | γ | 0.00 |
| | Displacement and tilt(4) | | | | |
| X | 0.00 | Y | 0.00 | Z | −73.65 |
| α | 90.00 | β | 0.00 | γ | 0.00 |
| | Displacement and tilt(5) | | | | |
| X | 0.00 | Y | 0.00 | Z | −68.96 |
| α | 90.00 | β | 0.00 | γ | 0.00 |

|  | -continued | | | | |
|---|---|---|---|---|---|
| | Displacement and tilt(6) | | | | |
| X | 0.00 | Y | 0.00 | Z | −66.56 |
| α | 90.00 | β | 0.00 | γ | 0.00 |
| | Displacement and tilt(7) | | | | |
| X | 0.00 | Y | 0.00 | Z | −55.09 |
| α | 90.00 | β | 0.00 | γ | 0.00 |
| | Displacement and tilt(8) | | | | |
| X | 0.00 | Y | 0.00 | Z | −47.99 |
| α | 90.00 | β | 0.00 | γ | 0.00 |
| | Displacement and tilt(9) | | | | |
| X | 0.00 | Y | 0.00 | Z | −7.05 |
| α | 0.00 | β | 0.00 | γ | 0.00 |
| | Displacement and tilt(10) | | | | |
| X | 0.00 | Y | 0.00 | Z | −3.55 |
| α | 0.00 | β | 0.00 | γ | 0.00 |

EXAMPLE 14

| Surface No. | Radius of curvature | Surface separation | Displacement and tilt | Refractive index | Abbe's No. |
|---|---|---|---|---|---|
| Object plane | ∞ | ∞ | (1) | | |
| 1 | ∞(Entrance Pupil) | | (2) | | |
| 2 | YRFS[1] | | (3) | 1.5163 | 64.1 |
| 3 | YRFS[2] (RE) | | (4) | 1.5163 | 64.1 |
| 4 | YRFS[3] (RE) | | (5) | 1.5163 | 64.1 |
| 5 | YRFS[2] | | (4) | | |
| 6 | ∞(Stop) | | (6) | | |
| 7 | IDL | | (7) | | |
| Image plane | ∞ | | | | |

| | | YRFS[1] | | | |
|---|---|---|---|---|---|
| $C_1$ | $-2.5486 \times 10$ | $C_2$ | $2.5415 \times 10^{-1}$ | $C_3$ | $1.5770 \times 10^{-1}$ |
| | | YRFS[2] | | | |
| $C_1$ | $-9.8843$ | $C_2$ | 1.3864 | $C_3$ | $-3.8493 \times 10^{-2}$ |
| $C_5$ | $7.5808 \times 10^{-4}$ | | | | |
| | | YRFS[3] | | | |
| $C_1$ | $-8.4191$ | $C_2$ | 6.0188 | $C_3$ | 2.0124 |
| $C_4$ | $5.2928 \times 10^{-1}$ | | | | |

| | Displacement and tilt(1) | | | | |
|---|---|---|---|---|---|
| X | 0.00 | Y | ∞ | Z | −17.54 |
| α | 90.00 | β | 0.00 | γ | 0.00 |
| | Displacement and tilt(2) | | | | |
| X | 0.00 | Y | −28.19 | Z | −17.54 |
| α | 90.00 | β | 0.00 | γ | 0.00 |
| | Displacement and tilt(3) | | | | |
| X | 0.00 | Y | 0.00 | Z | −17.54 |
| α | 90.00 | β | 0.00 | γ | 0.00 |
| | Displacement and tilt(4) | | | | |
| X | 0.00 | Y | 0.00 | Z | −16.20 |
| α | 90.00 | β | 0.00 | γ | 0.00 |
| | Displacement and tilt(5) | | | | |
| X | 0.00 | Y | 0.00 | Z | −22.32 |
| α | 90.00 | β | 0.00 | γ | 0.00 |

-continued

|   | Displacement and tilt(6) |   |      |   |       |
|---|---|---|------|---|-------|
| X | 0.00 | Y | 0.00 | Z | −7.57 |
| α | 0.00 | β | 0.00 | γ | 0.00  |
|   | Displacement and tilt(7) |   |      |   |       |
| X | 0.00 | Y | 0.00 | Z | −4.07 |
| α | 0.00 | β | 0.00 | γ | 0.00  |

Enumerated below are the angles (°) of incidence on the internal reflecting surfaces in Example 1-14 of the center light ray $2_0$ of the center light beam 2 coming from far way.

| Example | 1st RE | 2nd RE | 3rd RE | 4th RE |
|---|---|---|---|---|
| 1 | 54.424 | | | |
| 2 | 13.852 | 18.151 | | |
| 3 | 22.523 | 47.435 | | |
| 4 | 27.240 | 54.479 | | |
| 5 | 27.692 | 31.127 | 50.004 | |
| 6 | 60.647 | | | |
| 7 | 40.855 | 9.934 | | |
| 8 | 44.194 | 13.766 | | |
| 9 | 18.195 | 10.755 | | |
| 10 | 32.758 | 54.742 | | |
| 11 | 20.432 | 22.586 | 17.606 | |
| 12 | 32.489 | 60.989 | | |
| 13 | 32.772 | 29.955 | 38.778 | 53.570 |
| 14 | 49.275 | 22.905 | | |

With the panoramic attachment optical system of the invention described above, the image (entrance pupil) 5 of the stop 21 for the image-formation lens 20 in the Y-Z plane is formed at or near the entrance surface 11 in the panoramic attachment optical system 10, thereby reducing flare- or ghost-inducing unnecessary light entering the panoramic attachment optical system 10 primarily from a direction along the axis 1 of rotational symmetry and, hence, making it possible to view or pick up an image with reduced flares.

To this end, it is preferable to satisfy condition (1):

$$3<|A/B| \tag{1}$$

Here A is the optical path length between the entrance pupil position 5 and the stop 21 for the image-formation lens 20 (the product of distance×refractive index), and B is the optical path length between the object-side entrance (transmitting) surface 11 in the panoramic attachment optical system 10 and the entrance pupil position 5.

Condition (1) represents to what degree the entrance pupil 5 is near to the entrance surface 11 in the panoramic attachment optical system 10. In the invention, the entrance pupil 5 that is the image of the stop 21 is projected in the Y-Z plane only, and if the entrance pupil 5 is located nearer to the entrance surface 11 in the optical system, then a flare stop for prevention of ghosts or the like can be more effectively located. It is also possible to make the entrance surface 11 small and increase the effective diameter of the surface, leading to more preferable correction of aberrations. It is further possible to use more reflecting surfaces and increase the angle of view in the Y-direction. As the lower limit of 3 to condition (1) is not reached, it causes the entrance pupil 5 to be too away from the first surface 11 in the optical system, resulting in an increase in the effective diameter of the first surface 11, the inability to increase the angle of view in the Y-direction, and more harmful flare light.

More preferably, $$10<|A/B| \tag{1-1}$$

The values of |A/B| in Examples 1-14 are enumerated below.

| Example | |A/B| |
|---|---|
| 1 | 14.908 |
| 2 | 76.954 |
| 3 | 131.418 |
| 4 | 121.100 |
| 5 | 16.711 |
| 6 | 395.776 |
| 7 | 52.613 |
| 8 | 119.577 |
| 9 | 8.606 |
| 10 | 16.095 |
| 11 | 749.177 |
| 12 | 5.398 |
| 13 | 2162.878 |
| 14 | 20.391 |

It is then preferable to satisfy condition (2):

$$0.2<Fx/Fy<5.0 \tag{2}$$

Here Fx and Fy are the focal lengths of the whole panoramic attachment optical system 10 in the X- and Y-directions, respectively.

When there is a deviation from the lower limit of 0.2 and the upper limit of 0.5 to condition (2), the position with respect to the image-formation lens 20 of an object's virtual image transmitted from the panoramic attachment optical system 10 varies largely between the sagittal direction and the meridional direction, giving rise to astigmatism. This is not preferable, because correction of that aberration is little achievable by the rotationally symmetric image-formation lens 20, and offers a great deal of load.

The values of Fx/Fy in Examples 6 to 14 are given below.

| Example | Fx/Fy |
|---|---|
| 6 | 1.1625 |
| 7 | 0.6330 |
| 8 | 0.7273 |
| 9 | 4.5274 |
| 10 | 9.0335 |
| 11 | 0.5439 |
| 12 | 3.2733 |
| 13 | 1.1472 |
| 14 | 0.6057 |

As in Examples 7-10 and 14, at least two reflecting surfaces having positive power in the Y-direction are located in the panoramic attachment optical system. As positive power and negative power are given to the reflecting surfaces in order from the object side, as in a conventional "Chameleon Eye", it is impossible to shorten the total length of the optical system, because of the telephoto type wherein the focal length becomes generally long with respect to the total length. With a ++ power profile as in these example, on the contrary, the total length of the optical system can be shortened.

As in Examples 11 and 12, a +−+ power profile is more preferable because of the ability to reduce a principal point spacing.

On the other hand, the power of each reflecting surface in the X-direction, because of being rotationally symmetric with respect to the Y-axis, is determined by where it is located, resulting in a decrease in the degree of flexibility. To this end, the power profile in the Y-direction becomes important.

Tabulated below are the powers in the X- and Y-directions of the first transmitting surface (TS) and the reflecting surfaces in Examples 6-14.

|  | Ex. 6 | Ex. 7 | Ex. 8 | Ex. 9 | Ex. 10 |
|---|---|---|---|---|---|
| Y-Direction Power | | | | | |
| 1st TS | 0.241 | 0.465 | 0.149 | 0.010 | 0.248 |
| 1st RE | 0.157 | 0.451 | 0.158 | 0.320 | 0.499 |
| 2nd RE |  | 0.155 | 0.092 | 0.405 | 0.071 |
| X-Direction Power | | | | | |
| 1st TS | 0.011 | 0.040 | 0.020 | 0.017 | 0.026 |
| 1st RE | −0.151 | −0.368 | −0.171 | −0.208 | −0.256 |
| 2nd RE |  | 0.109 | 0.061 | 0.076 | 0.172 |

|  | Ex. 11 | Ex. 12 | Ex. 13 | Ex. 14 |
|---|---|---|---|---|
| Y-Direction Power | | | | |
| 1st TS | 0.248 | −0.002 | 0.378 | 0.168 |
| 1st RE | 0.145 | 0.241 | 0.103 | 0.399 |
| 2nd RE | −2.354 | −0.052 | −0.443 | 74.447 |
| 3rd RE | 0.085 |  | 0.094 |  |
| 4th RE |  |  | 0.024 |  |
| X-Direction Power | | | | |
| 1st TS | 0.021 | −0.023 | 0.009 | 0.020 |
| 1st RE | −1.162 | −0.133 | −0.118 | −0.179 |
| 2nd RE | 0.102 | 0.143 | 0.097 | 0.059 |
| 3rd RE | 0.074 |  | −0.122 |  |
| 4th RE |  |  | 0.101 |  |

The panoramic attachment optical system 10 such as those of Examples 1-14 could be integrally combined with the image-formation lens 10 into a panoramic optical system according to the invention.

The panoramic optical system could be constructed in a form of small size with reduced flare light, as exemplified in Examples 15 to 17 given below.

The panoramic optical system of the invention is now explained more specifically with reference to Examples 15 to 17. Although will be enumerated later, the constructional parameters in these examples have been determined as a result of normal ray tracing from an object plane to an image plane 30 via a front unit 60 and a rear unit 70, as shown typically in FIG. 35.

Figure 35:
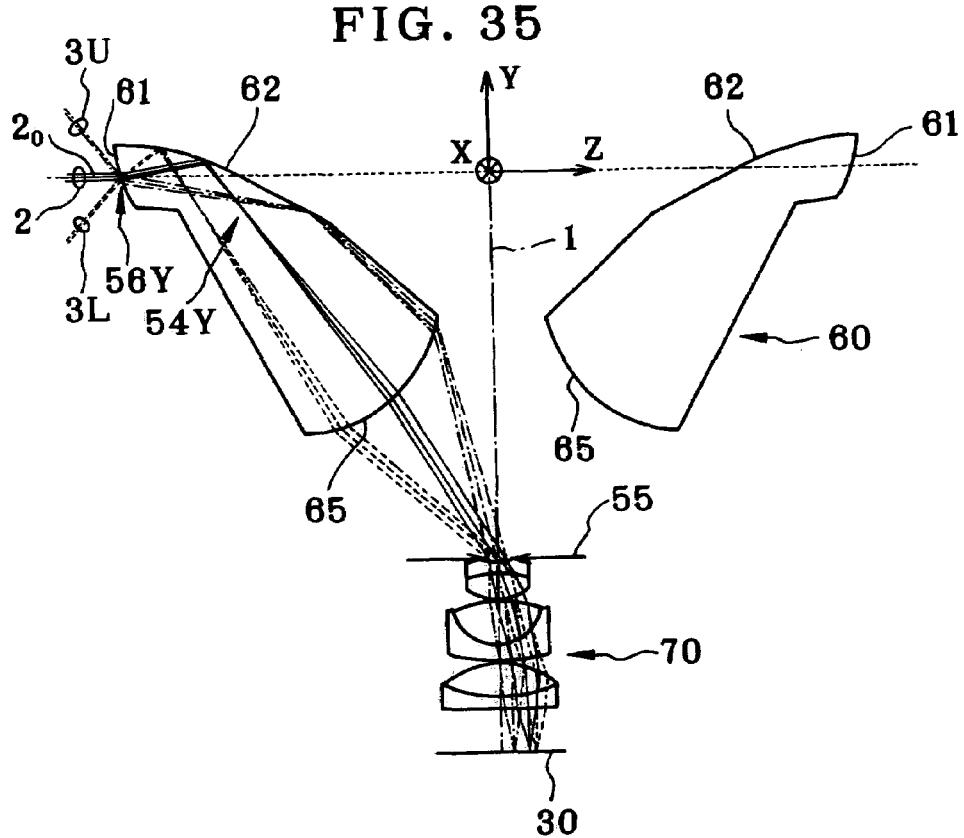
FIG. 35 is a sectional view of the panoramic optical system of Example 15 according to the invention, as taken along its center axis.

Foro a coordinate system, assume that, in normal ray tracing as shown typically in FIG. 35, the origin of a decentered optical surface in a decentered optical system is defined by a position of projection of an entrance pupil 56Y onto the rotationally symmetric axis (center axis) 1, the Y-axis positive direction by a direction away from the rotationally symmetric axis (center axis)1 away from an image plane 30, and the Y-Z plane is defined by the paper plane of FIG. 35. Further, the Z-axis positive direction is defined by a direction opposite to the entrance pupil 56Y now assumed to lie in the paper plane of FIG. 35, and the X-axis positive direction by an axis that forms with the Y- and Z-axes a right-handed orthogonal coordinate system.

For a decentered surface are the amount of decentration of that surface from the center of the origin of the aforesaid optical system on a coordinate system on which that surface is defined (X, Y and Z are indicative of the X-axis direction, the Y-axis direction, and the Z-axis direction, respectively), and the angles of tilt ($\alpha$, $\beta$, $\gamma$ (°)) of the coordinate systems for defining the surfaces with the centers on the X-, Y- and Z-axes, respectively. In that case, the positive for $\alpha$ and $\beta$ mean counterclockwise rotation with respect to the positive directions of the respective axes, and the positive for $\gamma$ means clockwise rotation with respect to the positive direction of the Z-axis. Referring here to how to perform $\alpha$-, $\beta$- and $\gamma$-rotations of the center axis of the surface, the coordinate system that defines each surface is first $\alpha$-rotated counterclockwise about the X-axis of the coordinate system that is defined at the origin of the optical system. Then, the coordinate system is $\beta$-rotated counterclockwise about the Y-axis of the rotated new coordinate system. Finally, the coordinate system is $\gamma$-rotated clockwise about the Z-axis of the rotated new another coordinate system.

When, of optical surfaces forming the optical system of each example, a specific surface and the subsequent surface form together a co-axial optical system, there is given a surface spacing. Besides, the radius of curvature of each surface and the refractive index and Abbe constant of the medium are given as usual.

It is noted that the term with respect to aspheric surfaces on which no data are mentioned in the constructional parameters, given later, is zero. Refractive indices and Abbe constants are given on a d-line (587.56 nm wavelength) basis, and length in mm. The decentration of each surface is given in terms of the amount of decentration from the position of projection of the entrance pupil 56Y onto the axis 1 of rotational symmetry (center axis).

A Y-rotation free-form surface is here defined by the following defining formula (d).

$$R(Y)=C_1+C_2Y+C_3Y^2+C_4Y^3+C_5Y^4+C_6Y^5+C_7Y^6+\ldots+C_{21}Y^{20}+\ldots C_{n+1}Y^n$$

$$Z=\pm R(Y)[1-[X/R(Y)]^2]^{1/2} \qquad (d)$$

This Y-rotation free-form surface is a rotationally symmetric surface that is obtained by rotation of the curve R(Y) about the Y-axis. As a result, that surface becomes a free-form surface (free-form curve) in the Y-Z plane, and a circle with a radius $|C_1|$ in the X-Z plane, respectively.

In this conjunction, an extended rotation free-form surface is a rotationally symmetric surface given by the following definition.

First, the following curve (c) passing through the origin on the Y-Z coordinate plane is determined.

$$Z=(Y^2/RY)/[1+\{1-(C_1+1)Y^2/RY^2\}^{1/2}]$$

$$C_2Y+C_3Y^2+C_4Y^3+C_5Y^4+C_6Y^5+C_7Y^6+\ldots+C_{21}Y^{20}+\ldots+C_{n+1}Y^n \qquad (e)$$

Then, a curve F(Y) is determined by rotation through an angle $\theta$ (°) of that curve (e) in the X-axis position direction provided that the counterclockwise direction is taken as positive. This curve F(Y), too, passes through the origin on the Y-Z coordinate plane.

This way, the extended rotation free-form surface is defined by a rotationally symmetric surface obtained by parallel translation of that curve F(Y) by a distance R in the Z-positive direction (in the Z-negative direction when R is negative), and then rotation of the parallel translated curve about the Y-axis.

As a result, the extended rotation free-form surface becomes a free-form surface (free-form curve) in the Y-Z plane, and a circle with a radius |R| in the X-Z plane.

From this definition, the Y-axis becomes the axis of the extended rotation free-form surface.

Here, RY is the radius of curvature of the spherical term in the Y-Z section, $C_1$ is a conical coefficient, and $C_2$, $C_3$, $C_4$, $C_5$, etc. are the aspheric coefficients of first, second, third, and fourth order, respectively.

In the panoramic optical system of the invention, it is preferable that at least one reflecting surface in a front unit 60 is composed of such a Y-rotation free-form surface or extended rotation free-form surface, and when expressed by a polynomial in the Y-Z section, it is of rotationally symmetric shape formed by rotation about a center axis 1 of a line segment of any shape at least having an odd-number order term with no symmetric plane. By allowing at least one reflecting surface to have such surface shape, it is possible to provide an optical system of improved resolving power, wherein decentration aberrations unavoidably associated with a reflecting optical system are corrected, and to reduce the size of such an optical system.

EXAMPLE 15

Figure 36:
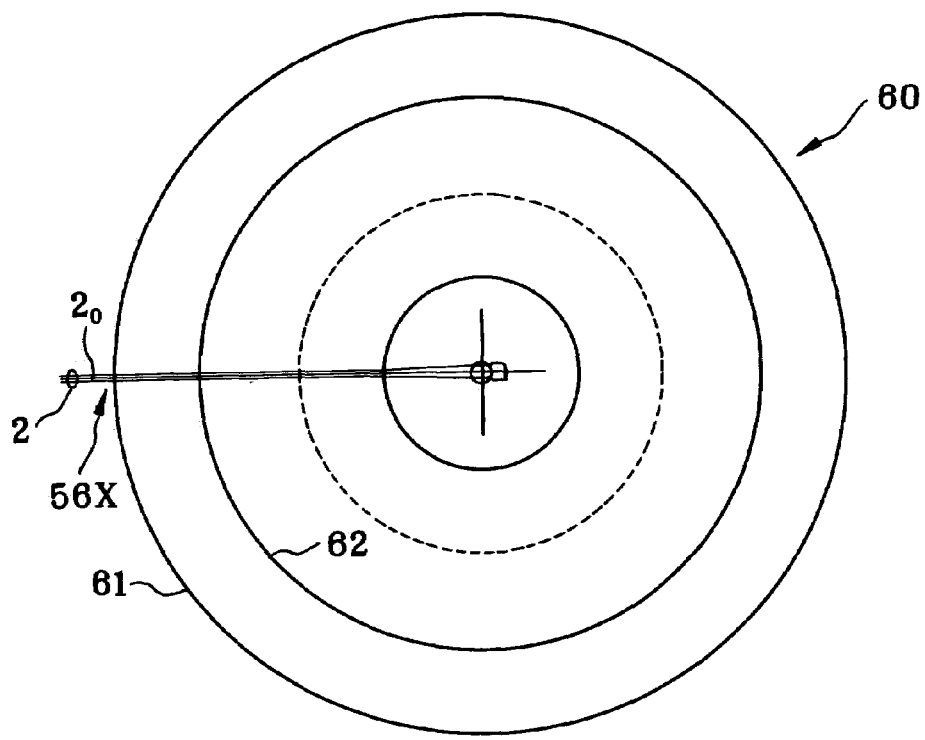
FIG. 36 is a plan view of an optical path through the optical system of Example 15 according to the invention.
Figure 37:
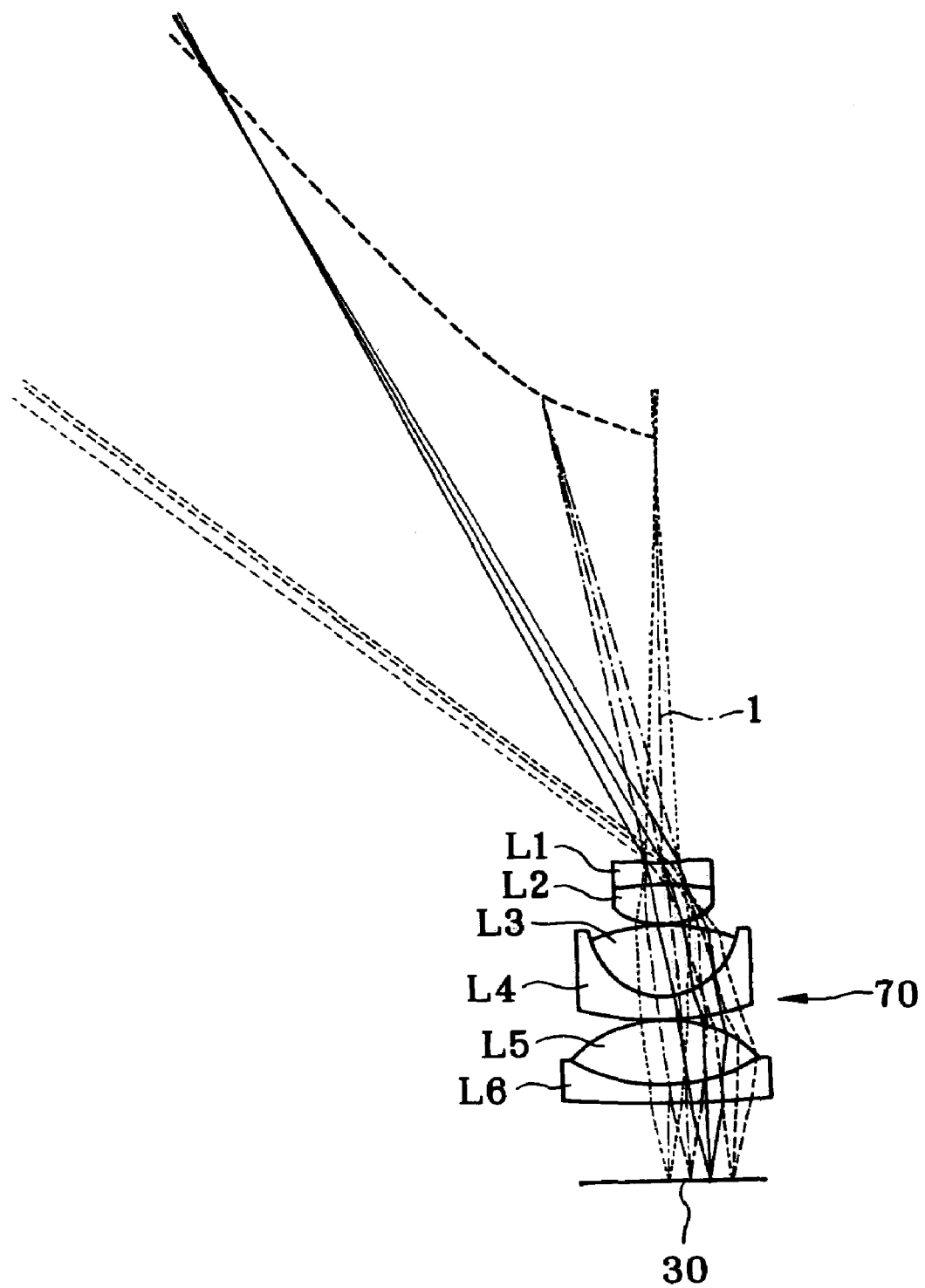
FIG. 37 is a ray diagram for the rear unit in Example 15 by back ray tracing.

FIG. 35 is a sectional view of the panoramic optical system of Example 15, as taken along a center axis 1 (axis of rotational symmetry), and FIG. 36 is a plan view of an optical path through that optical system. FIG. 37 is a back ray tracing diagram for a rear unit 70.

This panoramic optical system is made up of a front unit 60 rotationally symmetric about the center axis 1, a rear unit 70 rotationally symmetric about the center axis 1, and an aperture 55 located coaxially with the center axis 1. A light beam 2 coming from a distant object passes through the front unit 60 and the rear unit 70 in this order, forming an image at a position of an image plane 30 that is vertical to and off the center axis 1. When the center axis 1 is set vertically (in the vertical direction), for instance, there is obtained an image having a full 360°-direction (full-panoramic) angle of view in a circular ring form whose zenithal direction lies in the center direction of the image and the horizon lies outside.

The front unit 60 is formed of a resin or other transparent medium that is rotationally symmetric about the center axis 1 and has a refractive index greater than 1, and includes one internal reflecting surface 62 and two transmitting surfaces 61, 65. The internal reflecting surface 62 and the transmitting surfaces 61, 65 are each of shape rotationally symmetric about the center axis 1. The rear unit 70 is a lens system divided into three groups having six lenses L1 to L6 in all.

The transparent medium of the front unit 60 includes a first transmitting surface 61 on which a light beam 2 coming from far away is incident, a reflecting surface 62 that is positioned on the same side with respect to the center axis 1 as the first transmitting surface 61 and receives a light beam leaving the first transmitting surface 61, and a second transmitting surface 65 that is again positioned on the same side with respect to the center axis 1 as the first transmitting surface 61, faces the rear unit 70 and receives a light beam reflected at the reflecting surface 62, each composed of an extended rotation free-form surface provided that the conical constant is zero.

A lens system that forms the rear unit 70 is composed of, in order from the front unit 60 side, a doublet consisting of a double-concave negative lens L1 and a double-convex positive lens L2, a doublet consisting of a double-convex positive lens L3 and a negative meniscus lens L4 concave on the front unit 60 side, and a doublet consisting of a double-convex positive lens L5 and a negative meniscus lens L6 concave on the front unit 60 side.

When the center axis 1 lies in the vertical direction, the center light beam 2 coming from far away in the horizontal direction enters the transparent medium of the front unit 60 after refraction through the entrance-side first transmitting surface 61, and then reflects at the reflecting surface 61 toward the rear unit 70 side. The reflected light beam is refracted through the second transmitting surface 65, and then leaves the transparent medium of the front unit 60, entering the rear unit 70 via an aperture 55 to form an image at a radially given position of an image plane 30, which is off the center axis 1.

In the panoramic optical system of this example, the aperture 55 (stop) interposed between the front unit 60 and the rear unit 70 is projected onto the object side to form an entrance pupil 56Y in a sectional direction including the center axis 1 at or near the first transmitting surface 61.

Also in the panoramic optical system of this example, light beams 2, 3U and 3L coming from far way via the entrance pupil 56Y (the light beam 3U comes from a distance point in the sky, and 3L comes from a distant point on the ground) form an image one time at a position 54Y between the reflecting surface 62 and the second transmitting surface 65 and nearer to the reflecting surface 62 in a section including the center axis 1 (FIG. 36), but they do not form any intermediate real image in a plane (FIG. 36) that is orthogonal to a plane including the center axis 1 and includes a center light ray $2_0$ of that light beam 2. It is noted that broken lines in FIG. 37 stand for a sagittal image plane formed by the front unit 60. That sagittal image plane is formed as a virtual image between the reflecting surface 62 and the second transmitting surface 65, because the reflecting surface 62 acts a convex reflecting surface.

The specifications of Example 15 are:
Horizontal angle of view: 360°,
Vertical angle of view: 100°,
Entrance pupil diameter: 0.4 mm, and
Image size: φ5.71 to φ1.98 mm.

Figure 38:
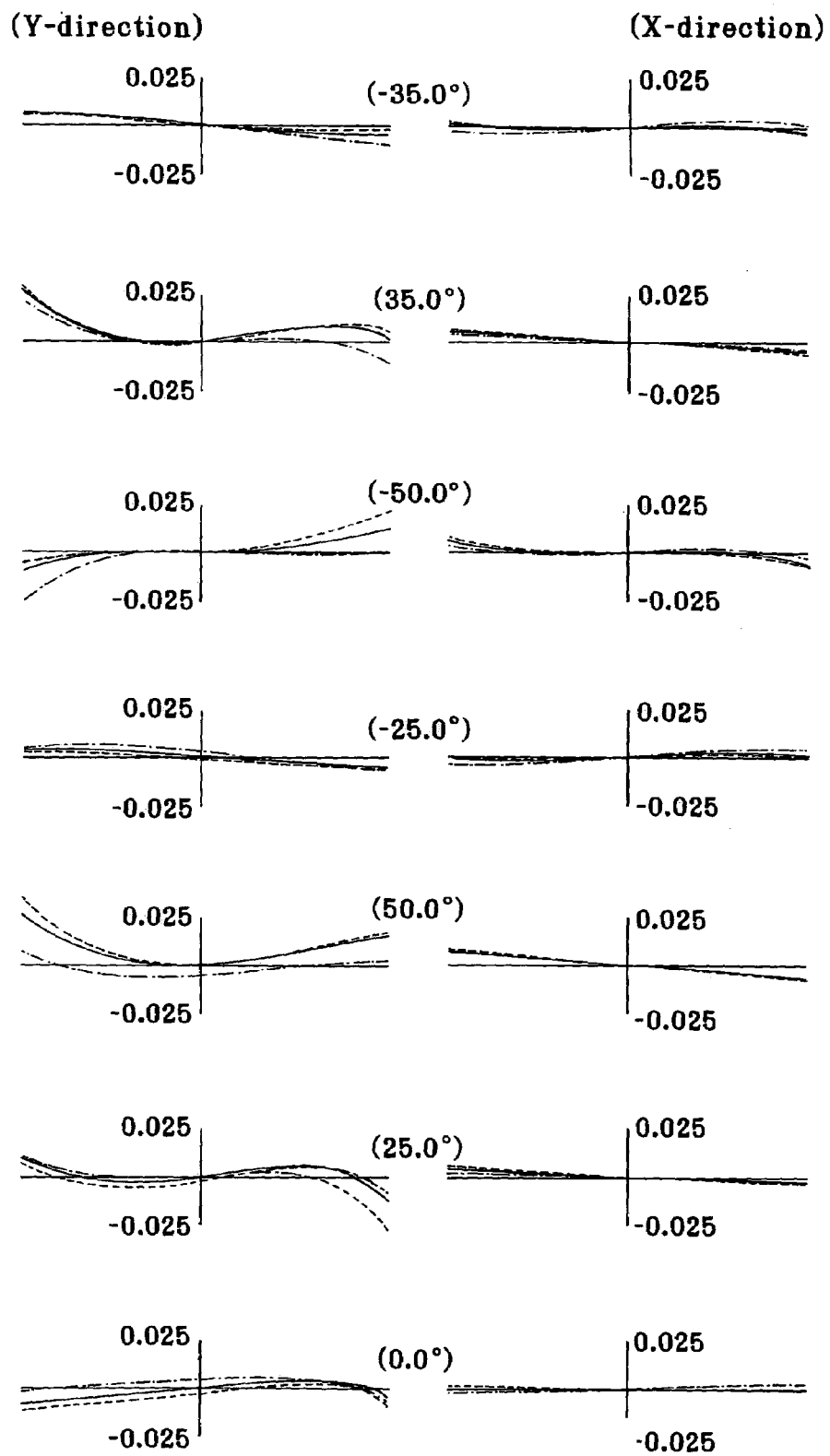
FIG. 38 is an aberration diagram for the whole optical system of Example 15.
Figure 39:
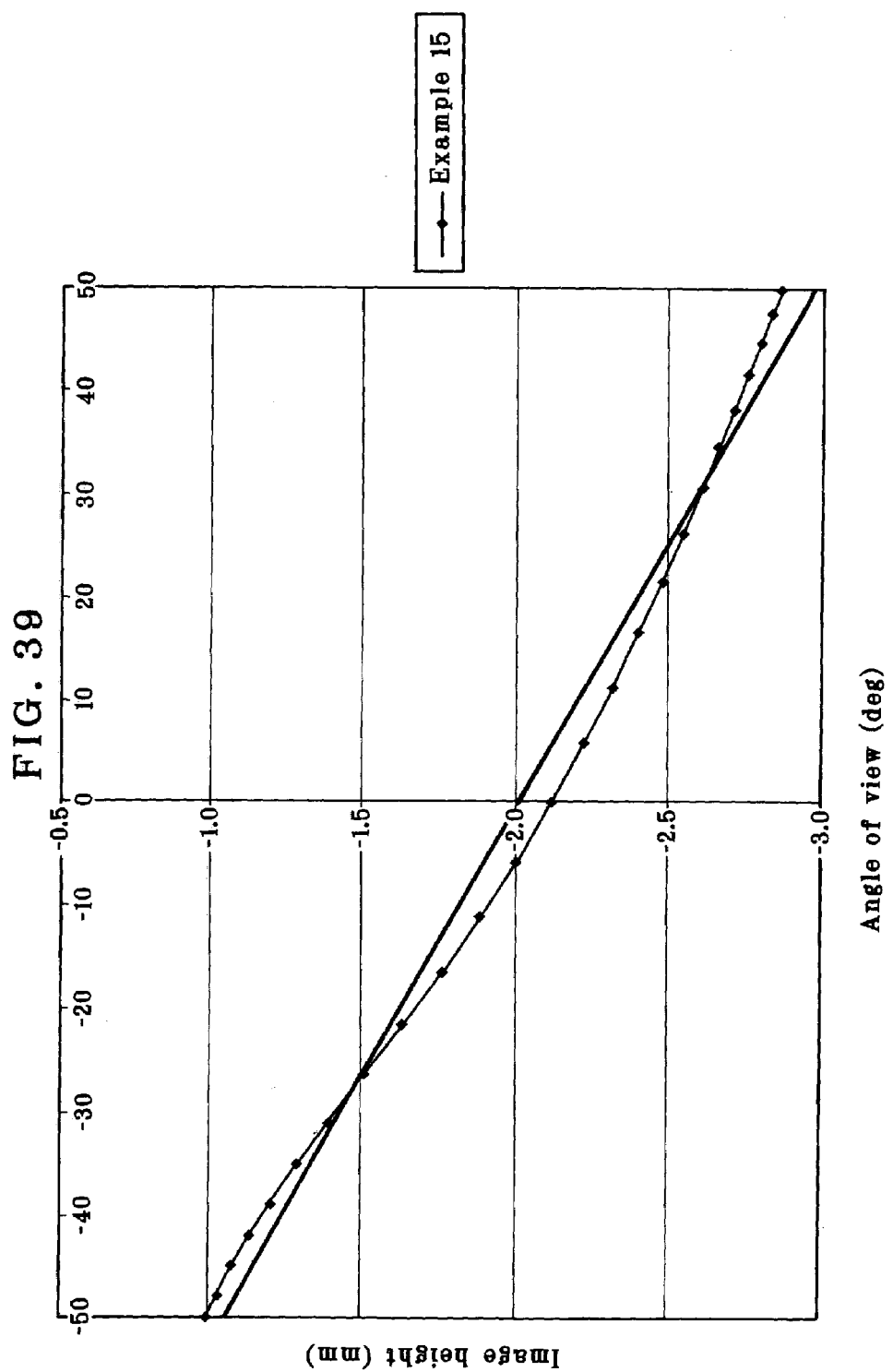
FIG. 39 is indicative of distortion of Example 15 in the vertical direction.

FIG. 37 is a back ray tracing diagram for the rear unit 70, wherein broken lines stand for a tangential image plane by back ray tracing from the image plane 30. FIG. 38 is transverse aberration diagrams for the whole optical system of this example, wherein the bracketed angles at the center stand for vertical angles of view and Y-direction (meridional) and X-direction (sagittal) transverse aberrations at those angles are shown. The same shall apply hereinafter. FIG. 39 is graph of vertical distortion in this example, wherein a curve running through ■ is obtained by plotting image heights at the image plane 30 (radial image heights from the center axis 1) against the vertical view angle of incidence of the optical system of Example 15, and a thick solid line is representative of image heights proportional to the view angle of incidence (IH∝f·θ where IH is an image height, f is a focal length and θ is an angle of view)

As can be seen from FIG. 37, in back ray tracing from the rear unit 70 in this example, some large convex field curvature is produced in the direction of travel of light rays to cancel out aberrations at the front unit 60. Thus, the optical system of this example has good enough aberration performance as indicated by a point (spot) RMS of 13 μm, albeit having an angle of view of 100° in the vertical direction.

EXAMPLE 16

Figure 40:
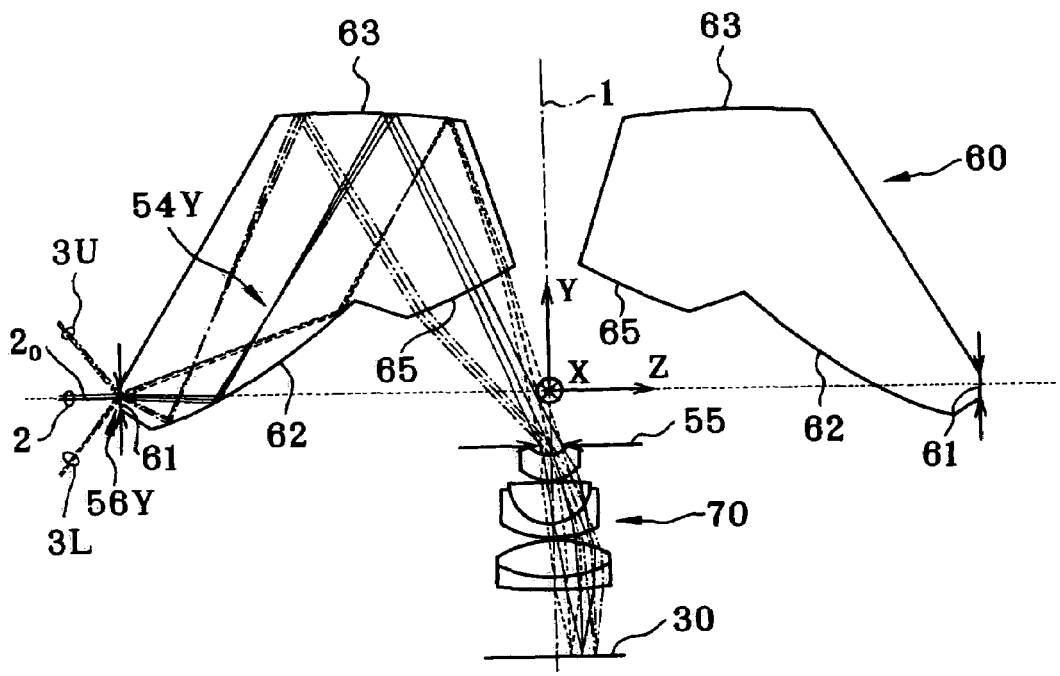
FIG. 40 is a sectional view of the panoramic optical system of Example 16 of the invention, as taken along its center axis.
Figure 41:
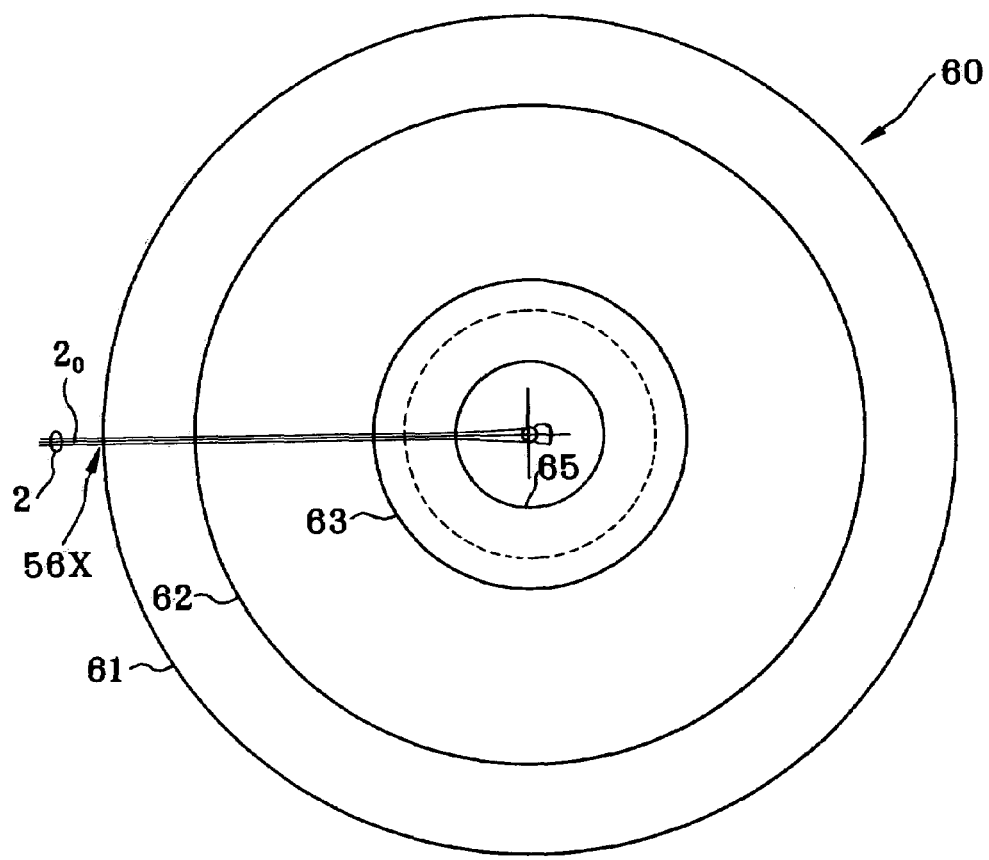
FIG. 41 is a plan view of an optical path through the optical system of Example 16 of the invention.
Figure 42:
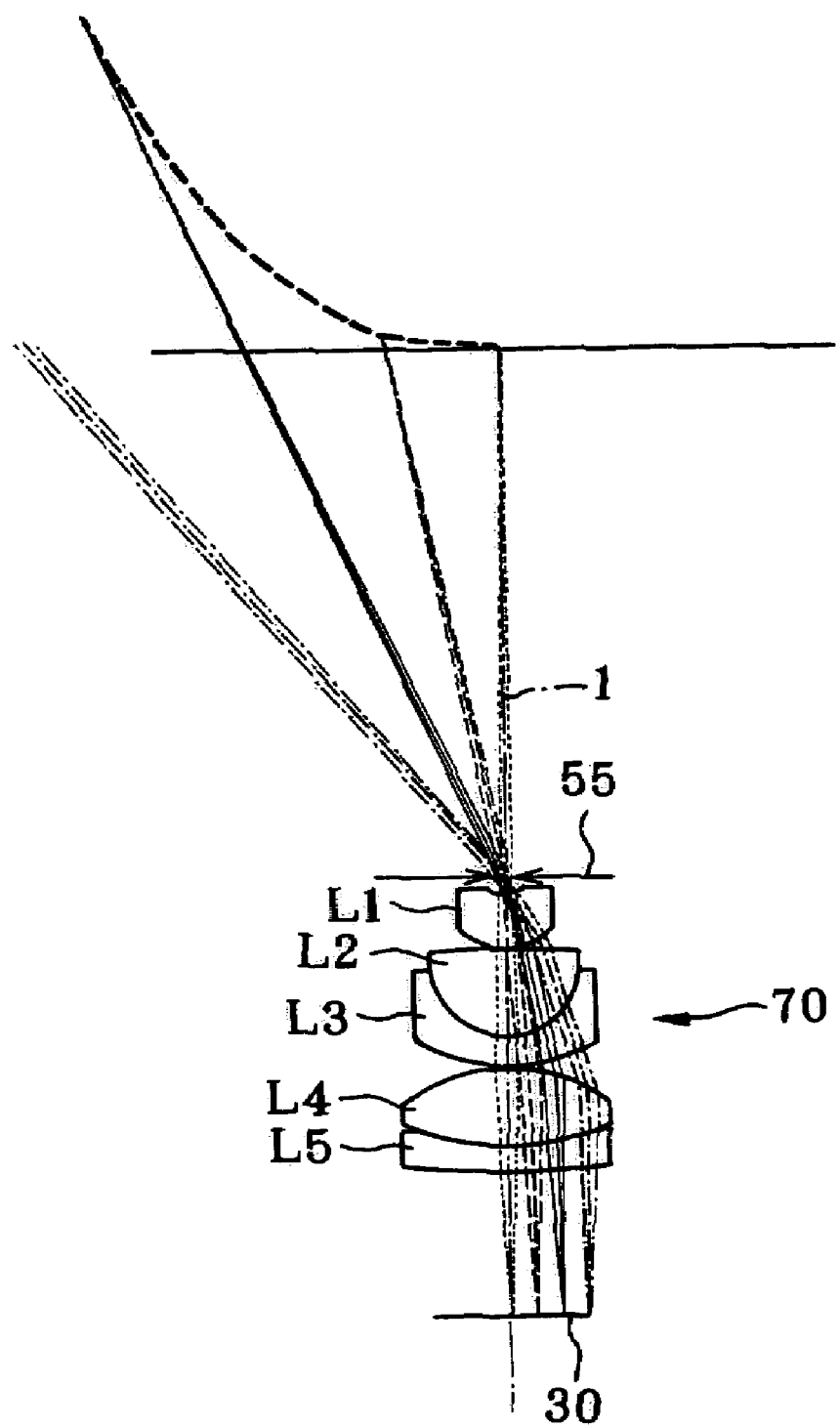
FIG. 42 is a ray diagram for the rear unit in Example 16 by back ray tracing.

FIG. 40 is a sectional view of the panoramic optical system of Example 16, as taken along a center axis 1 (axis of rotational symmetry), and FIG. 41 is a plan view of an optical path through that optical system. FIG. 42 is a back ray tracing diagram for a rear unit 70.

This panoramic optical system is made up of a front unit 60 rotationally symmetric about the center axis 1, a rear unit 70 rotationally symmetric about the center axis 1, and an aperture 55 located coaxially with the center axis 1. A light beam 2 coming from a distant object passes through the front unit 60 and the rear unit 70 in this order, forming an image at a position of an image plane 30 that is vertical to and off the center axis 1. When the center axis 1 is set vertically (in the vertical direction), for instance, on the image plane 30 there is obtained an image having a full 360°-direction (full-panoramic) angle of view in a circular ring form whose zenithal direction turns away from the center direction of the image and the horizon lies inside.

The front unit 60 is formed of a resin or other transparent medium that is rotationally symmetric about the center axis 1 and has a refractive index greater than 1, and includes two internal reflecting surfaces 62, 63 and two transmitting surfaces 61, 65. The internal reflecting surfaces 62, 63 and the transmitting surfaces 61, 65 are each of shape rotationally symmetric about the center axis 1. The rear unit 70 is a lens system divided into three groups having five lenses L1 to L5 in all.

The transparent medium of the front unit 60 includes the first transmitting surface 61 on which a light beam 2 coming from far away is incident, the reflecting surface 62 that is positioned on the same side with respect to the center axis 1 as the first transmitting surface 61 and receives a light beam leaving the first transmitting surface 61, the second reflecting surface 62 that is positioned on the same side as the first reflecting surface 62 and receives a light beam reflected at the first reflecting surface 62 and the second transmitting surface 65 that faces the rear unit 70 and receives a light beam reflected at the second reflecting surface 63, each composed of an extended rotation free-form surface provided that the conical constant is zero.

Between the front unit 60 and the rear unit 70 there is located a stop-forming circular aperture 55 coaxially with the center axis 1.

A lens system that forms the rear unit 70 is composed of, in order from the front unit 60 side, a negative meniscus lens L1 convex on the front unit 60 side, a doublet consisting of a double-convex positive lens L2 and a negative meniscus lens L3 concave on the front unit 60 side, and a doublet consisting of a double-convex positive lens L4 and a negative meniscus lens L5 concave on the front unit 60 side.

When the center axis 1 lies in the vertical direction and the optical system directs to the zenith, the center light beam 2 coming from far away in the horizontal direction enters the transparent medium of the front unit 60 after refraction through the entrance-side first transmitting surface 61, and reflects at the reflecting surface 63 in such a way as to turn away from the rear unit 70 side. The reflected light beam is reflected at the second reflecting surface 63 toward the rear unit 70 followed by refraction through the second transmitting surface 65, and then leaves the transparent medium of the front unit 60, entering the rear unit 70 via the aperture 55 to form an image at a radially given position of an image plane 30, which is off the center axis 1.

In the panoramic optical system of this example, light beams 2, 3U and 3L coming from far way (the light beam 3U comes from a distance point in the sky, and 3L comes from a distant point on the ground) form an image at a position 54Y between the first reflecting surface 62 and the second reflecting surface 63 in a section including the center axis 1 (FIG. 40), but they do not form any real image in a plane (FIG. 41) that is orthogonal to a plane including the center axis 1 and includes a center light ray $2_0$ of that light beam 2. It is noted that broken lines in FIG. 41 stand for a sagittal image plane formed by the front unit 60. That sagittal image plane is formed as a virtual image on an object side far away from the transmitting surface 65 after leaving the front unit, because the reflecting surface 63, transmitting surface 65, etc. act as negative refracting power.

The specifications of Example 16 are:
Horizontal angle of view: 360°,
Vertical angle of view: 100°,
Entrance pupil diameter: 0.4 mm, and
Image size: φ6.10 to φ2.14 mm.

FIG. 42 is a back ray tracing diagram for the rear unit 70, wherein broken lines stand for a tangential image plane by back ray tracing from the image plane 30.

In this example, field curvatures produced at the front and rear units are mutually canceled out to ease up loads on both.

Figure 44:
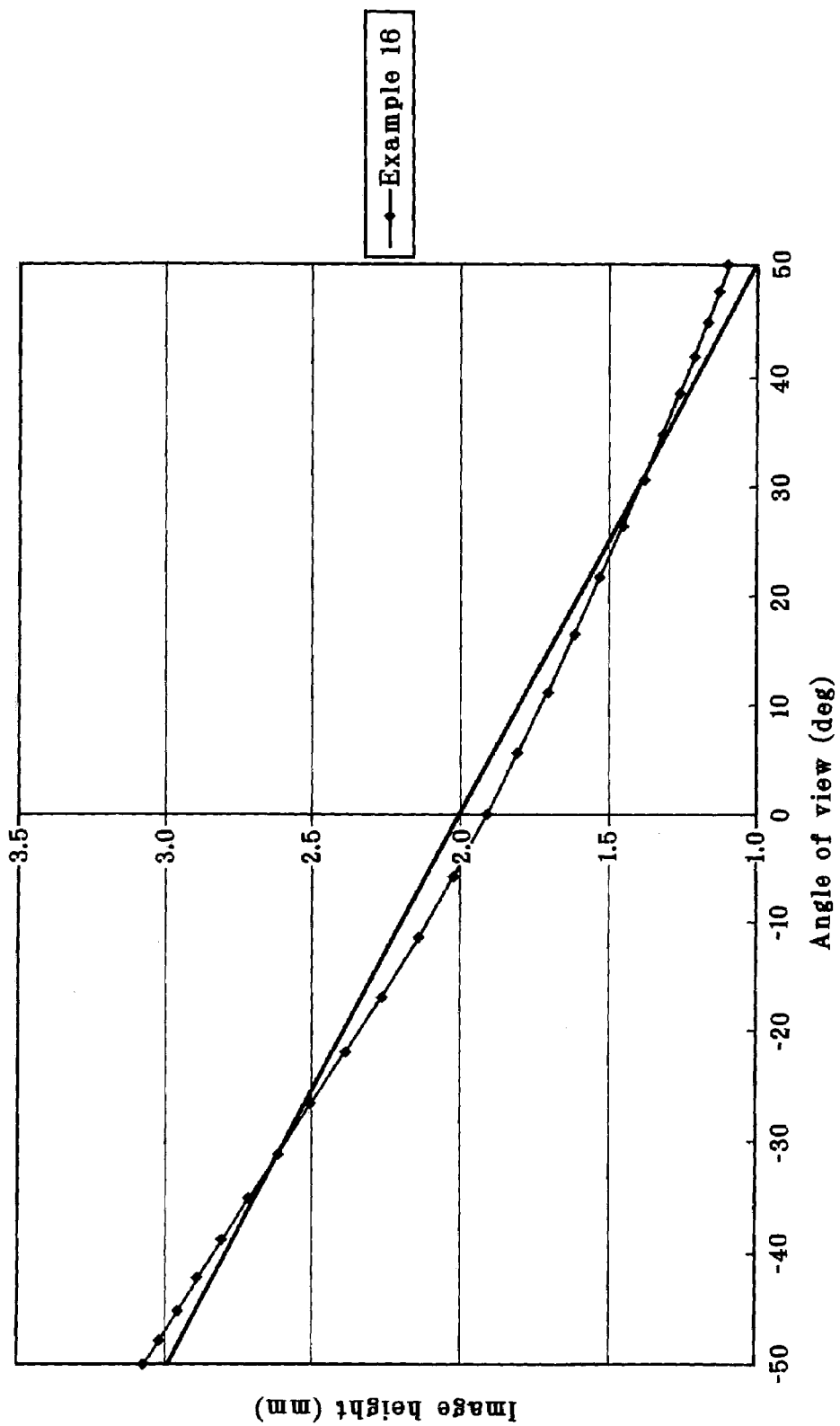
FIG. 44 is indicative of distortion of Example 16 in the vertical direction.

FIG. 43 is transverse aberration diagrams for the whole optical system of this example. FIG. 44 is a graph of vertical distortion in this example, wherein a curve running through ♦ is obtained by plotting image heights at the image plane 30 (radial image heights from the center axis 1) against the vertical view angle of incidence of the optical system of Example 16, and a thick solid line is representative of image heights proportional to the view angle of incidence (IH∝f·θ where IH is an image height, f is a focal length and θ is an angle of view).

EXAMPLE 17

Figure 45:
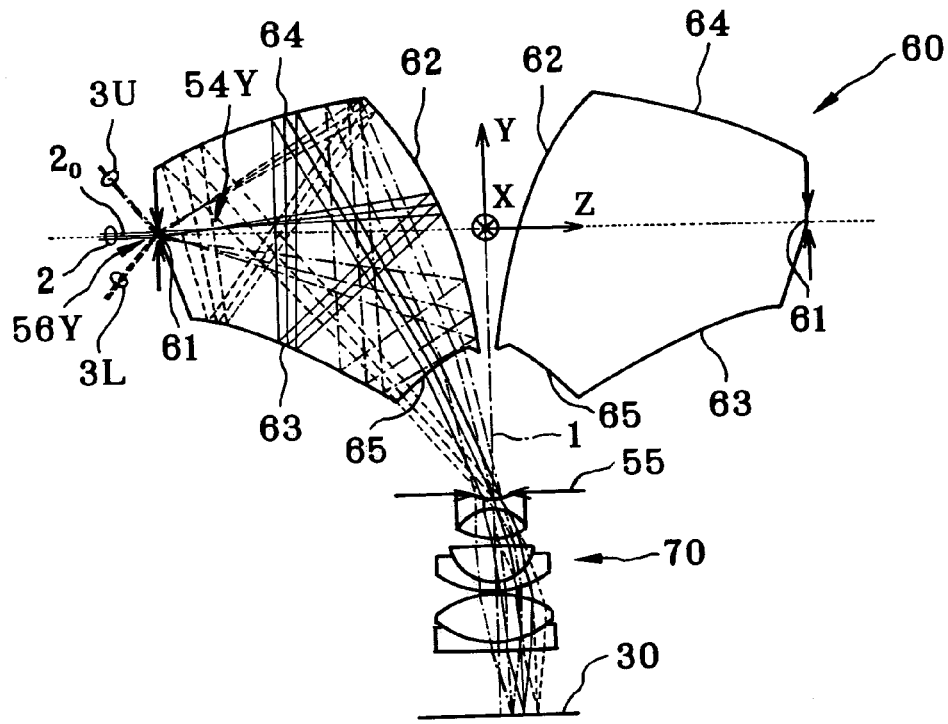
FIG. 45 is a sectional view of the panoramic optical system of Example 17 of the invention, as taken along its center axis.
Figure 46:
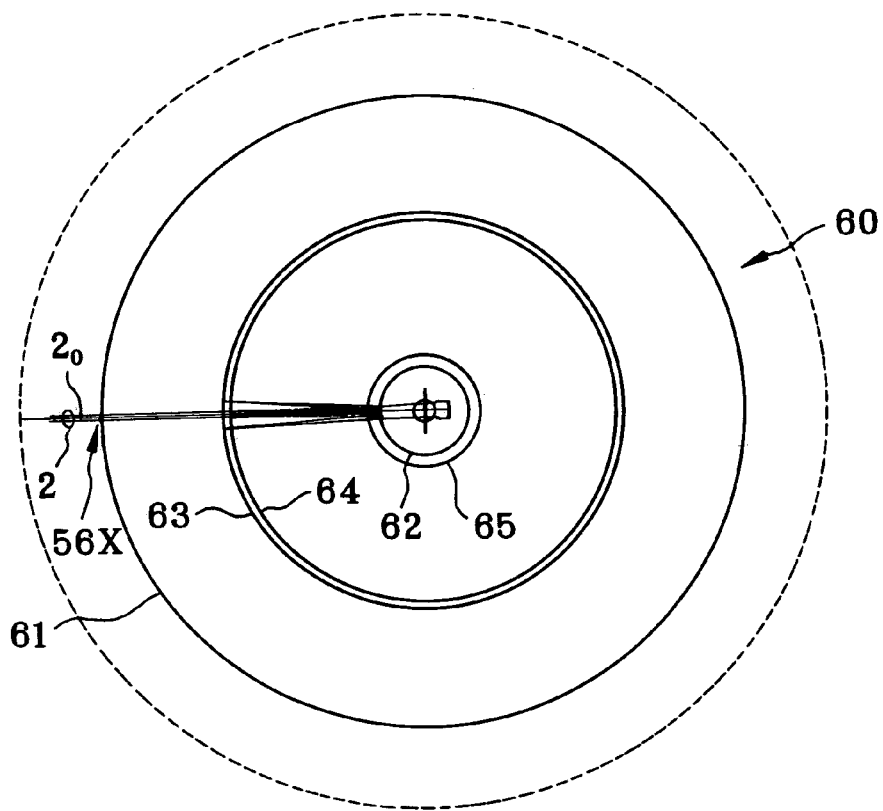
FIG. 46 is a plan view of an optical path through the optical system of Example 17 of the invention.
Figure 47:
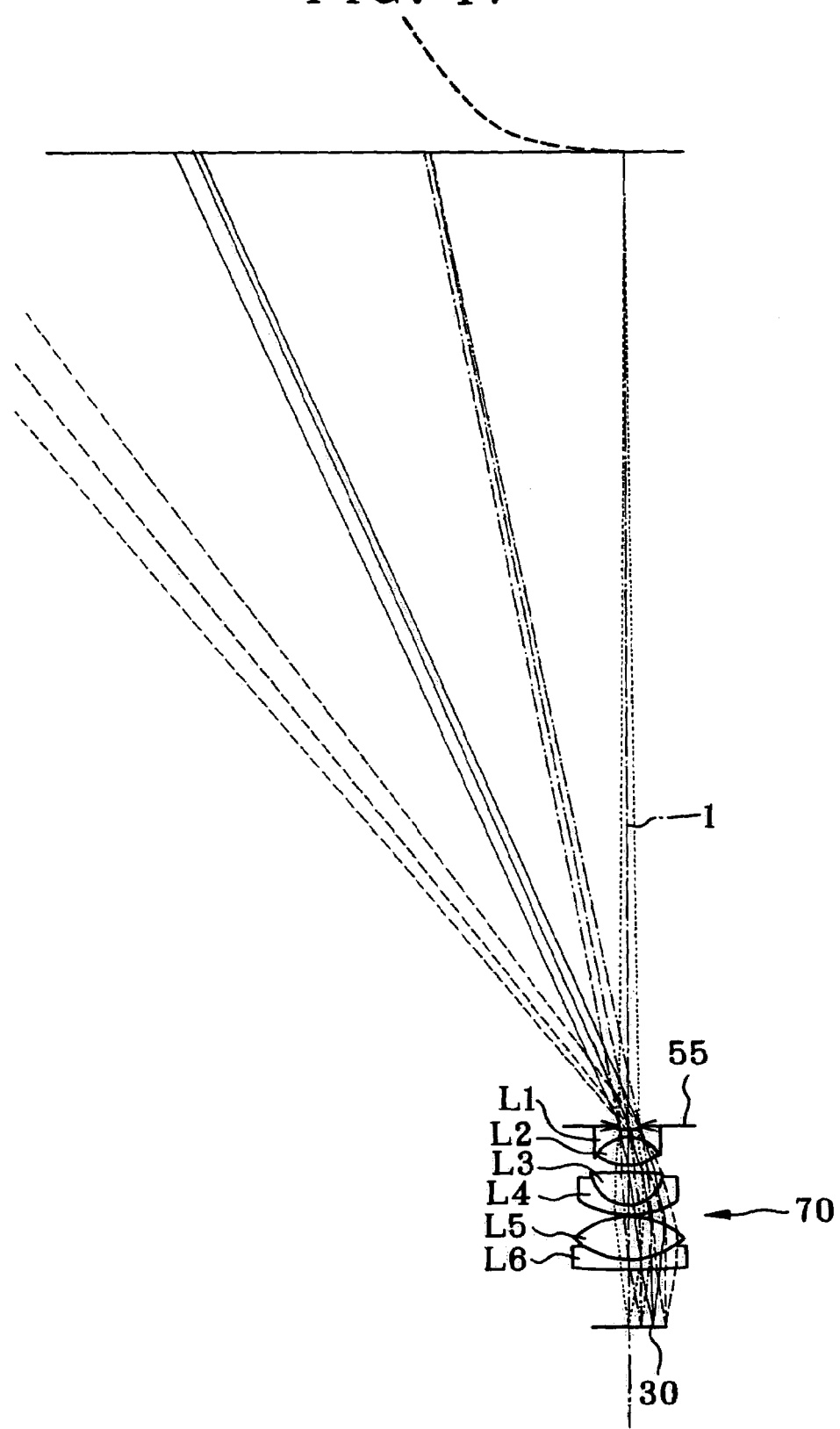
FIG. 47 is a ray diagram for the rear unit in Example 17 by back ray tracing.

FIG. 45 is a sectional view of the panoramic optical system of Example 17, as taken along a center axis 1 (axis of rotational symmetry), and FIG. 46 is a plan view of an optical path through that optical system. FIG. 47 is a back ray tracing diagram for a rear unit 70.

This panoramic optical system is made up of a front unit 60 rotationally symmetric about the center axis 1, a rear unit 70 rotationally symmetric about the center axis 1, and an aperture 55 located coaxially with the center axis 1. A light beam 2 coming from a distant object passes through the front unit 60 and the rear unit 70 in this order, forming an image at a position of an image plane 30 that is vertical to and off the center axis 1. When the center axis 1 is set vertically (in the vertical direction), for instance, on the image plane 30 there is obtained an image having a full 360°-direction (full-panoramic) angle of view in a circular ring form whose zenithal direction lies in the center direction of the image and the horizon lies outside.

The front unit 60 is formed of a resin or other transparent medium that is rotationally symmetric about the center axis 1 and has a refractive index greater than 1, and includes three internal reflecting surfaces 62, 63, 64 and two transmitting surfaces 61, 65. The internal reflecting surfaces 62, 63, 64 and the transmitting surfaces 61, 65 are each of shape rotationally symmetric about the center axis 1. The rear unit 70 is a lens system divided into three groups having six lenses L1 to L6 in all.

The transparent medium of the front unit 60 includes the first transmitting surface 61 on which a light beam 2 coming from far away is incident, the first reflecting surface 62 that is positioned on the same side with respect to the center axis 1 as the first transmitting surface 61 and receives a light beam leaving the first transmitting surface 61, the second reflecting surface 63 that is positioned on the same side as the first reflecting surface 62 and receives a light beam reflected at the first reflecting surface 62, the third reflecting surface 64 that is positioned on the same side as the first and second reflecting surfaces 62 and 63 and receives a light beam reflected at the second reflecting surface 63 and the second transmitting surface 65 that faces the rear unit 70 and receives a light beam reflected at the third reflecting surface 64. The first transmitting surface 61, the second reflecting surface 63, the third reflecting surface 64, and the second transmitting surface 64 is formed of an extended rotation free-form surface with a conical constant of zero, and the first reflecting surface 62 is formed of a Y-rotation free-form surface.

Between the front unit 60 and the rear unit 70 there is located a stop-forming circular aperture 55 coaxially with the center axis 1.

A lens system that forms the rear unit 70 is composed of, in order from the front unit 60 side, a doublet consisting of a double-concave negative lens L2 and a double-convex positive lens L2, a doublet consisting of a double-convex positive lens L3 and a negative meniscus lens L4 concave on the front unit 60 side, and a doublet consisting of a double-convex positive lens L5 and a negative meniscus lens L6 concave on the front unit 60 side.

When the center axis 1 lies in the vertical direction and the optical system directs to the zenith, the center light beam 2 coming from far away in the horizontal direction enters the transparent medium of the front unit 60 after refraction through the entrance-side first transmitting surface 61, and then reflects at the reflecting surface 62 toward the rear unit 70. The reflected light beam is then reflected at the second reflecting surface 63 in such a way as to turn away from the rear unit 70, entering the third reflecting surface 64, whereat the light beam is reflected in such a way as to turn away from the rear unit 70 and cross the light beam entering the first reflecting surface 62. The reflected light beam is refracted through the second transmitting surface 65, and then leaves the transparent medium of the front unit 60, entering the rear unit 70 via the aperture 55 to form an image at a radially given position of an image plane 30, which is off the center axis 1.

In the panoramic optical system of this example, light beams 2, 3U and 3L coming from far way (the light beam 3U comes from a distance point in the sky, and 3L comes from a distant point on the ground) form an intermediate real image at a position 54Y between the first transmitting surface 61 and the first reflecting surface 62 and nearer to the first transmitting surface 61 in a section including the center axis 1 (FIG. 45), but they do not form any real image in a plane (FIG. 46) that is orthogonal to a plane including the center axis 1 and includes a center light ray $2_0$ of that light beam 2. It is noted that broken lines in FIG. 46 stand for a sagittal image plane formed by the front unit 60. That sagittal image plane is formed as a virtual image on an object side far away from the transmitting surface 61 after leaving the front unit 60, because the reflecting surfaces 62-64 and the transmitting surfaces 61 and 65 act as negative refracting power.

The specifications of Example 17 are:

Horizontal angle of view: 360°,

Vertical angle of view: 100°,

Entrance pupil diameter: 0.4 mm, and

Image size: φ6.05 to φ2.10 mm.

FIG. 47 is a back ray tracing diagram for the rear unit 70, wherein broken lines stand for a tangential image plane by back ray tracing from the image plane 30.

In this example, field curvatures produced at the front and rear units are mutually canceled out to ease up loads on both.

Figure 48:
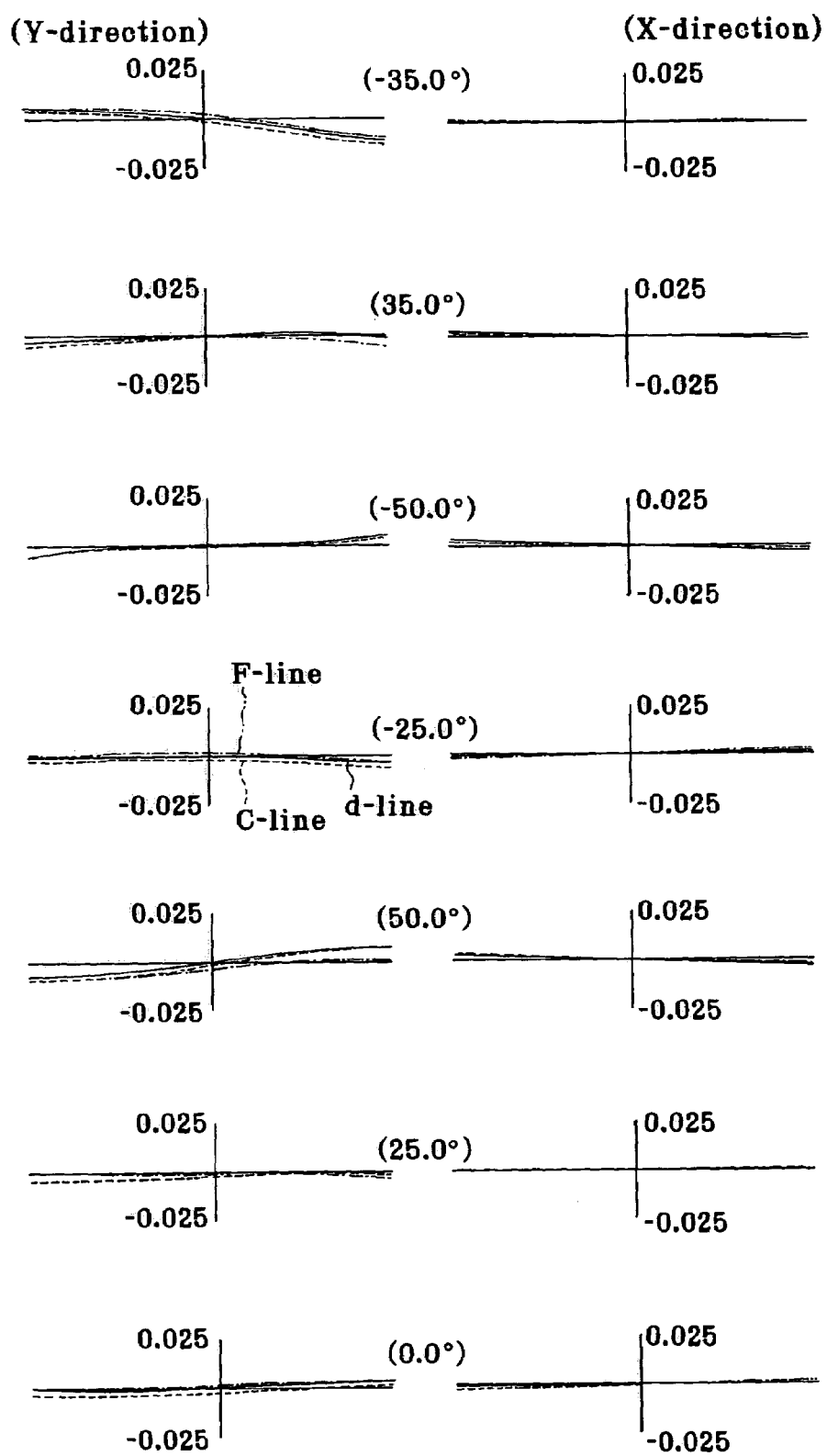
FIG. 48 is an aberration diagram for the whole optical system of Example 17.
Figure 49:
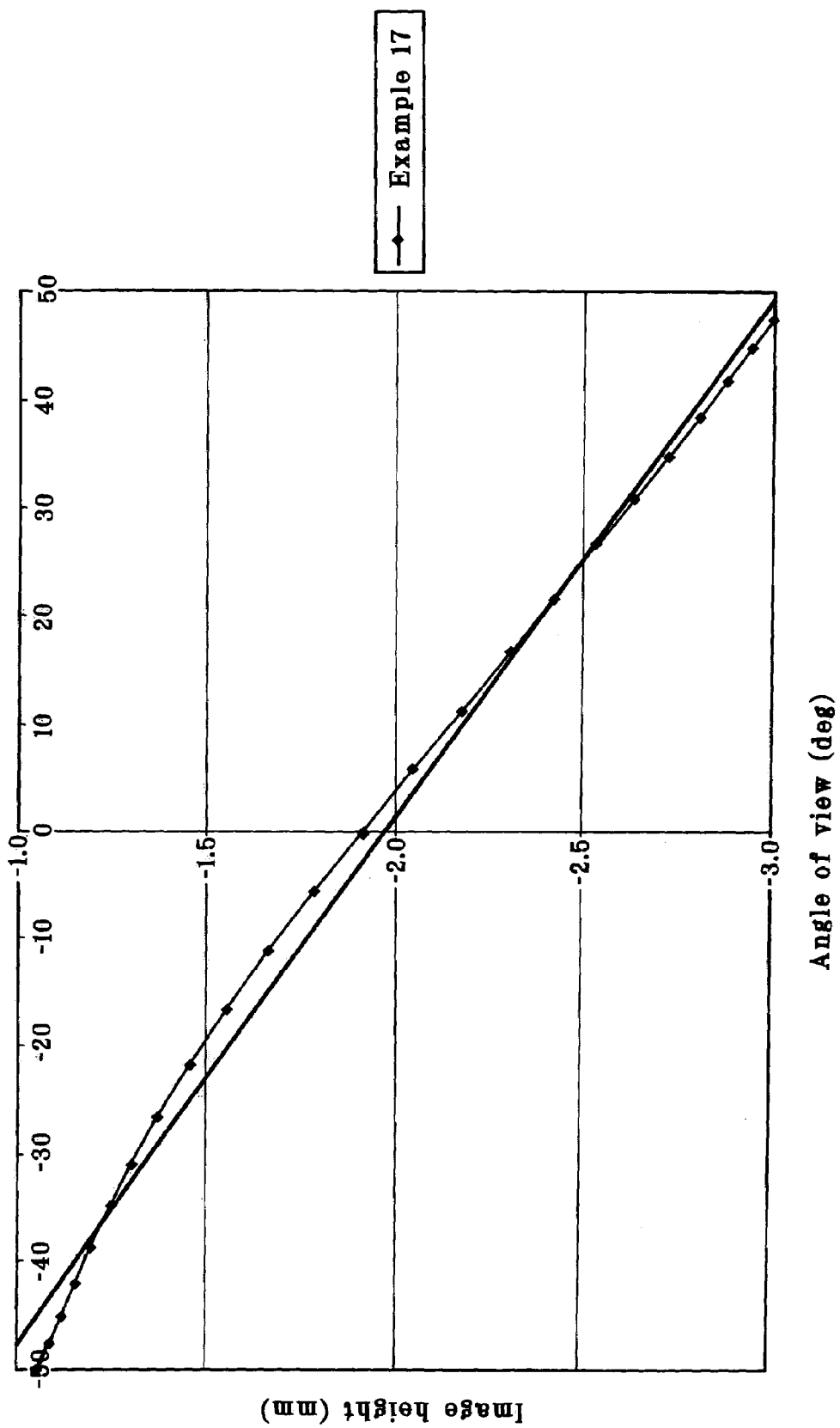
FIG. 49 is indicative of distortion of Example 17 in the vertical direction.

FIG. 48 is transverse aberration diagrams for the whole optical system of this example. FIG. 49 is a graph of vertical distortion in this example, wherein a curve running through ♦ is obtained by plotting image heights at the image plane 30 (radial image heights from the center axis 1) against the vertical view angle of incidence of the optical system of Example 17, and a thick solid line is representative of image heights proportional to the view angle of incidence ($IH \propto f \cdot \theta$ where IH is an image height, f is a focal length and θ is an angle of view).

The constructional parameters in Examples 15-17 are set out below, where the acronyms "YRFS", "ERFS", and "RE" indicate a Y-rotation free-form surface, an extended rotation free-form surface, and a reflecting surface, respectively.

EXAMPLE 15

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Entrance Pupil) | | (1) | | |
| 2 | ERFS[1] | | (2) | 1.8830 | 40.7 |
| 3 | ERFS[2] (RE) | | (3) | 1.8830 | 40.7 |
| 4 | ERFS[3] | | (4) | | |
| 5 | ∞(Stop) | | (5) | | |
| 6 | 2.50 | | (6) | 1.7217 | 38.1 |
| 7 | −8.49 | | (7) | 1.7440 | 44.8 |
| 8 | 3.54 | | (8) | | |
| 9 | −11.38 | | (9) | 1.6234 | 59.7 |
| 10 | 3.51 | | (10) | 1.7552 | 27.6 |
| 11 | 17.02 | | (11) | | |
| 12 | −6.56 | | (12) | 1.6204 | 60.3 |
| 13 | 9.26 | | (13) | 1.6463 | 33.9 |
| 14 | 73.38 | | (14) | | |
| Image plane | ∞ | | (15) | | |

| ERFS[1] | |
|---|---|
| RY | ∞ |
| θ | 17.42 |
| R | −28.35 |
| $C_3$ | $4.0230 \times 10^{-2}$ |
| ERFS[2] | |
| RY | ∞ |
| θ | 67.71 |
| R | −21.73 |
| $C_3$ | $-1.6438 \times 10^{-2}$ |
| $C_4$ | $-1.2092 \times 10^{-3}$ |
| $C_5$ | $-3.2942 \times 10^{-5}$ |
| ERFS[3] | |
| RY | ∞ |
| θ | 134.49 |
| R | −7.61 |
| $C_3$ | $4.8925 \times 10^{-2}$ |
| $C_4$ | $1.2565 \times 10^{-3}$ |
| $C_5$ | $7.8262 \times 10^{-5}$ |

| Displacement and tilt(1) | | | | | |
|---|---|---|---|---|---|
| X | 0.00 | Y | 0.00 | Z | −28.41 |
| α | 0.00 | β | 0.00 | γ | 0.00 |
| Displacement and tilt(2) | | | | | |
| X | 0.00 | Y | 0.00 | Z | 0.00 |
| α | 0.00 | β | 0.00 | γ | 0.00 |
| Displacement and tilt(3) | | | | | |
| X | 0.00 | Y | 0.96 | Z | 0.00 |
| α | 0.00 | β | 0.00 | γ | 0.00 |
| Displacement and tilt(4) | | | | | |
| X | 0.00 | Y | −17.69 | Z | 0.00 |
| α | 0.00 | β | 0.00 | γ | 0.00 |

-continued

| | | Displacement and tilt(5) | | | |
|---|---|---|---|---|---|
| X | 0.00 | Y | −30.77 | Z | 0.00 |
| α | 90.00 | β | 0.00 | γ | 0.00 |
| | | Displacement and tilt(6) | | | |
| X | 0.00 | Y | −30.88 | Z | 0.00 |
| α | 90.00 | β | 0.00 | γ | 0.00 |
| | | Displacement and tilt(7) | | | |
| X | 0.00 | Y | −31.88 | Z | 0.00 |
| α | 90.00 | β | 0.00 | γ | 0.00 |
| | | Displacement and tilt(8) | | | |
| X | 0.00 | Y | −33.88 | Z | 0.00 |
| α | 90.00 | β | 0.00 | γ | 0.00 |
| | | Displacement and tilt(9) | | | |
| X | 0.00 | Y | −33.98 | Z | 0.00 |
| α | 90.00 | β | 0.00 | γ | 0.00 |
| | | Displacement and tilt(10) | | | |
| X | 0.00 | Y | −37.48 | Z | 0.00 |
| α | 90.00 | β | 0.00 | γ | 0.00 |
| | | Displacement and tilt(11) | | | |
| X | 0.00 | Y | −38.48 | Z | 0.00 |
| α | 90.00 | β | 0.00 | γ | 0.00 |
| | | Displacement and tilt(12) | | | |
| X | 0.00 | Y | −38.58 | Z | 0.00 |
| α | 90.00 | β | 0.00 | γ | 0.00 |
| | | Displacement and tilt(13) | | | |
| X | 0.00 | Y | −41.58 | Z | 0.00 |
| α | 90.00 | β | 0.00 | γ | 0.00 |
| | | Displacement and tilt(14) | | | |
| X | 0.00 | Y | −42.58 | Z | 0.00 |
| α | 90.00 | β | 0.00 | γ | 0.00 |
| | | Displacement and tilt(15) | | | |
| X | 0.00 | Y | −46.09 | Z | 0.00 |
| α | 90.00 | β | 0.00 | γ | 0.00 |

EXAMPLE 16

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Entrance Pupil) | | (1) | | |
| 2 | ERFS[1] | | (2) | 1.8830 | 40.7 |
| 3 | ERFS[2] (RE) | | (3) | 1.8830 | 40.7 |
| 4 | ERFS[3] (RE) | | (4) | 1.8830 | 40.7 |
| 5 | ERFS[4] | | (5) | | |
| 6 | ∞(Stop) | | (6) | | |
| 7 | −1.92 | | (7) | 1.7440 | 44.8 |
| 8 | −2.70 | | (8) | | |
| 9 | 54.24 | | (9) | 1.5700 | 63.2 |
| 10 | −3.07 | | (10) | 1.7552 | 27.6 |
| 11 | −7.26 | | (11) | | |
| 12 | 7.68 | | (12) | 1.6204 | 60.3 |
| 13 | −8.76 | | (13) | 1.7552 | 27.6 |
| 14 | −26.01 | | (14) | | |
| Image plane | ∞ | | (15) | | |

| | ERFS[1] | |
|---|---|---|
| RY | | ∞ |
| θ | | −8.38 |
| R | | −33.63 |
| $C_3$ | | $5.3282 \times 10^{-3}$ |
| | ERFS[2] | |
| RY | | ∞ |
| θ | | −64.31 |
| R | | −26.33 |
| $C_3$ | | $-1.4921 \times 10^{-2}$ |
| $C_4$ | | $4.9327 \times 10^{-4}$ |
| $C_5$ | | $-1.1801 \times 10^{-5}$ |
| | ERFS[3] | |
| RY | | ∞ |
| θ | | −94.18 |
| R | | −11.77 |
| $C_3$ | | $6.9723 \times 10^{-3}$ |
| $C_4$ | | $-4.1906 \times 10^{-4}$ |
| $C_5$ | | $-3.0294 \times 10^{-5}$ |
| | ERFS[4] | |
| RY | | ∞ |
| θ | | −61.04 |
| R | | −5.43 |
| $C_3$ | | $-4.0235 \times 10^{-3}$ |
| $C_4$ | | $1.3177 \times 10^{-3}$ |
| $C_5$ | | $-8.4774 \times 10^{-5}$ |

| | | Displacement and tilt(1) | | | |
|---|---|---|---|---|---|
| X | 0.00 | Y | 0.00 | Z | −33.69 |
| α | 0.00 | β | 0.00 | γ | 0.00 |
| | | Displacement and tilt(2) | | | |
| X | 0.00 | Y | 0.00 | Z | 0.00 |
| α | 0.00 | β | 0.00 | γ | 0.00 |
| | | Displacement and tilt(3) | | | |
| X | 0.00 | Y | −0.50 | Z | 0.00 |
| α | 0.00 | β | 0.00 | γ | 0.00 |
| | | Displacement and tilt(4) | | | |
| X | 0.00 | Y | 20.56 | Z | 0.00 |
| α | 0.00 | β | 0.00 | γ | 0.00 |
| | | Displacement and tilt(5) | | | |
| X | 0.00 | Y | 7.73 | Z | 0.00 |
| α | 0.00 | β | 0.00 | γ | 0.00 |
| | | Displacement and tilt(6) | | | |
| X | 0.00 | Y | −4.74 | Z | 0.00 |
| α | −90.00 | β | 0.00 | γ | 0.00 |
| | | Displacement and tilt(7) | | | |
| X | 0.00 | Y | −5.18 | Z | 0.00 |
| α | −90.00 | β | 0.00 | γ | 0.00 |
| | | Displacement and tilt(8) | | | |
| X | 0.00 | Y | −7.18 | Z | 0.00 |
| α | −90.00 | β | 0.00 | γ | 0.00 |
| | | Displacement and tilt(9) | | | |
| X | 0.00 | Y | −7.28 | Z | 0.00 |
| α | −90.00 | β | 0.00 | γ | 0.00 |
| | | Displacement and tilt(10) | | | |
| X | 0.00 | Y | −10.78 | Z | 0.00 |
| α | −90.00 | β | 0.00 | γ | 0.00 |
| | | Displacement and tilt(11) | | | |
| X | 0.00 | Y | −11.78 | Z | 0.00 |
| α | −90.00 | β | 0.00 | γ | 0.00 |

-continued

|   | Displacement and tilt(12) | | | | |
|---|---|---|---|---|---|
| X | 0.00 | Y | −11.88 | Z | 0.00 |
| α | −90.00 | β | 0.00 | γ | 0.00 |
|   | Displacement and tilt(13) | | | | |
| X | 0.00 | Y | −14.88 | Z | 0.00 |
| α | −90.00 | β | 0.00 | γ | 0.00 |
|   | Displacement and tilt(14) | | | | |
| X | 0.00 | Y | −15.88 | Z | 0.00 |
| α | −90.00 | β | 0.00 | γ | 0.00 |
|   | Displacement and tilt(15) | | | | |
| X | 0.00 | Y | −21.28 | Z | 0.00 |
| α | −90.00 | β | 0.00 | γ | 0.00 |

EXAMPLE 17

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Entrance Pupil) | | (1) | | |
| 2 | ERFS[1] | | (2) | 1.8830 | 40.7 |
| 3 | YRFS[1] (RE) | | (3) | 1.8830 | 40.7 |
| 4 | ERFS[2] (RE) | | (4) | 1.8830 | 40.7 |
| 5 | ERFS[3] (RE) | | (5) | 1.8830 | 40.7 |
| 6 | ERFS[4] | | (6) | | |
| 7 | ∞(Stop) | | (7) | | |
| 8 | 2.30 | | (8) | 1.6336 | 57.8 |
| 9 | −2.97 | | (9) | 1.6910 | 41.8 |
| 10 | 4.15 | | (10) | | |
| 11 | −33.10 | | (11) | 1.6204 | 60.3 |
| 12 | 3.37 | | (12) | 1.7552 | 27.6 |
| 13 | 9.81 | | (13) | | |
| 14 | −6.99 | | (14) | 1.6204 | 60.3 |
| 15 | 7.00 | | (15) | 1.7552 | 27.6 |
| 16 | 174.88 | | (16) | | |
| Image plane | ∞ | | (17) | | |

| ERFS[1] | |
|---|---|
| RY | ∞ |
| θ | 10.91 |
| R | −24.84 |
| $C_3$ | $2.6350 \times 10^{-1}$ |

| ERFS[2] | |
|---|---|
| RY | ∞ |
| θ | 65.25 |
| R | −15.32 |
| $C_3$ | $-8.0942 \times 10^{-3}$ |
| $C_4$ | $-8.2063 \times 10^{-4}$ |
| $C_5$ | $-5.5398 \times 10^{-5}$ |

| ERFS[3] | |
|---|---|
| RY | ∞ |
| θ | 103.52 |
| R | −14.80 |
| $C_3$ | $-6.8696 \times 10^{-3}$ |
| $C_4$ | $-4.3747 \times 10^{-4}$ |
| $C_5$ | $4.7828 \times 10^{-7}$ |

| ERFS[4] | |
|---|---|
| RY | ∞ |
| θ | −53.71 |
| R | −4.01 |
| $C_3$ | $1.5998 \times 10^{-2}$ |
| $C_4$ | $4.2981 \times 10^{-4}$ |
| $C_5$ | $2.9261 \times 10^{-4}$ |

| YRFS[1] | | | | | |
|---|---|---|---|---|---|
| $C_1$ | −3.4344 | $C_2$ | $-4.3823 \times 10^{-1}$ | $C_3$ | $-2.0837 \times 10^{-2}$ |
| $C_4$ | $-5.4371 \times 10^{-4}$ | $C_5$ | $-2.3430 \times 10^{-5}$ | | |

|   | Displacement and tilt(1) | | | | |
|---|---|---|---|---|---|
| X | 0.00 | Y | 0.00 | Z | −24.88 |
| α | 0.00 | β | 0.00 | γ | 0.00 |
|   | Displacement and tilt(2) | | | | |
| X | 0.00 | Y | 0.00 | Z | 0.00 |
| α | 0.00 | β | 0.00 | γ | 0.00 |
|   | Displacement and tilt(3) | | | | |
| X | 0.00 | Y | 1.93 | Z | 0.00 |
| α | 0.00 | β | 0.00 | γ | 0.00 |
|   | Displacement and tilt(4) | | | | |
| X | 0.00 | Y | −8.83 | Z | 0.00 |
| α | 0.00 | β | 0.00 | γ | 0.00 |
|   | Displacement and tilt(5) | | | | |
| X | 0.00 | Y | 8.90 | Z | 0.00 |
| α | 0.00 | β | 0.00 | γ | 0.00 |
|   | Displacement and tilt(6) | | | | |
| X | 0.00 | Y | −10.78 | Z | 0.00 |
| α | 0.00 | β | 0.00 | γ | 0.00 |
|   | Displacement and tilt(7) | | | | |
| X | 0.00 | Y | −20.86 | Z | 0.00 |
| α | 90.00 | β | 0.00 | γ | 0.00 |
|   | Displacement and tilt(8) | | | | |
| X | 0.00 | Y | −21.22 | Z | 0.00 |
| α | 90.00 | β | 0.00 | γ | 0.00 |
|   | Displacement and tilt(9) | | | | |
| X | 0.00 | Y | −21.92 | Z | 0.00 |
| α | 90.00 | β | 0.00 | γ | 0.00 |
|   | Displacement and tilt(10) | | | | |
| X | 0.00 | Y | −24.42 | Z | 0.00 |
| α | 90.00 | β | 0.00 | γ | 0.00 |
|   | Displacement and tilt(11) | | | | |
| X | 0.00 | Y | −25.34 | Z | 0.00 |
| α | 90.00 | β | 0.00 | γ | 0.00 |
|   | Displacement and tilt(12) | | | | |
| X | 0.00 | Y | −28.34 | Z | 0.00 |
| α | 90.00 | β | 0.00 | γ | 0.00 |
|   | Displacement and tilt(13) | | | | |
| X | 0.00 | Y | −29.04 | Z | 0.00 |
| α | 90.00 | β | 0.00 | γ | 0.00 |
|   | Displacement and tilt(14) | | | | |
| X | 0.00 | Y | −29.14 | Z | 0.00 |
| α | 90.00 | β | 0.00 | γ | 0.00 |
|   | Displacement and tilt(15) | | | | |
| X | 0.00 | Y | −33.14 | Z | 0.00 |
| α | 90.00 | β | 0.00 | γ | 0.00 |
|   | Displacement and tilt(16) | | | | |
| X | 0.00 | Y | −33.84 | Z | 0.00 |
| α | 90.00 | β | 0.00 | γ | 0.00 |

-continued

Displacement and tilt(17)

| X | 0.00 | Y | −38.79 | Z | 0.00 |
|---|------|---|--------|---|------|
| α | 90.00 | β | 0.00 | γ | 0.00 |

Given the Y-axis defined by the center axis 1 and the Y-Z plane defined by the section (FIG. 35) including the center axis 1, these examples are each constructed such that the optical path passes through the front unit 60 on one side only of the center axis (axis of rotational symmetry) 1; it is easy to avoid interferences with the effective diameters of the surfaces and ensure a large angle of view in the direction of the center axis 1. With the optical path running through the front unit 60 on one side only of the center axis 1, however, all the surfaces in the front unit 60 come to be substantially coaxial with the Y-axis (axis of rotational symmetry) 1 in the X-Y plane (FIG. 36), rendering it impossible to form an image by the front unit 60, because of the inability to give positive power to the reflecting surfaces 62, 63 and 64 in the X-Y plane. Therefore, the shape variable Y-Z plane is configured such that the object image (real image) is formed one time in the Y-Z plane only and the aperture (stop) 55 positioned on the image plane 30 side with respect to the front unit 60 and coaxially with the center axis 1 is projected onto the object side to form the entrance pupil 56Y. Thus, by allowing the stop 55 to be projected onto the object side in the Y-Z plane only, the entrance pupil 56Y can be located at or near the first transmitting surface 61 in the front unit 60, and the effective diameter itself of the front unit 60 can be diminished.

Also, by permitting the image of the stop 55 to be relayed to the object side in the Y-Z plane only, the entrance pupil 56Y can be relayed to the vicinity of the first surface (the first transmitting surface) 61 in the front unit 60, so that unnecessary light incident on the front unit 60 can be minimized to view an image with reduced flares. It follows that with projection of the Y-direction entrance pupil 56Y onto the vicinity of the entrance surface 61 in the optical system, the effective diameter of that entrance surface 61 can be principally diminished in the Y-direction, even when a wide angle of view is set.

While the entrance pupil 56X in the X-direction (FIG. 36) spreads out circumferentially, it is possible to locate a slit-like flare stop in the X-direction, thereby cutting off unnecessary light by this flare stop.

Also, with the panoramic optical system of the invention, aberrations produced at the front unit 60 and aberrations occurring at the front unit 70 are mutually compensated for and corrected, so that generally satisfactory aberration states are obtainable.

As described above, the front unit 60 plays a role of receiving light beams coming from panoramic images toward the axis 1 of rotational symmetry to convert them into an annular ring form of aerial image at any position, whereas the rear unit 70 takes a role of projecting that annular ring form of aerial image onto the image plane 30. In other words, the rear unit 70 works as a projection optical system having positive power, and for size reductions, it must be a projection optical system having a short focal length and a wide angle of view. However, it is common that the projection optical system having a short focal length and a wide angle of view often tends to have a negative Petzval sum. For correction of this, that projection optical system must be revamped into an arrangement of the triplet or Gaussian type using lenses of negative power, ending up with an increase in the number of lenses.

In the invention, it is thus desired that the front unit 70 have a function of correcting the negative Petzval sum produced at the rear unit 70.

More preferably for compensating for an astigmatic difference occurring at the front unit 60, a large astigmatic difference is intentionally produced at the rear unit 70 to make up for aberrations throughout the optical system, thereby ensuring satisfactory correction of aberrations as a whole.

With such an arrangement, it is possible to set up a panoramic optical system having a wide angle of view with a reduced number of lenses.

In the foregoing examples, each reflecting surface, and each refracting surface is composed of a rotationally symmetric aspheric surface having a vertex on the axis 1 of rotational symmetry or an extended rotation free-form surface that is formed by rotation of a line segment of any shape about the axis 1 of rotational and has no vertex on the axis 1 of rotational symmetry; however, it is easy to replace them by any desired curved surfaces.

The optical system of the invention also makes correction for an image plane tilt occurring by decentration and pupil aberrations of the stop upon back projection by making use of the formula that defines a line segment of any shape with an odd-number order term incorporated in it. The odd-number order term for the first reflecting surface is particularly important, and allowing this to have a positive value is required for correction of decentration aberrations occurring by decentration. For correction of aberrations it is also preferable to make the Y-Z direction curvature strong (make the radius of curvature small) in the Y-axis positive direction (on the opposite side to the image plane).

By immediate use of the transparent medium that forms the front unit 60 according to the invention and is rotationally symmetric about the center axis 1, images having a full 360°-direction angle of view may be taken or projected. However, it is acceptable to cut that transparent medium along a section including the center axis 1 into ½, ⅓, ⅔, etc. for the purpose of taking or projecting an image having an angle of view of 180°, 120°, 240°, etc.

While the panoramic optical system (embracing a panoramic attachment optical system and image-formation lens combination) has been described with reference to an imaging or viewing optical system for obtaining an image having a full 360°-direction angle of view (a full-panoramic image) including the zenith with the center axis 1 (axis of rotational symmetry) lying in the vertical direction, it is understood that the invention is equally applicable to a projection optical system in which the optical path is the other way around to project an image at a full 360°-direction (full-panoramic) angle of view. The endoscope could be used as a full-panoramic viewing optical system for in-tract viewing apparatus.

Figure 50A:
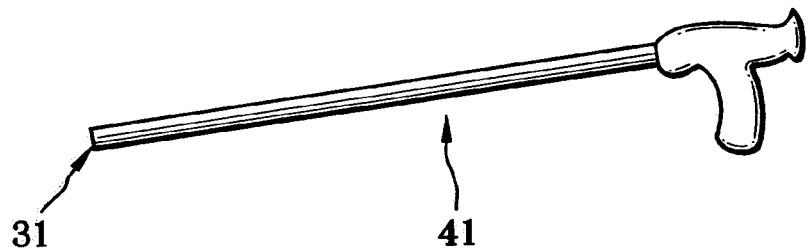
FIG. 50 is illustrative of an example of using the panoramic taking optical system of the invention as a taking optical system at the endmost portion of an endoscope.
Figure 50B:
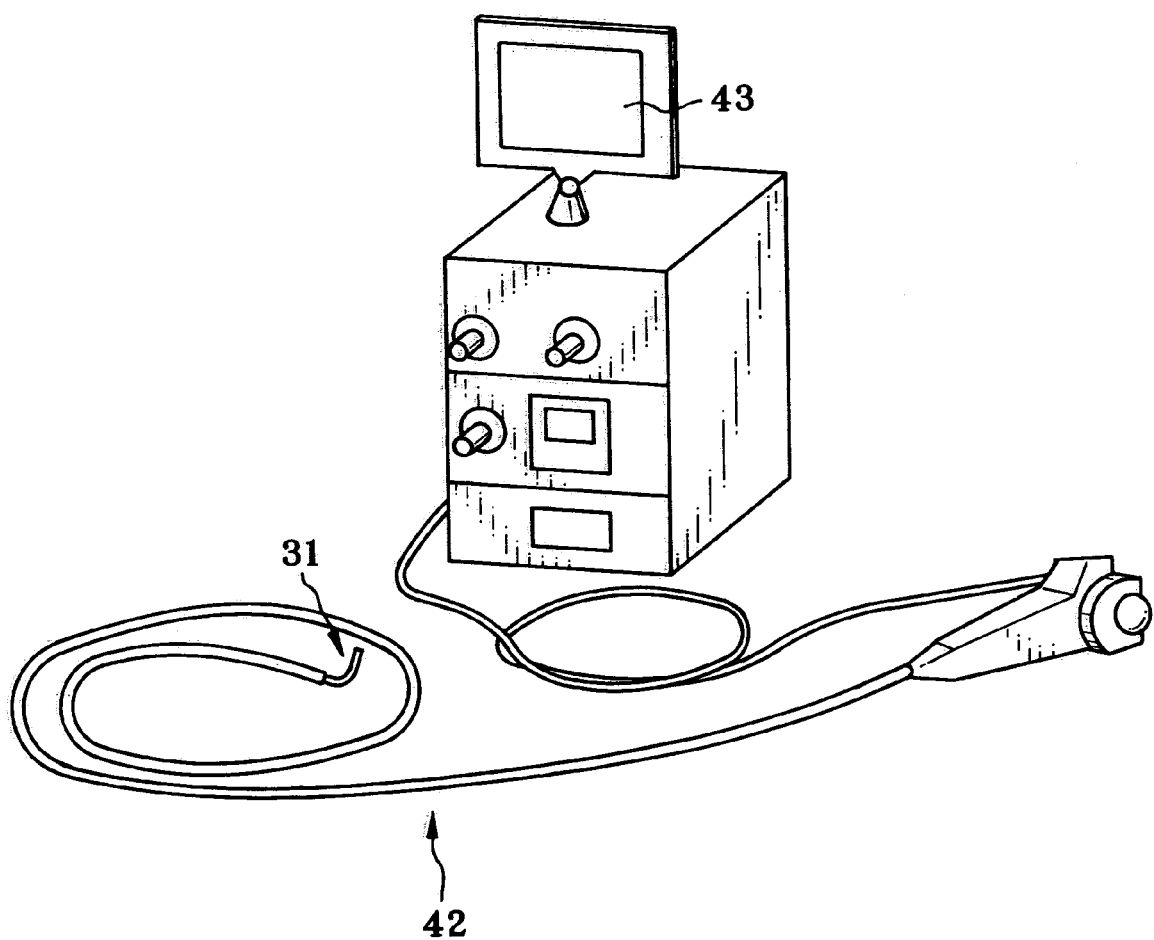

How to use a panoramic taking optical system 31 or panoramic projection optical system 32 is now explained as a typical example of application of the panoramic optical system of the invention. FIG. 50 is generally illustrative of an example of the panoramic taking optical system 31 of the invention used as a taking optical system attached to the endmost portion of an endoscope. More specifically, FIG. 50(*a*) is illustrative of the panoramic taking optical system 31 of the invention that is attached to the endmost portion of a hard endoscope 41 to take and view a full 360°-direction image, and FIG. 50(*b*) is illustrative of the panoramic taking optical system 31 of the invention that is attached to the endmost portion of a soft electronic endoscope 42 to display a taken image on a display 43 after image processing for correction of distortion.

Figure 51:
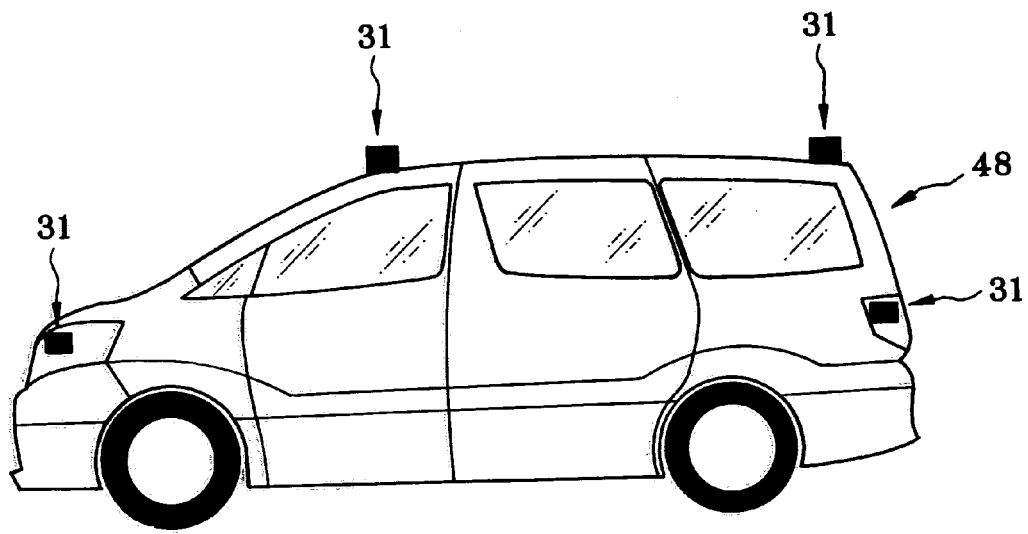
FIG. 51 is illustrative of one example of using the panoramic taking optical system of the invention as taking optical systems at the corners and ceiling of a car.

FIG. 51 is illustrative of a plurality of panoramic taking optical systems 31 of the invention that are attached to the corners and ceiling of a car 48 as taking optical systems to display images taken via the panoramic taking optical systems 31 simultaneously on an interior display after image processing for correction of distortion.

Figure 52:
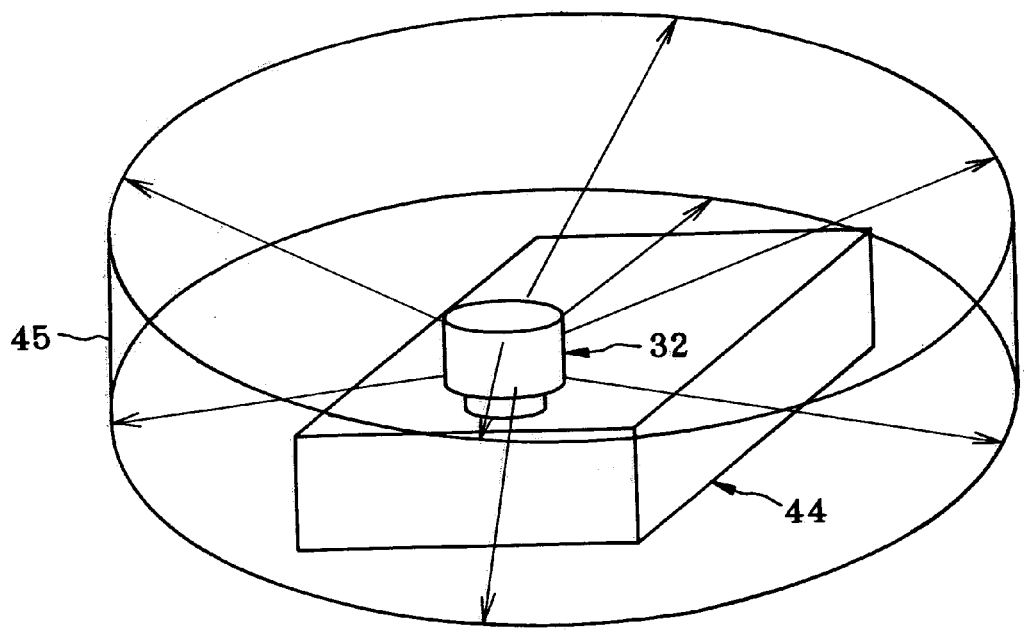
FIG. 52 is illustrative of one example of using the panoramic projection optical system as a projection optical system in a projector.

FIG. 52 is illustrative of an example of a projector 44 in which the panoramic projection optical system 32 of the invention is used as its projection optical system. A panoramic image is displayed on a display device located on the image plane of the system 32, so that a full 360°-direction image is projected and displayed on a full 360°-direction screen 45 through the panoramic optical system 32.

Figure 53:
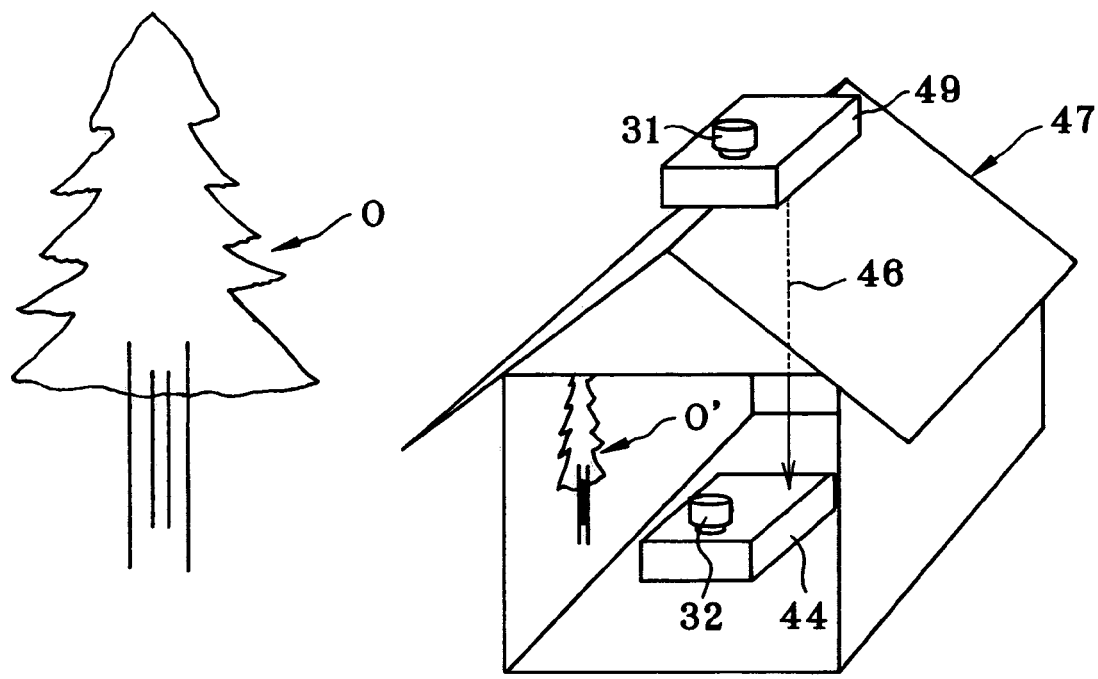
FIG. 53 is illustrative of an example of taking an image of a subject outside a house using the panoramic taking optical system of the invention to project and display it within the house through the panoramic projection optical system of the invention.

FIG. 53 is illustrative of a taking device 49 using the panoramic taking optical system 31 of the invention, which is attached to the outside of a house, and a projector 44 using the panoramic projection optical system 32 of the invention, which is located inside. An image picked up by the taking device 49 is sent to the projector 44 via an electric wire 46. Such being the arrangement, a full 360°-direction subject O outside the house is taken by the taking device 49 via the panoramic taking optical system 31, and image signals are sent to the projector 44 via the electric wire 46. An image of the subject is displayed on a display device located on an image plane, so that the image O' of the subject O is projected and displayed on the inside wall surface or the like of the house via the panoramic projection optical system 32.

I claim:

1. A panoramic attachment optical system, which is attached to an entrance side of an image-formation lens having positive power or an exit side of a projection lens having positive power to form a full 360°-direction image on an image plane or project an image located on an image plane in a full 360°-direction, the panoramic attachment optical system comprising:
   a transparent medium that is rotationally symmetric about a center axis and includes at least one internal reflecting surface and at least two refracting surfaces, wherein a light beam enters said transparent medium via an entrance-side refracting surface in order of travel of a light ray in the case of an image-formation optical system, and oppositely to the order of travel of a light ray in the case of a projection optical system, and reflects successively at said internal reflecting surface to leave said transparent medium via an exit-side refracting surface, forming an image at a position of said image plane off said center axis via said image-formation lens or said projection lens,
   said internal reflecting surface and said refracting surfaces are each of shape rotationally symmetric about said center axis, and
   said internal reflecting surface having a radius of curvature determined such that a light beam coming from far away forms an image at least one time in a section including said center axis, but does not form any image in a plane that is orthogonal to said section and includes a center light ray of said light beam.

2. The panoramic attachment optical system according to claim 1, wherein said light beam coming from far away passes through said internal reflecting surfaces and said refracting surface positioned on only one side of said center axis in said transparent medium.

3. The panoramic attachment optical system according to claim 2, wherein said light beam coming from far away forms an image one time in a section including said center axis, and said panoramic attachment optical system includes one to four internal reflecting surfaces.

4. The panoramic attachment optical system according to claim 2, wherein a center light beam coming from far away has an angle of incidence of 45° or smaller on any of said internal reflecting surfaces.

5. The panoramic attachment optical system according to claim 3, wherein said image-formation lens or said projection lens and a pupil-formation aperture are located coaxially with said center axis.

6. The panoramic attachment optical system according to claim 2, wherein said at least one internal reflecting surface is of rotationally symmetric shape obtained by rotation about said center axis of a line segment that has no plane of symmetry and is of any shape.

7. The panoramic attachment optical system according to claim 1, wherein said at least one internal reflecting surface is of rotationally symmetric shape obtained by rotation about said center axis of a line segment that includes an odd-number order term and is of any shape.

8. The panoramic attachment optical system according to claim 4, which satisfies condition (1):

$$3 < |A/B| \quad (1)$$

where A is an optical path length between a position of an entrance pupil that is an image of said pupil-formation aperture and said pupil-formation aperture, and B is an optical path length between said entrance surface and said position of an entrance pupil.

9. The panoramic attachment optical system according to claim 8, which satisfies condition (2):

$$0.2 < Fx/Fy < 5.0 \quad (2)$$

where Fx and Fy are focal lengths of the whole panoramic attachment optical system in an X-direction and a Y-direction, respectively, provided that on said image plane, the Y-direction is defined by a direction of a plane including said center axis and the X-direction is defined by a direction orthogonal to said plane.

10. A panoramic optical system for forming an image having a full 360°-direction angle of view on an image plane or projecting an image located on the image 15 plane at a full 360° direction angle of view, the panoramic attachment optical system comprising:
   a front unit including at least one reflecting surface that is rotationally symmetric about a center axis and a rear unit that is rotationally symmetric about the center axis and has positive refracting power, and
   said reflecting surface has a radius of curvature determined such that a light beam incident from far away on said front unit in order of travel of a light ray in the case of an image-formation system, and oppositely to the order of travel of a light ray in the case of a projection system forms an image at a position of said image plane off said center axis via said front unit and said rear unit in this order as well as in a section including the center axis and in a plane orthogonal to said section and including a center ray of said light beam, and the number of intermediate image formations differs in said plane.

11. A panoramic optical system for forming an image having a full 360°-direction angle of view on an image plane or projecting an image located on the image plane at a full 360°-direction angle of view, the panoramic attachment optical system comprising:
   a front unit including at least one reflecting surface that is rotationally symmetric about a center axis, a rear unit that is rotationally symmetric about the center axis and has positive refracting power, and an aperture that is located coaxially with said center axis, and said reflecting surface has a radius of curvature determined such that a light beam incident from far away on said front unit in order of travel of a light ray in the case of an image-formation system, and oppositely to the order of travel of a light ray in the case of a projection system forms an image at a position of said image plane off said center axis via said front unit and said rear unit in this order as well as in a section including the center axis and in a plane orthogonal to said section and including a center ray of said light beam, and the number of intermediate image formations differs in said plane.

12. The panoramic optical system according to claim 11, wherein said front unit comprises a transparent medium that has an angle of view of 90° or greater in a center axis direction and is rotationally symmetric about said center axis, wherein said transparent medium includes one internal reflecting surface and two refracting surfaces, and a light beam incident from far way away on said front unit in order of travel of a light ray in the case of an image-formation system, and oppositely to the order of travel of a light ray in the case of a projection system enters said transparent medium via an entrance-side refracting surface, and reflects at said internal reflecting surface to leave said transparent medium via an exit-side refracting surface, forming an image at a position of said image plane off said center axis via said rear unit.

13. The panoramic optical system according to claim 11, wherein a light beam coming from far away in one direction is reflected and refracted in said front unit on only one side of said center axis to form an intermediate image one time in a section including said center axis, but does not form any intermediate image in a plane that is orthogonal to said section including said center axis and includes a center ray of said light beam, and said aperture forms in said section including said center axis an entrance pupil that is conjugate to an entrance surface of said front unit or an object side with respect thereto.

14. A panoramic optical system for forming an image having a full 360°-direction angle of view on an image plane or projecting an image located on the image plane at a full 360°-direction angle of view, the panoramic attachment optical system comprising:
a front unit including two reflecting surfaces that are rotationally symmetric about a center axis and a rear unit that is rotationally symmetric about the center axis and has positive refracting power, and
said reflecting surface has a radius of curvature determined such that a light beam incident from far away on said front unit in order of travel of a light ray in the case of an image-formation system, and oppositely to the order of travel of a light ray in the case of a projection system is reflected at a first reflecting surface positioned on an entrance side with respect to said center axis in a direction away from said rear unit, and a light beam reflected at said first reflecting surface is reflected at a second reflecting surface positioned on the same side as said first reflecting surface in a direction toward said rear unit to leave said front unit, forming an image at a position of said image plane off said center axis via said rear unit as well as in a section including the center axis and in a plane orthogonal to said section and including a center axis of said light beam, and the number of intermediate image formations differs in said plane.

15. The panoramic optical system according to claim 14, wherein a light beam coming from far away in one direction is reflected and refracted in said front unit on only one side of said center axis to form an intermediate image one time in a section including said center axis, but does not form any intermediate image in a plane that is orthogonal to said section including said center axis and includes a center ray of said light beam, and in said section including said center axis, an entrance pupil is formed by said front unit on an object side or at or near said first transmitting surface.

16. A panoramic optical system for forming an image having a full 360°-direction angle of view on an image plane or projecting an image located on the image plane at a full 360°-direction angle of view, the panoramic attachment optical system comprising:
a front unit including at least two reflecting surfaces that are rotationally symmetric about a center axis and a rear unit that is rotationally symmetric about the center axis and has positive refracting power,
said reflecting surface has a radius of curvature determined such that a light beam incident from far away on said front unit in order of travel of a light ray in the case of an image-formation system, and oppositely to the order of travel of a light ray in the case of a projection system is reflected successively at a first reflecting surface positioned on an entrance side of said center axis to leave said front unit, forming an image at a position of an image plane off said center axis via said front unit, and
in a section including said center axis, an optical path of light entering the first reflecting surface in said front unit crosses an optical path of light reflected at the final reflecting surface in said front unit wherein said image is formed in a section including the center axis and in a plane orthogonal to said section and including a center ray of said light beam, and the number of intermediate image formations differs in said section.

17. The panoramic optical system according to claim 16, wherein said front unit comprises a transparent medium that has an angle of view of 90° or greater in a center axis direction and is rotationally symmetric about said center axis, wherein said transparent medium includes two internal reflecting surfaces and two refracting surfaces, and a light beam incident from far away on said front unit in order of travel of a light ray in the case of an image-formation system, and oppositely to the order of travel of a light ray in the case of a projection system enters said transparent medium via an entrance-side refracting surface, and reflects successively at said reflecting surfaces to leave said transparent medium via an exit-side refracting surface, forming an image at a position of said image plane off said center axis via said rear unit.

18. The panoramic optical system according to claim 16, wherein said front unit has three reflecting surfaces.

19. The panoramic optical system according to claim 16, wherein a light beam coming from far away in one direction is reflected and refracted in said front unit on only one side of said center axis to form an intermediate image one time in a section including said center axis, but does not form any intermediate image in a plane that is orthogonal to said section including said center axis and includes a center ray of said light beam, and in said section including said center axis, an entrance pupil is formed by said front unit on an object side or at or near said first transmitting surface.

20. The panoramic optical system according to claim 14, which comprises an aperture at any position of an image plane side with respect to said front unit, wherein said aperture is located coaxially with said center axis.

21. The panoramic optical system according to claim 10, wherein said rear unit comprises a rotationally symmetric, co-axial refracting optical system.

22. The panoramic optical system according to claim 16, which comprises an aperture at any position of an image plane side with respect to said front unit, wherein said aperture is located coaxially with said center axis.

23. The panoramic optical system according to claim 11, wherein said rear unit comprises a rotationally symmetric, co-axial refracting optical system.

24. The panoramic optical system according to claim 14, wherein said rear unit comprises a rotationally symmetric, co-axial refracting optical system.

25. The panoramic optical system according to claim 16, wherein said rear unit comprises a rotationally symmetric, co-axial refracting optical system.

26. The panoramic attachment optical system according to claim 6, which satisfies condition (1):

$$3 < |A/B| \quad (1)$$

where A is an optical path length between a position of an entrance pupil that is an image of said pupil-formation aperture and said pupil-formation aperture, and B is an optical path length between said entrance surface and said position of an entrance pupil.

27. The panoramic optical system according to claim 12, wherein a light beam coming from far away in one direction is reflected and refracted in said front unit on only one side of said center axis to form an intermediate image one time in a section including said center axis, but does not form any intermediate image in a plane that is orthogonal to said section including said center axis and includes a center ray of said light beam, and said aperture forms in said section including said center axis an entrance pupil that is conjugate to an entrance surface of said front unit or an object side with respect thereto.

28. The panoramic optical system according to claim 17, wherein said front unit has three reflecting surfaces.

29. The panoramic optical system according to claim 17, wherein a light beam coming from far away in one direction is reflected and refracted in said front unit on only one side of said center axis to form an intermediate image one time in a section including said center axis, but does not form any intermediate image in a plane that is orthogonal to said section including said center axis and includes a center ray of said light beam, and in said section including said center axis, an entrance pupil is formed by said front unit on an object side or at or near said first transmitting surface.

30. The panoramic optical system according to claim 18, wherein a light beam coming from far away in one direction is reflected and refracted in said front unit on only one side of said center axis to form an intermediate image one time in a section including said center axis, but does not form any intermediate image in a plane that is orthogonal to said section including said center axis and includes a center ray of said light beam, and in said section including said center axis, an entrance pupil is formed by said front unit on an object side or at or near said first transmitting surface.

31. The panoramic optical system according to claim 28, wherein a light beam coming from far away in one direction is reflected and refracted in said front unit on only one side of said center axis to form an intermediate image one time in a section including said center axis, but does not form any intermediate image in a plane that is orthogonal to said section including said center axis and includes a center ray of said light beam, and in said section including said center axis, an entrance pupil is formed by said front unit on an object side or at or near said first transmitting surface.

* * * * *